(12) United States Patent
Asayama et al.

(10) Patent No.: US 9,837,780 B2
(45) Date of Patent: Dec. 5, 2017

(54) EXCIMER LASER APPARATUS AND EXCIMER LASER SYSTEM

(71) Applicant: Gigaphoton Inc., Tochigi (JP)

(72) Inventors: Takeshi Asayama, Oyama (JP); Osamu Wakabayashi, Oyama (JP); Kouji Kakizaki, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/150,800

(22) Filed: May 10, 2016

(65) Prior Publication Data
US 2016/0254634 A1 Sep. 1, 2016

Related U.S. Application Data

(63) Continuation of application No. PCT/JP2014/084188, filed on Dec. 24, 2014.

(30) Foreign Application Priority Data

Dec. 25, 2013 (WO) .................. PCT/JP2013/084703

(51) Int. Cl.
H01S 3/225 (2006.01)
H01S 3/036 (2006.01)
H01S 3/134 (2006.01)
H01S 3/038 (2006.01)

(52) U.S. Cl.
CPC ............. H01S 3/036 (2013.01); H01S 3/134 (2013.01); H01S 3/225 (2013.01); *H01S 3/038* (2013.01)

(58) Field of Classification Search
CPC .......... H01S 3/036; H01S 3/134; H01S 3/225; H01S 3/038
See application file for complete search history.

(56) References Cited

U.S. PATENT DOCUMENTS

| 5,142,543 | A | 8/1992 | Wakabayashi et al. |
| 6,490,307 | B1 | 12/2002 | De Mos et al. |
| 7,741,639 | B2 | 6/2010 | Besaucele et al. |
| 2006/0239322 | A1 | 10/2006 | Matsunaga et al. |

(Continued)

FOREIGN PATENT DOCUMENTS

| JP | S63-086593 A | 4/1988 |
| JP | H01-251771 | 10/1989 |

(Continued)

OTHER PUBLICATIONS

International Search Report of PCT/JP2014/084188 dated Mar. 31, 2015.

*Primary Examiner* — Tod T Van Roy
(74) *Attorney, Agent, or Firm* — Studebaker & Brackett PC

(57) ABSTRACT

The excimer laser apparatus may include a laser chamber configured to contain gas, a pair of electrodes provided in the laser chamber, a power source unit configured to supply a pulse voltage between the pair of electrodes, a gas supply unit configured to supply gas into the laser chamber, a gas exhaust unit configured to partially exhaust gas from within the laser chamber, and a gas control unit configured to control the gas supply unit and the gas exhaust unit, where a replacement ratio of gas to be replaced from within the laser chamber increases as deterioration of the pair of electrodes progresses, the deterioration being represented by a deterioration parameter of the pair of electrodes.

4 Claims, 55 Drawing Sheets

(56) References Cited

U.S. PATENT DOCUMENTS

2013/0100980 A1   4/2013  Abe et al.
2013/0170516 A1*  7/2013  Riggs ..................... H01S 3/104
                                                        372/58

FOREIGN PATENT DOCUMENTS

| JP | H10-190103 A | 7/1998 |
| JP | 2000-294857  | 10/2000 |
| JP | 2006-303174  | 11/2006 |
| JP | 2013-110381  | 6/2013 |

* cited by examiner (S300)

(S400)

Total number of pulses Nch of laser chamber

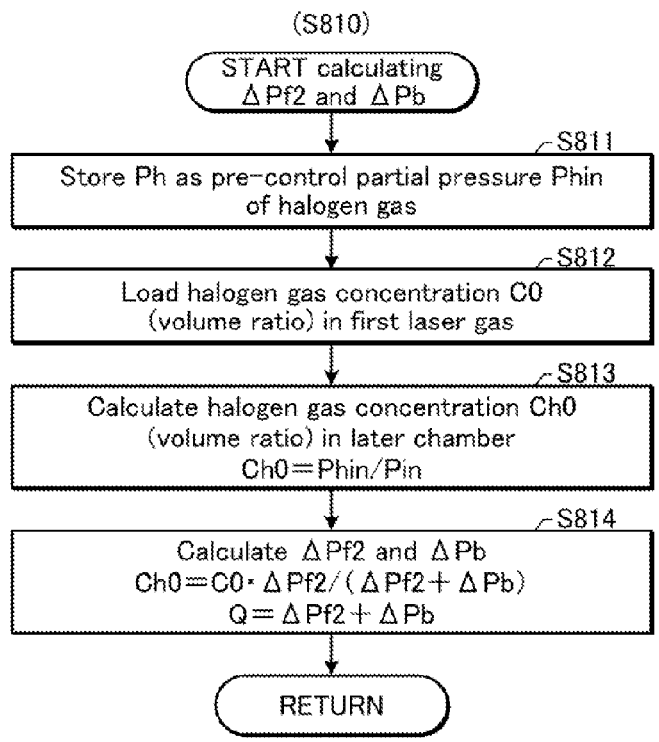
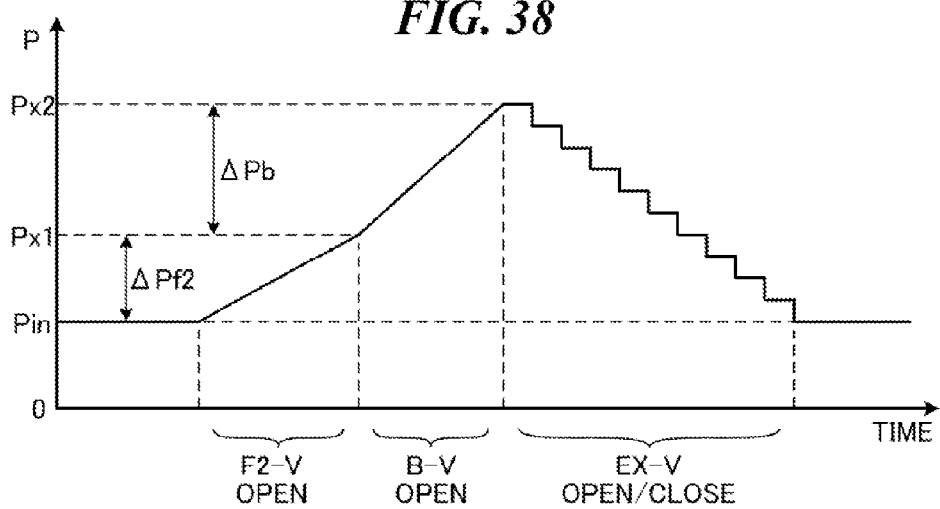

EXCIMER LASER APPARATUS AND EXCIMER LASER SYSTEM

TECHNICAL FIELD

The present disclosure relates to an excimer laser apparatus and an excimer laser system.

BACKGROUND ART

In recent years, along with the miniaturization and integration of semiconductor integrated circuits, a semiconductor exposure device (hereinafter referred to as "exposure device") has been required to have higher resolution. For this reason, shortening of the wavelength of light that is emitted from an exposure light source has been under development. Generally, as an exposure light source, a gas laser apparatus is used instead of a conventional mercury lamp. For example, as a gas laser apparatus for exposure, a KrF excimer laser apparatus configured to output ultraviolet laser beam with a wavelength of 248 nm as well as an ArF excimer laser apparatus configured to output ultraviolet laser beam with a wavelength of 193 nm may be used.

LIST OF DOCUMENTS

Patent Document

Patent Document 1: United States Patent Application Publication No. 2013/0100980
Patent Document 2: United States Patent Application Publication No. 2006/0239322
Patent Document 3: Japanese Patent Application Publication No. H10-190103
Patent Document 4: U.S. Pat. No. 6,490,307
Patent Document 5: Japanese Patent Application Publication No. S63-086593
Patent Document 6: U.S. Pat. No. 5,142,543
Patent Document 7: U.S. Pat. No. 7,741,639

SUMMARY

An excimer laser apparatus according to an aspect of the present disclosure may include a laser chamber configured to contain gas, a pair of electrodes provided in the laser chamber, a power source unit configured to supply a pulse voltage between the pair of electrodes, a gas supply unit configured to supply gas into the laser chamber, a gas exhaust unit configured to partially exhaust gas from within the laser chamber, and a gas control unit configured to control the gas supply unit and the gas exhaust unit, where a replacement ratio of gas to be replaced from within the laser chamber increases as deterioration of the pair of electrodes progresses, the deterioration being represented by a deterioration parameter of the pair of electrodes.

An excimer laser apparatus according to another aspect of the present disclosure may include a laser chamber configured to contain gas, a pair of electrodes provided in the laser chamber, a power source unit configured to supply a pulse voltage between the pair of electrodes, a gas supply unit configured to supply gas into the laser chamber, a gas exhaust unit configured to partially exhaust gas from within the laser chamber, and a gas control unit configured to control the gas supply unit and the gas exhaust unit to replace a first amount of gas corresponding to a first ratio to the total amount of gas in the laser chamber when a gas pressure in the laser chamber has a first value, control the gas supply unit and the gas exhaust unit to replace a second amount of gas corresponding to a second ratio to the total amount of gas in the laser chamber when the gas pressure in the laser chamber has a second value, the second ratio being higher than the first ratio, and the second value being higher than the first value.

An excimer laser apparatus according to still another aspect of the present disclosure may include a laser chamber configured to contain gas, a pair of electrodes provided in the laser chamber, a power source unit configured to supply a pulse voltage between the pair of electrodes, a gas supply unit configured to supply gas into the laser chamber, a gas exhaust unit configured to partially exhaust gas from within the laser chamber, and a gas control unit configured to control the gas supply unit and the gas exhaust unit to replace a first amount of gas corresponding to a first ratio to the total amount of gas in the laser chamber when a deterioration parameter of the pair of electrodes has a first value, control the gas supply unit and the gas exhaust unit to replace a second amount of gas corresponding to a second ratio to the total amount of gas in the laser chamber when the deterioration parameter of the pair of electrodes has a second value, the second ratio being higher than the first ratio, and the second value representing more progressed deterioration of the pair of electrodes than the first value.

An excimer laser apparatus according to still another aspect of the present disclosure may include a laser chamber configured to contain gas, a pair of electrodes provided in the laser chamber, a power source unit configured to supply a pulse voltage between the pair of electrodes, a gas supply unit configured to supply gas into the laser chamber, a gas exhaust unit configured to partially exhaust gas from within the laser chamber, and a gas control unit configured to, based on a deterioration parameter of the pair of electrodes, control the gas supply unit and the gas exhaust unit to increase a replacement amount of gas to be replaced from within the laser chamber as the deterioration parameter changes to show that deterioration of the pair of electrodes progresses, output a life expiration signal when the deterioration parameter shows a life expiration of the pair of electrodes, and further increase the replacement amount of gas to be replaced from within the laser chamber upon receiving a life prolonging command after outputting the life expiration signal.

An excimer laser apparatus according to still another aspect of the present disclosure may include a laser chamber configured to contain gas, a pair of electrodes provided in the laser chamber, a power source unit configured to supply a pulse voltage between the pair of electrodes, a gas supply unit configured to supply gas into the laser chamber, a gas exhaust unit configured to partially exhaust gas from within the laser chamber, and a gas control unit configured to control the gas supply unit and the gas exhaust unit to partially replace gas from within the laser chamber based on a stability of pulse energy of a laser beam outputted from the laser chamber.

An excimer laser apparatus according to still another aspect of the present disclosure may include a laser chamber configured to contain gas, a pair of electrodes provided in the laser chamber, a power source unit configured to supply a pulse voltage between the pair of electrodes, a gas supply unit configured to supply gas into the laser chamber, a gas exhaust unit configured to partially exhaust gas from within the laser chamber, and a gas control unit configured to control the gas supply unit and the gas exhaust unit to partially replace gas from within the laser chamber based on a proximity of pulse energy of a laser beam outputted from the laser chamber to a target value.

BRIEF DESCRIPTION OF DRAWINGS

Exemplary embodiments of the present disclosure will be described hereinafter with reference to the appended drawings.

FIG. 203 is a flowchart illustrating a first example of a process to increase the gas replacement ratio X shown in FIG. 20A beyond a maximum value Xmax.

FIG. 35 is a flowchart illustrating the partial gas replacement control shown in FIG. 4.

FIG. 37 is a flowchart illustrating a process to calculate an injection amount of the first laser gas and an injection amount of the second laser gas shown in FIG. 36.

FIG. 38 is a graph showing a change in the gas pressure in the laser chamber resulting from the partial gas replacement control shown in FIG. 36.

DESCRIPTION OF EMBODIMENTS

Figure 1:
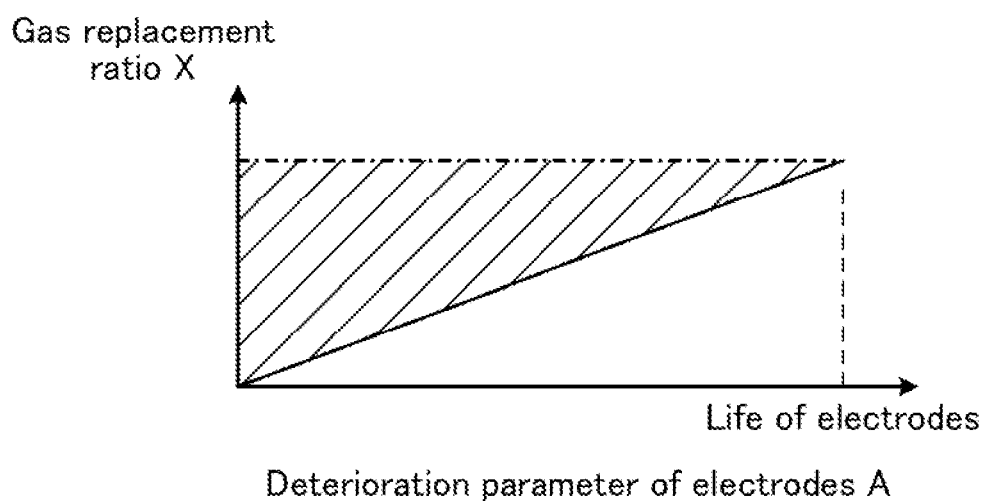
FIG. 1 is a graph showing an example of a relationship between a deterioration parameter of a pair of electrodes and a gas replacement ratio in the present disclosure.

Contents
1. Outline
2. Explanation of Terms
3. Overall Description of Excimer Laser Apparatus
   3.1 Laser Chamber
   3.2 Optical Resonator
   3.3 Various Sensors
   3.4 Laser Control Unit
   3.5 Gas Control Device
4. Gas Control in the Excimer Laser Apparatus
   4.1 Outline of a Gas Control
   4.2 Main Flow
   4.3 Voltage Control by a Laser Control Unit
   4.4 Calculation of a Duty by the Laser Control Unit
   4.5 Calculation of Deterioration Parameters of Electrodes
      4.5.1 Calculation of the Total Number of Pulses of the Laser Chamber
      4.5.2 Calculation of an Integrated Value of Input Energy of the Laser Chamber
      4.5.3 Calculation of a Stability of Pulse Energy of a Laser Beam
      4.5.4 Calculation of a Proximity of the Pulse Energy of the Laser Ream to a Target Value
      4.5.5 Calculation of the Number of Pulses after a Complete Gas Replacement
      4.5.6 Calculation of Elapsed Time after the Complete Gas Replacement
   4.6 Loading Gas Control Parameters (Details of S200)
   4.7 Calculating a Gas Control Interval (Details of S300)
   4.8 Calculating a Partial Pressure of Halogen Gas (Details of S400)
   4.9 Calculating a Gas Replacement Amount (Details of S500)
      4.9.1 Relationship between a Gas Replacement Ratio and the Deterioration Parameters of the Electrodes
      4.9.2 Relationship between the Gas Replacement Ratio and the Gas Pressure
      4.9.3 Process of Prolonging Life 4.9.4 Relationship between the Gas Replacement Ratio and the Stability of the Pulse Energy
4.9.5 Relationship between the Gas Replacement Amount and the Proximity of the Pulse Energy to the Target Value
4.9.6 Relationship between the Gas Replacement Amount and the Total Number of Pulses of the Laser Chamber
4.9.7 Relationship between the Gas Replacement Amount and the Integrated Value of Input Energy of the Laser Chamber
4.9.8 Relationship between the Gas Replacement Amount and the Stability of the Pulse Energy
4.9.9 Relationship between the Gas Replacement Amount and the Proximity of the Pulse Energy to the Target Value
4.9.10 Relationship between the Gas Replacement Amount and the Total Number of Pulses of the Laser Chamber
4.9.11 Relationship between the Gas Replacement Amount and the Integrated Value of Input Energy of the Laser Chamber
4.10 Relationship between the Gas Control Interval and the Deterioration Parameter of the Electrodes (Details of S300)
4.11 Gas Pressure Control (Details of S600)
4.12 Halogen Gas Replenishment Control (Details of S700)
4.13 Partial Gas Replacement Control (Details of S800)
5. Second Embodiment (an Integrated Control of Partial Gas Replacement and Halogen Gas Replenishment)
 5.1 Outline of a Gas Control
 5.2 Main Flow
 5.3 Calculation of a Gas Control Interval (Details of S340)
 5.4 Partial Gas Replacement and Halogen Gas Replenishment Control (Details of S840)
6. Third Embodiment (Omitting the Gas Pressure Control)
 6.1 Outline of a Gas Control
 6.2 Main Flow
 6.3 Calculation of a Gas Replacement Amount (Details of S500)
7. Fourth Embodiment (MOPO System)
 7.1 Overall Description of the MOPO system
 7.2 Gas Control in the MOPO System
8. Fifth Embodiment (an Integrated Control in the MOPO System)
9. Sixth Embodiment (Sharing a Charger in a MOPO System)
10. Seventh Embodiment (a MOPO System Having a Ring Resonator)
11. Configuration of a Pulse Power Module
12. Configuration of a Control Unit Embodiments of the present disclosure will be described in detail hereinafter with reference to the drawings. The embodiments described hereinafter indicate several examples of the present disclosure, and are not intended to limit the content of the present disclosure. Furthermore, not all of the configurations and operations described in the embodiments are required configurations and operations in the present disclosure. Note that identical constituent elements will be given identical reference symbols, and redundant descriptions thereof will be omitted.

1. Outline

In an excimer laser apparatus for an exposure device, it may be desired to stably output an intended pulse laser beam for a long period of time. Laser oscillation for a long period of time in the excimer laser apparatus may cause impurities to be generated in a laser chamber. The impurities may absorb the laser beam or worsen a condition of discharge. This may prevent the excimer laser apparatus to output a desired pulse laser beam. In this situation, it may be necessary to exhaust almost all gas in the laser chamber and then newly inject gas to serve as laser medium. This process may be referred to as a complete gas replacement. However, in the complete gas replacement, the gas in the laser chamber may have to be exhausted to the extent that operation of the laser chamber cannot be continued. Therefore, it may be necessary to stop laser oscillation. While the laser oscillation is stopped, it may not be possible to perform an exposure in the exposure device.

It may be possible to perform a partial gas replacement during laser oscillation. In the partial gas replacement, a new laser gas may be injected to the laser chamber, and then, a gas of the same amount or the same volume may be exhausted from within the laser chamber. However, if a gas replacement amount in the partial gas replacement is too small, it may be possible that impurities are not sufficiently removed and that laser performance is not recovered. If a gas replacement amount in the partial gas replacement is too large, it may be possible that an amount of consuming the laser gas is higher than necessary.

US Patent Application Publication No. 2013/0100980 teaches that the gas replacement amount in the partial gas replacement may be decided based on a gas pressure in the laser chamber. Specifically, it is taught that the gas replacement amount for the partial gas replacement may be increased in proportion to the gas pressure in the laser chamber. In the present disclosure, a gas replacement ratio X is defined as a value obtained by a calculation where the gas replacement amount of the partial gas replacement is divided by a total amount of gas in the laser chamber. The total amount of gas in the laser chamber may be in proportion to the gas pressure in the laser chamber. Assuming that the gas replacement amount of the partial gas replacement is increased in proportion to the gas pressure in the laser chamber, the gas replacement ratio may be a constant value. Here, we may assume that a molar number of impurities in the laser chamber before performing the partial gas replacement is a first predetermined value M and that the gas replacement ratio X is not changed. A molar number of impurities in the laser chamber after performing the partial gas replacement may be a second predetermined value $M-M \cdot X$. The second predetermined value $M-M \cdot X$ may be a constant value regardless of the gas pressure. Reduction of energy of the output pulse laser beam may be in proportion to the molar number of the impurity in the chamber.

Inventors of the present disclosure found the following characteristics. When a deterioration of electrodes is in an early stage, it may be possible to output a desired pulse laser beam. This may be possible even if the molar number of impurities contained in gas in the laser chamber is large and input energy inputted to the electrodes is not so high. If the gas pressure in the laser chamber is low, the deterioration of the electrodes may not have progressed so much. Therefore, if the gas replacement ratio X is constant regardless of the gas pressure in the laser chamber, an amount of gas to be injected to the laser chamber may be too much for outputting desired pulse laser beam. According to an aspect of the present disclosure, if the gas pressure in the laser chamber is low, the gas replacement ratio X may be small. Large amount of impurity gas may be remained in the laser chamber. It may be possible to reduce gas consumption while outputting desired pulse laser beam.

According to another aspect of the present disclosure, the gas replacement ratio may be decided based on a deterioration parameter of a pair of electrodes in the laser chamber. Specifically, when the deterioration parameter shows that the pair of electrodes are deteriorated, the gas replacement ratio may be increased. Contrary, when the deterioration parameter does not show that the pair of electrodes is deteriorated, the gas replacement ratio may be decreased. Large amount of impurity may be remained in the laser chamber. It may be possible to reduce gas consumption while outputting desired pulse laser beam.

FIG. 1 is a graph showing an example of a relationship between a deterioration parameter of a pair of electrodes and a gas replacement ratio in the present disclosure. The deterioration parameter of the electrodes will be explained below. At the left side of the graph, the electrodes may be new. At the right side of the graph, the deterioration has been progressed and a life of each electrode is going to be expired. During a situation where the electrodes are new, a desired pulse laser beam may be outputted even if the replacement ratio X is small and a large amount of impurities is remained in the laser chamber Therefore, during the situation where the electrodes are new, the replacement ratio X may be lower than a situation where the deterioration of the electrodes has been progressed. According to this, it may be possible to avoid using gas corresponding to the hatched area in FIG. 1. The gas corresponding to the hatched area in FIG. 1 may be necessary if the gas replacement ratio X is not changed.

According to still another aspect of the present disclosure, a gas replacement amount for a partial gas replacement may be decided based on the deterioration parameter of the electrodes. Further, a partial gas replacement interval may be decided based on the deterioration parameter of the electrodes.

2. Explanation of Terms

Several terms used in the present application are described below.

A "first laser gas" may be a laser gas that contains a halogen gas.

A "second laser gas" may be a laser gas that has a lower concentration of halogen gas than the first laser gas.

"Gas pressure control" may include selectively performing either one of supplying the second laser gas to the laser chamber and partially exhausting gas from within the laser chamber.

"Halogen gas replenishment control" may include sequentially supplying the first laser gas to the laser chamber and then partially exhausting gas from within the laser chamber.

"Partial gas replacement control" may include sequentially supplying the first laser gas and the second laser gas to the laser chamber and then partially exhausting gas from within the laser chamber.

3. Overall Description of Excimer Laser Apparatus

Figure 2:
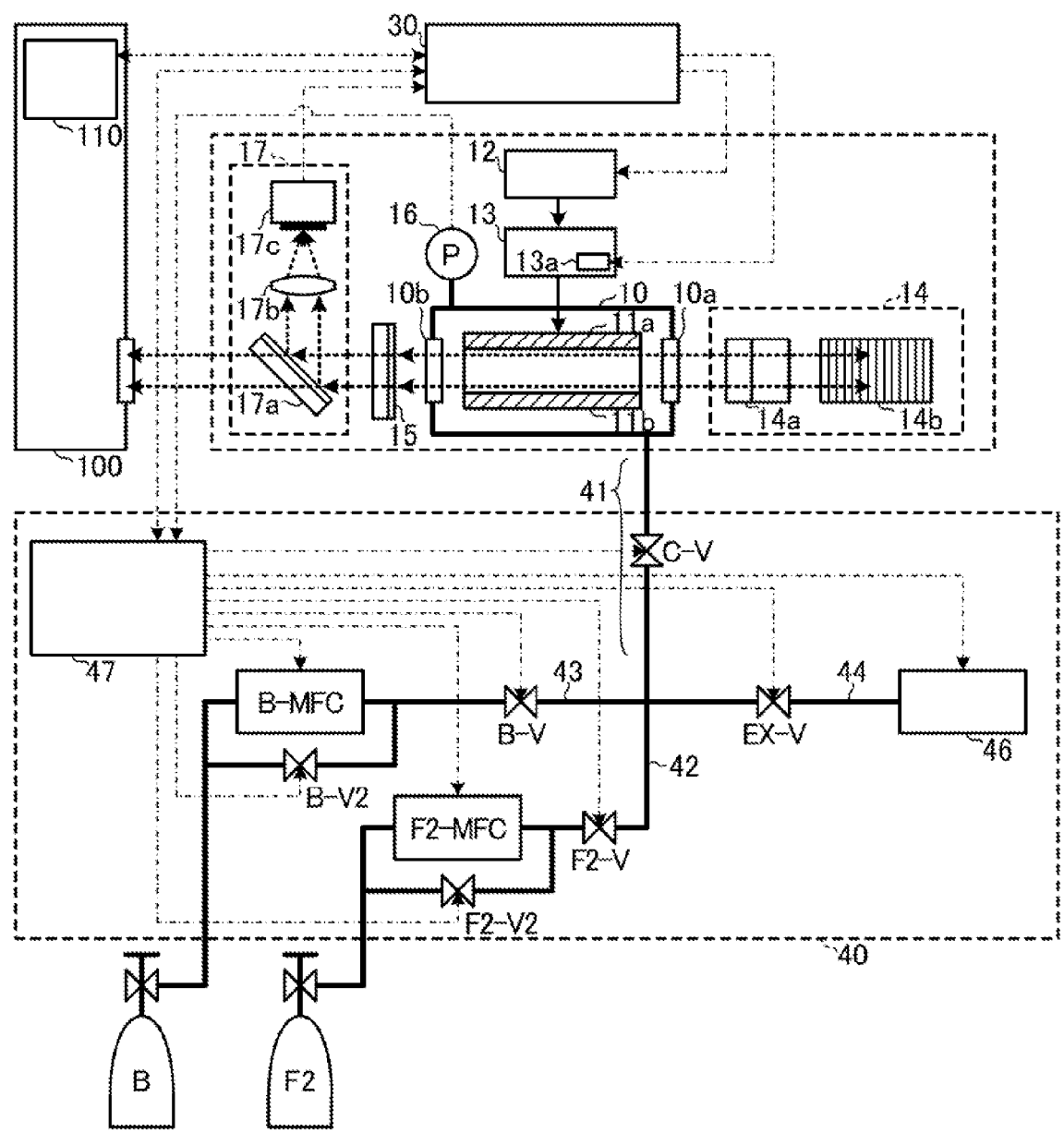
FIG. 2 schematically illustrates a configuration of an excimer laser apparatus according to a first embodiment.

FIG. 2 schematically illustrates a configuration of an excimer laser apparatus according to a first embodiment. The excimer laser apparatus shown in FIG. 2 may include a laser chamber 10, a pair of electrodes 11a and 11b, a charger 12, and a pulse power module (PPM) 13. The excimer laser apparatus may further include a line narrow module 14, an output coupling mirror 15, a pressure sensor 16, an optical sensor module 17, a laser control unit 30, and a gas control device 40. The excimer laser apparatus shown in FIG. 2 may be connected to an exposure device 100 that carries out exposure using laser beam outputted from the excimer laser apparatus.

3.1 Laser Chamber

The laser chamber 10 may be a chamber containing a laser gas serving as a laser medium, which contains, for example, argon, neon, fluorine, and the like. The pair of electrodes 11a and 11b may be disposed within the laser chamber 10 as electrodes for exciting the laser medium by a discharge. The charger 12 may be configured of, for example, a capacitor connected to a power source device, and may hold electrical energy for applying a high voltage between the pair of electrodes 11a and 11b. The pulse power module 13 may include a switch 13a that is controlled by the laser control unit 30. When the switch 13a changes from OFF to ON, the pulse power module 13 may generate a pulse-form high voltage from the electrical energy held in the charger 12, and may apply the high voltage between the pair of electrodes 11a and 11b. The charger 12 and the pulse power module 13 may correspond to a power source unit in the present disclosure.

When the high voltage is applied between the pair of electrodes 11a and 11b, a discharge may occur between the pair of electrodes 11a and 11b. The laser medium in the laser chamber 10 may be excited by the energy of the discharge and may shift to a high energy level. When the excited laser medium shifts back to a low energy level, light depending on the difference between the energy levels may be emitted.

Windows 10a and 10b may be provided at respective ends of the laser chamber 10. The light generated in the laser chamber 10 may be emitted to the exterior of the laser chamber 10 via the windows 10a and 10b.

3.2 Optical Resonator

The line narrow module 14 may include a prism 14a and a grating 14b. The prism 14a may expand the beam width of the light emitted from the laser chamber 10, and may allow that light to pass through to the grating 14b. Further, the prism 14a may reduce the beam width of light reflected by the grating 14b, and may allow that light to pass through to the laser chamber 10. In addition, the prism 14a may, when allowing light to pass therethrough, refract the light to a different angle in accordance with the wavelength of the light. Accordingly, the prism 14a may also function as a wavelength dispersion element.

The grating 14b may be another wavelength dispersion element. The grating 14b may be configured of a highly-reflective material. Many grooves are formed on the surface of the grating 14b at predetermined intervals. Each groove may, for example, be a triangular groove. The light that enters into the grating 14b from the prism 14a may reflect in multiple directions that are vertical relative to the directions of the respective grooves (the vertical direction in FIG. 2) at the sloped surfaces of those respective grooves. When the reflected light reflected at a given groove overlaps with the reflected light reflected at another given groove, the difference in the optical path lengths between those instances of reflected light depends on the angle of reflection of those instances of reflected light. When the light is of a wavelength that corresponds to the difference in the optical path lengths, the phases of the instances of reflected light may match and may reinforce each other, whereas when the light is of a wavelength that does not correspond to the optical path length, the phases of the instances of reflected light do not match and may weaken each other. Due to this interference effect, light of a specific wavelength or its vicinity may be extracted based on the angle of reflection, and light that contains a large amount of that light of the specific wavelength may be returned to the laser chamber 10 via the prism 14a.

In this manner, the prism 14a and the grating 14b may extract light of a specific wavelength and return that light to the laser chamber 10. Thus, the prism 14a and the grating 14b may constitute the line narrow module 14 which reduces the spectral width of the laser beam.

The surface of the output coupling mirror 15 may be coated with a partially-reflective film. Accordingly, the output coupling mirror 15 may allow some of the light outputted from the laser chamber 10 to pass through, thus outputting that light, and may reflect the remainder of the light and return the reflected light to the laser chamber 10.

The distance between the output coupling mirror 15 and the grating 14b may be set to a distance at which light of a predetermined wavelength outputted from the laser chamber 10 forms a standing wave. Accordingly, an optical resonator may be configured by the line narrow module 14 and the output coupling mirror 15. The light emitted from the laser chamber 10 may travel back and forth between the line narrow module 14 and the output coupling mirror 15, and may be amplified each time it passes between the electrode 11a and the electrode 11b (a laser gain space) in the laser chamber 10. Some of the amplified light may then be outputted as output laser beam via the output coupling mirror 15.

3.3 Various Sensors

The pressure sensor 16 may detect a gas pressure in the laser chamber 10 and output that gas pressure to the gas control device 40. The optical sensor module 17 may include a beam splitter 17a, a focusing optical system 17b, and an optical sensor 17c. The beam splitter 17a may allow the output laser beam that has passed through the output coupling mirror 15 to pass through toward the exposure device 100 at high transmittance, and may reflect some of the output laser beam toward the focusing optical system 17b. The focusing optical system 17b may focus the light reflected by the beam splitter 17a onto a photosensitive surface of the optical sensor 17e. The optical sensor 17c may detect a value regarding pulse energy of the laser beam focused on the photosensitive surface. The optical sensor 17c may output, to the laser control unit 30, data on the pulse energy thus detected.

3.4 Laser Control Unit

The laser control unit 30 may exchange various types of signals with an exposure device controller 110 provided in the exposure device 100. For example, the laser control unit 30 may receive a pulse laser beam output starting signal from the exposure device controller 110. In addition, the laser control unit 30 may send a charging voltage setting signal to the charger 12, an instruction signal for turning the switch on or off to the pulse power module 13, or the like.

The laser control unit 30 may receive data based on the pulse energy from the optical sensor module 17. The laser control unit 30 may refer to the data based on the pulse energy and may control the charging voltage of the charger 12. By controlling the charging voltage of the charger 12, pulse energy of the laser beam may be controlled.

In addition, the laser control unit 30 may count the number of oscillation pulses in the excimer laser apparatus based on data received from the optical sensor module 17. Further, the laser control unit 30 may exchange various types of signals with a gas control unit 47 provided in the gas control device 40. For example, the laser control unit 30 may send, to the gas control unit 47, data of the number of oscillation pulses in the excimer laser apparatus.

3.5 Gas Control Device

The gas control device 40 may be connected to a first receptacle F2 that stores the first laser gas, which contains a halogen gas such as fluorine gas ($F_2$), and to a second receptacle B that stores the second laser gas, which contains a buffer gas. A mixture of argon gas, neon gas, and fluorine gas may be used as the first laser gas. A mixture of argon gas and neon gas may be used as the second laser gas. Valves may be provided at respective outlets of the first receptacle F2 and the second receptacle B. These valves may be open at least while the excimer laser apparatus is operational.

The gas control device 40 may include an exhaust pump 46, and the gas control unit 47. The gas control device 40 may further include various valves and a mass flow controller, which will be described below. The laser chamber 10 may be connected to one end of a first pipe 41. In the first pipe 41, a control valve C-V may be provided. The other end of the first pipe 41 may be connected to a second pipe 42 that is connected to the first receptacle F2, a third pipe 43 that is connected to the second receptacle B, and a fourth pipe 44 that is connected to the exhaust pump 46.

In the second pipe 42, a first laser gas injection valve F2-V that controls the supply of the first laser gas may be provided. The second pipe 42 may branch in two partway. In one branch, a mass flow controller F2-MFC may be provided. In the other branch, a bypass valve F2-V2 may be provided. The bypass valve F2-V2 may be opened only when laser oscillation is stopped and the complete gas replacement is being carried out, and normally closed during laser oscillation. When the first laser gas is supplied to the laser chamber 10 during laser oscillation, the control valve C-V and the first laser gas injection valve F2-V may be opened, and the flow rate of the first laser gas supplied to the laser chamber 10 may be controlled by the mass flow controller F2-MFC.

In the third pipe 43, a second laser gas injection valve B-V that controls the supply of the second laser gas may be provided. The third pipe 43 may branch in two partway. In one branch, a mass flow controller B-MFC may be provided. In the other branch, a bypass valve B-V2 may be provided. The bypass valve B-V2 may be opened only when laser oscillation is stopped and the complete gas replacement is being carried out, and normally closed during laser oscillation. When the second laser gas is supplied to the laser chamber 10 during laser oscillation, the control valve C-V and the second laser gas injection valve B-V may be opened, and the flow rate of the second laser gas supplied to the laser chamber 10 may be controlled by the mass flow controller B-MFC.

In the fourth pipe 44, an exhaust valve EX-V for exhausting gas from within the laser chamber 10 may be provided. In order to exhaust gas from within the laser chamber 10, the exhaust pump 46 may be driven, and the exhaust valve EX-V and the control valve C-V may be opened.

The first laser gas injection valve F2-V, the mass flow controller F2-MFC, the second laser gas injection valve 13-V, and the mass flow controller B-MFC may correspond to a gas supply unit in the present disclosure. The exhaust valve EX-V and the exhaust pump 46 may correspond to a gas exhaust unit in the present disclosure.

The gas control unit 47 may exchange various signals with the laser control unit 30, and may receive data of a gas pressure in the laser chamber 10 from the pressure sensor 16. The gas control unit 47 may control the control valve C-V, the first laser gas injection valve F2-V, the mass flow controller F2-MFC, and so on. The gas control unit 47 may control the second laser gas injection valve B-V, the mass flow controller B-MFC, and so on. The gas control unit 47 may control the bypass valve F2-V2, the bypass valve B-V2, the exhaust valve EX-V, the exhaust pump 46, and so on.

4. Gas Control in the Excimer Laser Apparatus

4.1 Outline of a Gas Control

Figure 3:
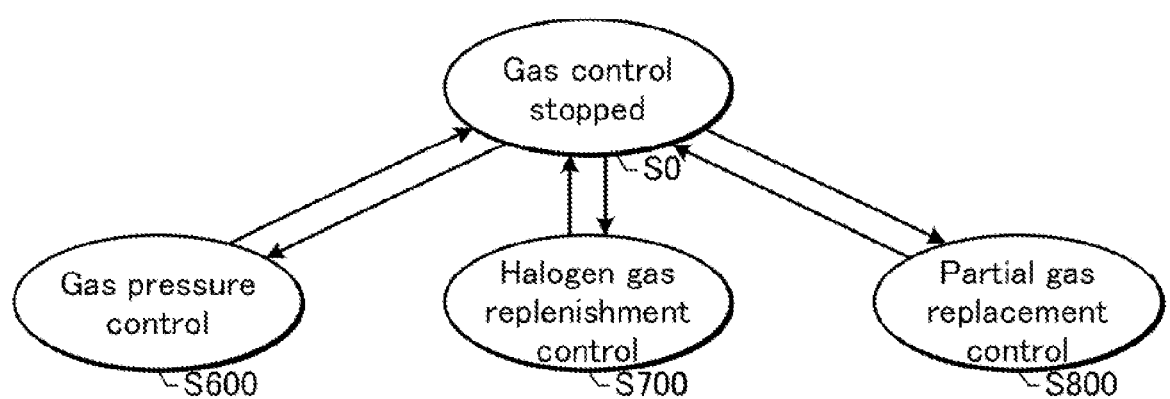
FIG. 3 is a state transition diagram illustrating gas control according to the first embodiment.

FIG. 3 is a state transition diagram illustrating gas control according to the first embodiment. As shown in FIG. 3, the gas control according to the first embodiment may include gas pressure control (S600), halogen gas replenishment control (S700), and partial gas replacement control (S800). A gas control stopped state (S0) may also be included. These gas controls may be carried out by the gas control unit 47 (FIG. 2).

The gas pressure control (S600) may be control on the gas pressure in the laser chamber 10 for adjusting pulse energy of a laser beam. In an excimer laser apparatus, the charging voltage of the charger 12 may be controlled based on data obtained from the optical sensor module 17, in order to maintain the pulse energy of the laser beam at a desired value. For example, the charging voltage by the charger 12 may be increased in the case where the pulse energy of the laser beam tends to decrease due to an influence of impurities in the laser chamber 10 or other operational conditions. However, increasing or decreasing the voltage too much may cause unstable discharges, which in turn may lead to the excimer laser apparatus operating in an unstable manner.

Accordingly, in the gas pressure control, by controlling the gas pressure in the laser chamber 10, desired pulse energy of the laser beam may be obtained, thus making it possible to avoid increasing or decreasing the voltage too much. Specifically, in the case where the charging voltage V is higher than a first threshold value VH, the gas pressure may be increased by supplying the second laser gas to the laser chamber 10. Likewise, in the case where the charging voltage V is lower than a second threshold value VL that is itself lower than the first threshold value VH, the gas pressure may be reduced by partially exhausting the gas from within the laser chamber 10.

The halogen gas replenishment control (S700) may be gas control for restoring a partial pressure of the halogen gas, which has dropped within the laser chamber 10, to a predetermined value. Inert gas contained in the laser gas in the laser chamber 10 is chemically stable. However, the halogen gas, such as fluorine, contained in the laser gas is highly reactive with other materials. The halogen gas may easily turn into impurity or halide upon reacting with, for example, materials of electrodes or other elements in the chamber. Therefore, if laser beam is outputted for a long period of time, the halogen gas in the laser chamber 10 may progressively decrease and a partial pressure of the halogen gas may progressively decrease.

Accordingly, the halogen gas replenishment control may be performed at predetermined intervals. In the halogen gas replenishment control, the first laser gas may be injected into the laser chamber 10, and the same amount (volume) as that injection amount may be exhausted from the laser chamber 10.

The partial gas replacement control (S800) may be gas control for exhausting impurities from the laser chamber 10. When laser beam is outputted over a long period of time from an excimer laser apparatus, concentration of impurities in the laser chamber 10 may rise progressively, and a desired pulse laser beam may not be outputted.

Accordingly, the partial gas replacement control may be performed at predetermined intervals. In the partial gas replacement control, the first laser gas and the second laser gas may be injected into the laser chamber 10, and the same amount (volume) as the total injection amount may be exhausted from the laser chamber 10. Furthermore, the injection amount of the first laser gas and the injection amount of the second laser gas may be calculated so that the partial pressure of the halogen gas in the laser chamber 10 may not change between before and after the partial gas replacement control.

In the case where conditions for the gas pressure control (S600) are in place, the gas control unit 47 (FIG. 2) may perform transition from the gas control stopped state (S0) to the gas pressure control. In the case where the gas pressure control has ended, the gas control unit 47 may perform transition from the gas pressure control to the gas control stopped state.

In the case where conditions for the halogen gas replenishment control (S700) are in place, the gas control unit 47 may perform transition from the gas control stopped state (S0) to the halogen gas replenishment control. In the case where the halogen gas replenishment control has ended, the gas control unit 47 may perform transition from the halogen gas replenishment control to the gas control stopped state.

In the case where conditions for the partial gas replacement control (S800) are in place, the gas control unit 47 may perform transition from the gas control stopped state (S0) to the partial gas replacement control. In the case where the partial gas replacement control has ended, the gas control unit 47 may perform transition from the partial gas replacement control to the gas control stopped state.

4.2 Main Flow

Figure 4:
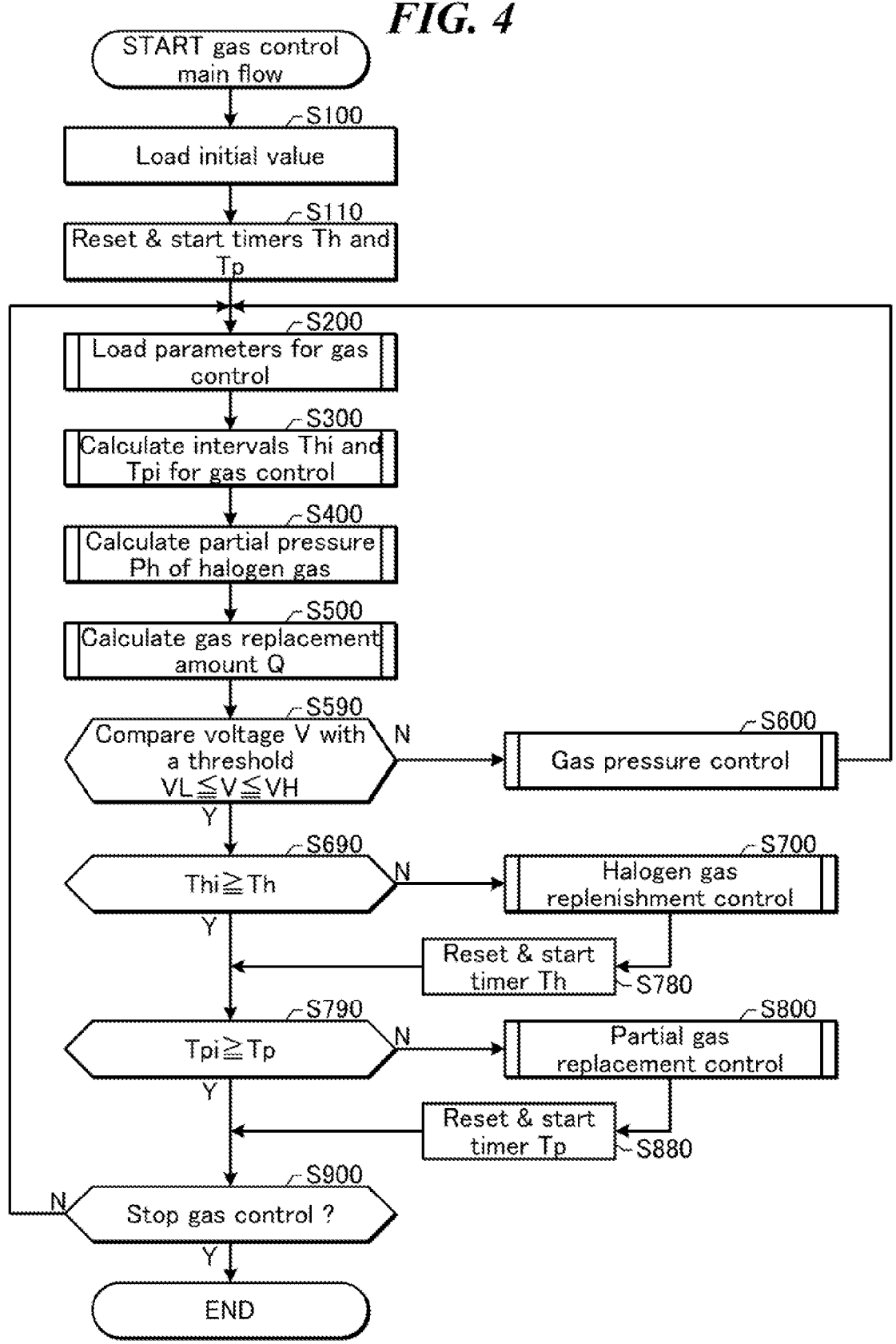
FIG. 4 is a flowchart illustrating the gas control according to the first embodiment.

FIG. 4 is a flowchart illustrating the gas control according to the first embodiment. The process shown in FIG. 4 may be carried out by the gas control unit 47 (FIG. 2). The process shown in FIG. 4 may include the gas pressure control (S600), the halogen gas replenishment control (S700), and the partial gas replacement control (S800).

First, the gas control unit 47 may load initial values required for the gas control (S100). These initial values may include, for example, various types of proportionality constants, threshold values used for control, and so on. The proportionality constants may, for example, be a, b, c, g, h, k, and so on as mentioned later. The threshold values may be the first threshold value VH, the second threshold value VL, and so on, also mentioned later. Time measurement by timers Th and Tp may be started as well (S110).

Next, the gas control unit 47 may load various gas control parameters (S200). The gas control parameters may include the voltage V, a duty D, and a gas pressure P. The voltage V may be a charging voltage of the charger 12, and the voltage V may be received from the laser control unit 30. The duty D may be a ratio of a repetition rate of laser beam relative to a maximum value, and the duty D may be received from the laser control unit 30. The gas pressure P may be a gas pressure in the laser chamber 10, and the gas pressure P may be received from the pressure sensor 16.

Next, the gas control unit 47 may calculate a time interval Thi for the halogen gas replenishment control and a time interval Tpi for the partial gas replacement control (S300). Details of this calculation process will be provided later.

Next, the gas control unit 47 may calculate a partial pressure Ph of the halogen gas in the laser chamber 10 (S400). Details of this calculation process will be provided later.

Next, the gas control unit 47 may calculate a gas replacement amount Q used in the partial gas replacement control (S500). Details of this calculation process will be provided later.

Next, the gas control unit 47 may compare the charging voltage V of the charger 12 with the first threshold value VH and the second threshold value VL (S590). In the case where the charging voltage V is not within the range from the first threshold value VH to the second threshold value VL (V<VL or VH<V), the gas control unit 47 may determine that the conditions for the gas pressure control are in place, and may then carry out the gas pressure control (S600). Details of the gas pressure control will be given later. When the gas pressure control has ended, the process may return to the aforementioned S200, and various parameters may be loaded. In the gas pressure control, as will be discussed later, there are cases where the partial pressure Ph of the halogen gas drops during control for reducing the gas pressure. Therefore, by returning to the aforementioned S200, the partial pressure Ph of the halogen gas may be recalculated and the halogen gas replenishment control and the like may be carried out properly.

In the case where the charging voltage V is within the range from the first threshold value VH to the second threshold value VL (VL≤V≤VH), the gas control unit 47 may compare the timer Th with the time interval Thi of the halogen gas replenishment control (S690). In the case where the timer Th has reached the time interval Thi of the halogen gas replenishment control (Thi<Th), the gas control unit 47 may determine that the conditions for halogen gas replenishment control are in place, and may carry out the halogen gas replenishment control (S700). Details of the halogen gas replenishment control will be given later. When the halogen gas replenishment control has ended, the timer Th may be reset and restarted (S780).

In the case where the timer Th has not reached the time interval Thi of the halogen gas replenishment control (Thi≥Th), or where the timer Th has been reset (S780), the gas control unit 47 may compare the timer Tp with the time interval Tpi of the partial gas replacement control (S790). In the case where the timer Tp has reached the time interval Tpi of the partial gas replacement control (Tpi<Tp), the gas control unit 47 may determine that the conditions for the partial gas replacement control are in place, and may carry out the partial gas replacement control (S800). Details of the partial gas replacement control will be given later. When the partial gas replacement control has ended, the timer Tp may be reset and restarted (S880).

In the case where the timer Tp has not reached the time interval Tpi of the partial gas replacement control (Tpi≥Tp), or where the timer Tp has been reset (S880), the gas control unit 47 may determine whether or not to stop the gas control (S900). The determination as to whether or not to stop the gas control may be carried out based on whether or not the gas control unit 47 has received a stop signal from the laser control unit 30. In the case where the gas control is to be stopped (S900; YES), the process illustrated in this flowchart may end. However, in the case where the gas control is not to be stopped (S900; NO), the process may return to the aforementioned S200, and various parameters may be loaded.

4.3 Voltage Control by a Laser Control Unit

Figure 5:
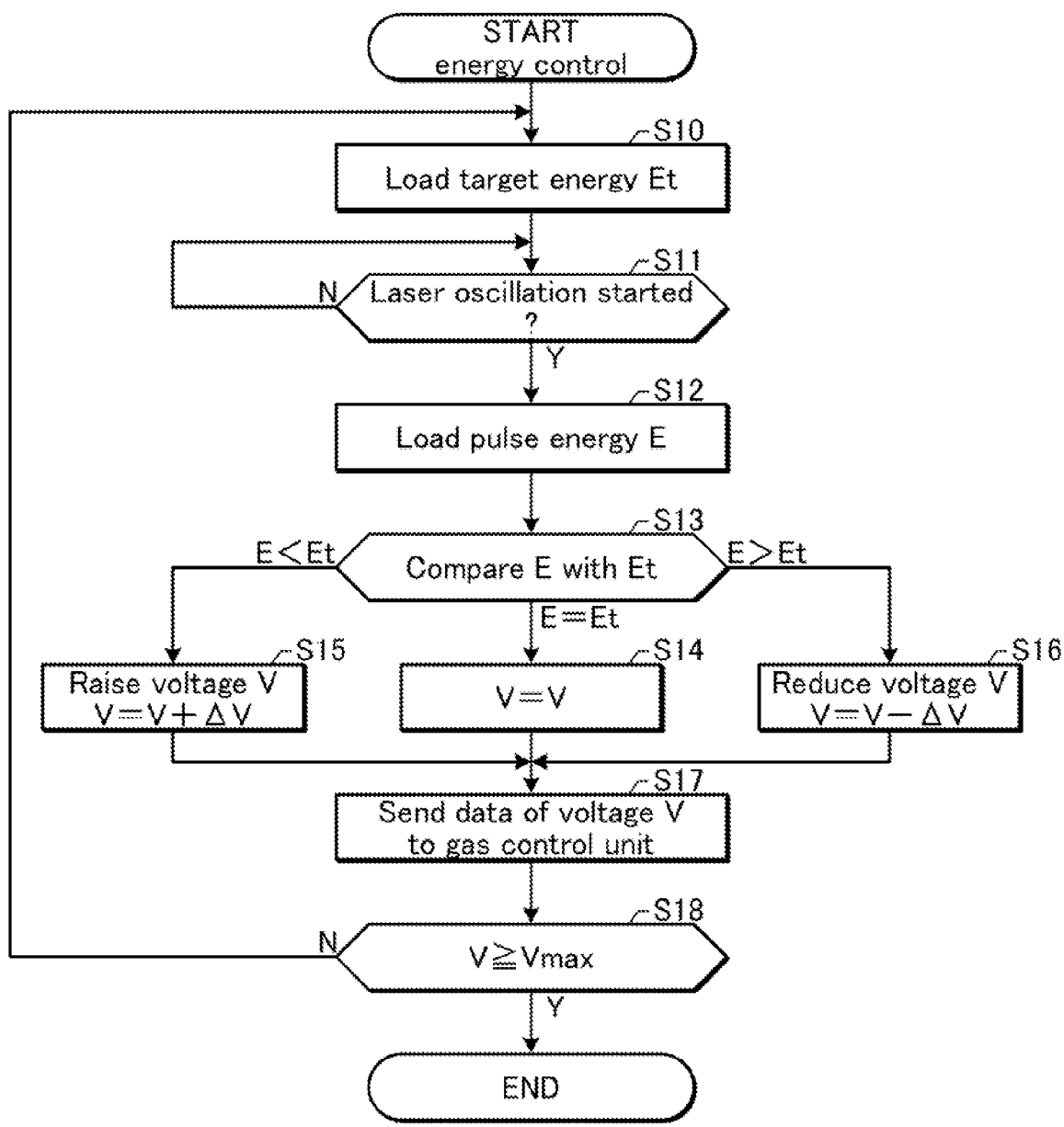
FIG. 5 is a flowchart illustrating control of a voltage applied between electrodes according to the first embodiment.

FIG. 5 is a flowchart illustrating control of a voltage applied between electrodes according to the first embodiment. The process shown in FIG. 5 may be carried out by the laser control unit 30 (FIG. 2) independently from the gas control shown in FIG. 4. In the process shown in FIG. 5, the charging voltage of the charger 12 may be controlled based on data obtained from the optical sensor module 17, in order to maintain pulse energy of the laser beam at a desired value. Although the process shown in FIG. 5 is carried out separately from the gas control shown in FIG. 4, however, descriptions are presented below as they may constitute a background of the gas control.

First, the laser control unit 30 may load a value of a target pulse energy Et for the laser beam (S10). The value of the target pulse energy Et may, for example, be a value required by the exposure device controller 100.

Next, the laser control unit 30 may determine whether or not laser oscillation has been started (S11). Whether or not the laser oscillation has been started may be determined based on whether or not the laser control unit 30 has sent various signals for laser oscillation to the charger 12 and the pulse power module 13. Alternatively, whether or not the laser oscillation has been started may be determined based on whether or not the laser control unit 30 has received data of pulse energy E from the optical sensor module 17.

Next, the laser control unit 30 may load a value of the pulse energy E of the laser beam (S12). The value of the pulse energy E may be a value received from the optical sensor module 17.

Next, the laser control unit 30 may compare the value of the pulse energy E of the laser beam with the value of the target pulse energy Et of the laser beam (S13).

In the case where the value of the pulse energy E is equal to the value of the target pulse energy Et (E=Et), the laser control unit 30 may hold the charging voltage V of the charger 12 at a present value of the charging voltage V (S14: V=V).

In the case where the value of the pulse energy E is less than the value of the target pulse energy Et (E<Et), the laser control unit 30 may increase the charging voltage V of the charger 12 to a value in which a predetermined change amount ΔV has been added to the present value of the charging voltage V (S15: V=V+ΔV). Through this, the pulse energy E may be raised and brought closer to the target pulse energy Et.

Meanwhile, in the case where the value of the pulse energy E is greater than the value of the target pulse energy Et (E>Et), the laser control unit 30 may reduce the charging voltage V of the charger 12 to a value in which the predetermined change amount ΔV has been subtracted from the present value of the charging voltage V (S16: V=V−ΔV). Through this, the pulse energy E may be reduced and brought closer to the target pulse energy Et.

When the control of the charging voltage V shown in one of S14 through S16 has ended, the laser control unit 30 may send data of the charging voltage V to the gas control unit 47 (S17). Through this, the gas control unit 47 may determine (S590) whether or not the conditions for the gas pressure control (S600) shown in FIG. 4 are in place.

Next, the laser control unit 30 may determine whether or not the charging voltage V is greater than or equal to an upper limit value Vmax (S18). In the case where the charging voltage V is greater than or equal to the upper limit value Vmax (V≥Vmax), an efficiency to generate the laser beam may be poor and it may be necessary to stop the laser oscillation and perform maintenance (for example, the complete gas replacement or the like), and thus the process of this flowchart may be ended. In the case where the charging voltage V is not greater than or equal to the upper limit value Vmax (V<Vmax), the process may return to the aforementioned S10, where the pulse energy E is stabilized by controlling the charging voltage V and the data of the charging voltage V is sent to the gas control unit 47.

4.4 Calculation of a Duty by the Laser Control Unit

Figure 6:
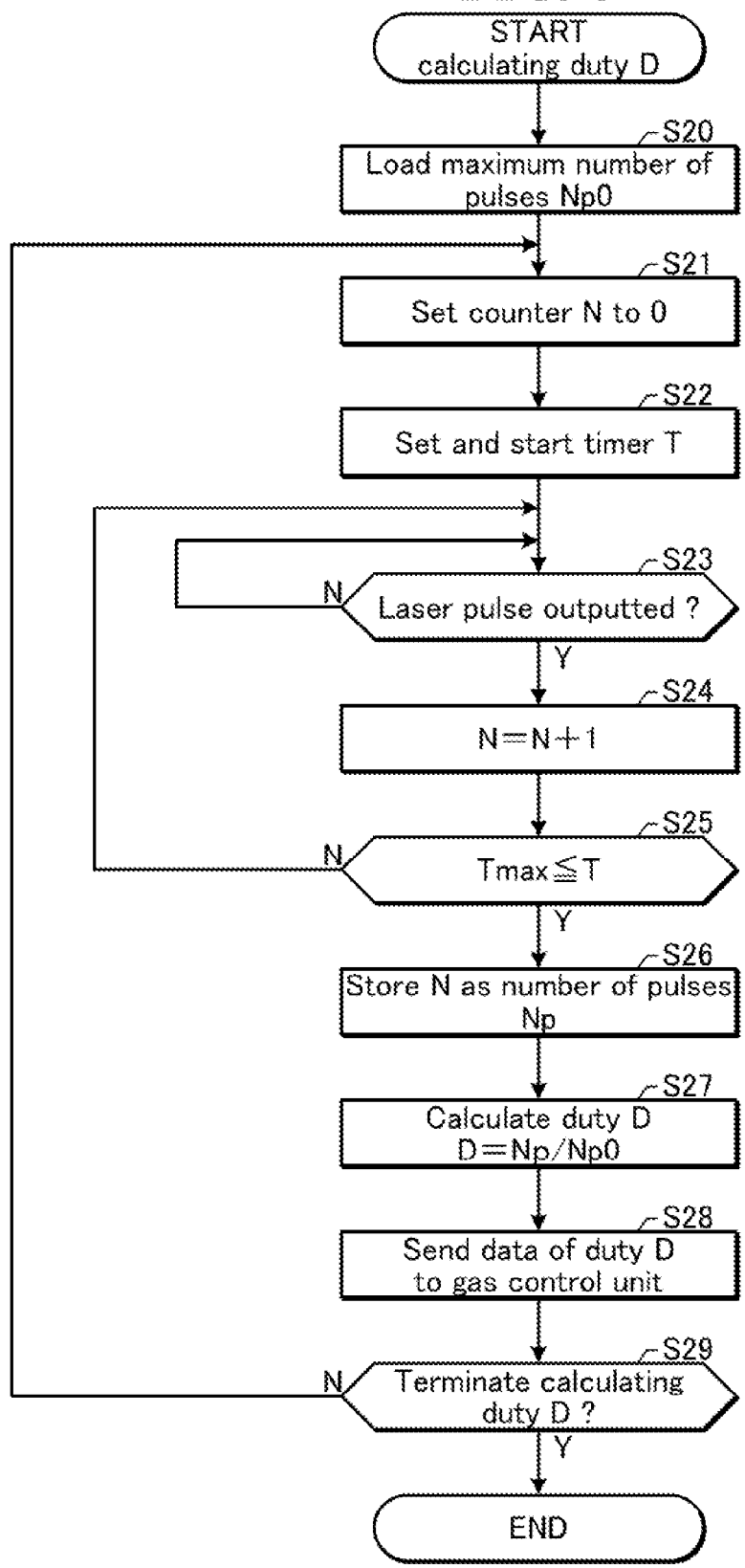
FIG. 6 is a flowchart illustrating a calculation of a duty of the excimer laser apparatus according to the first embodiment.

FIG. 6 is a flowchart illustrating a calculation of a duty of the excimer laser apparatus according to the first embodiment. The process shown in FIG. 6 may be carried out by the laser control unit 30 (FIG. 2) independently from the gas control shown in FIG. 4. In the process shown in FIG. 6, a ratio of a repetition rate during laser oscillation relative to a maximum repetition rate of the excimer laser apparatus may be calculated as a duty D. Although the process shown in FIG. 6 is carried out separately from the gas control shown in FIG. 4, however, descriptions are presented below as they may constitute a background of the gas control.

First, the laser control unit 30 may load the number of pulses Np0 in a set amount of time Tmax for the case where the excimer laser apparatus oscillates at the maximum repetition rate (S20).

Next, the laser control unit 30 may set a counter N for counting the number of pulses of the laser beam to 0 (S21).

Next, the laser control unit 30 may set a timer T for measuring the number of pulses of the laser beam in a set amount of time, and start the measurement (S22).

Next, the laser control unit 30 may determine whether or not a laser pulse has been outputted (S23). The laser pulse may be a single pulse of the laser beam. The determination as to whether or not a laser pulse has been outputted may, for example, be carried out based on whether not the laser control unit 30 has received data of the pulse energy E from the optical sensor module 17. If the laser pulse has not been outputted (S23; NO), the determination may be repeated until the laser pulse is outputted.

If the laser pulse has been outputted (S23; YES), the laser control unit 30 may add 1 to the counter N (S24).

Next, the laser control unit 30 may determine whether or not the timer T has reached the set amount of time Tmax (S25). In the case where the timer T has not reached the set amount of time Max (Tmax>T), the process may return to the aforementioned S23, and the number of pulses may be measured by the counter N until the timer T reaches the set amount of time Tmax.

In the case where the timer T has reached the set amount of time Tmax (Tmax≤T), the laser control unit 30 may store the value of the counter N into a storage device as the number of pulses Np in the set amount of time Tmax (S26).

Next, the laser control unit 30 may calculate a value of (Np/Np0) as the duty D (S27). In the case where the value of the duty D is the maximum value of 1, this may indicate that the excimer laser apparatus is oscillating at the maximum repetition rate. The laser control unit 30 may send the value of the duty D to the gas control unit 47 (S28).

Next, the laser control unit 30 may determine whether or not to stop the calculation of the duty D (S29). In the case where the calculation is to be stopped, the process illustrated in this flowchart may end. In the case where the calculation is not to be stopped, the process may return to the aforementioned S21.

4.5 Calculation of Deterioration Parameters of Electrodes

4.5.1 Calculation of the Total Number of Pulses of the Laser Chamber

Figure 7:
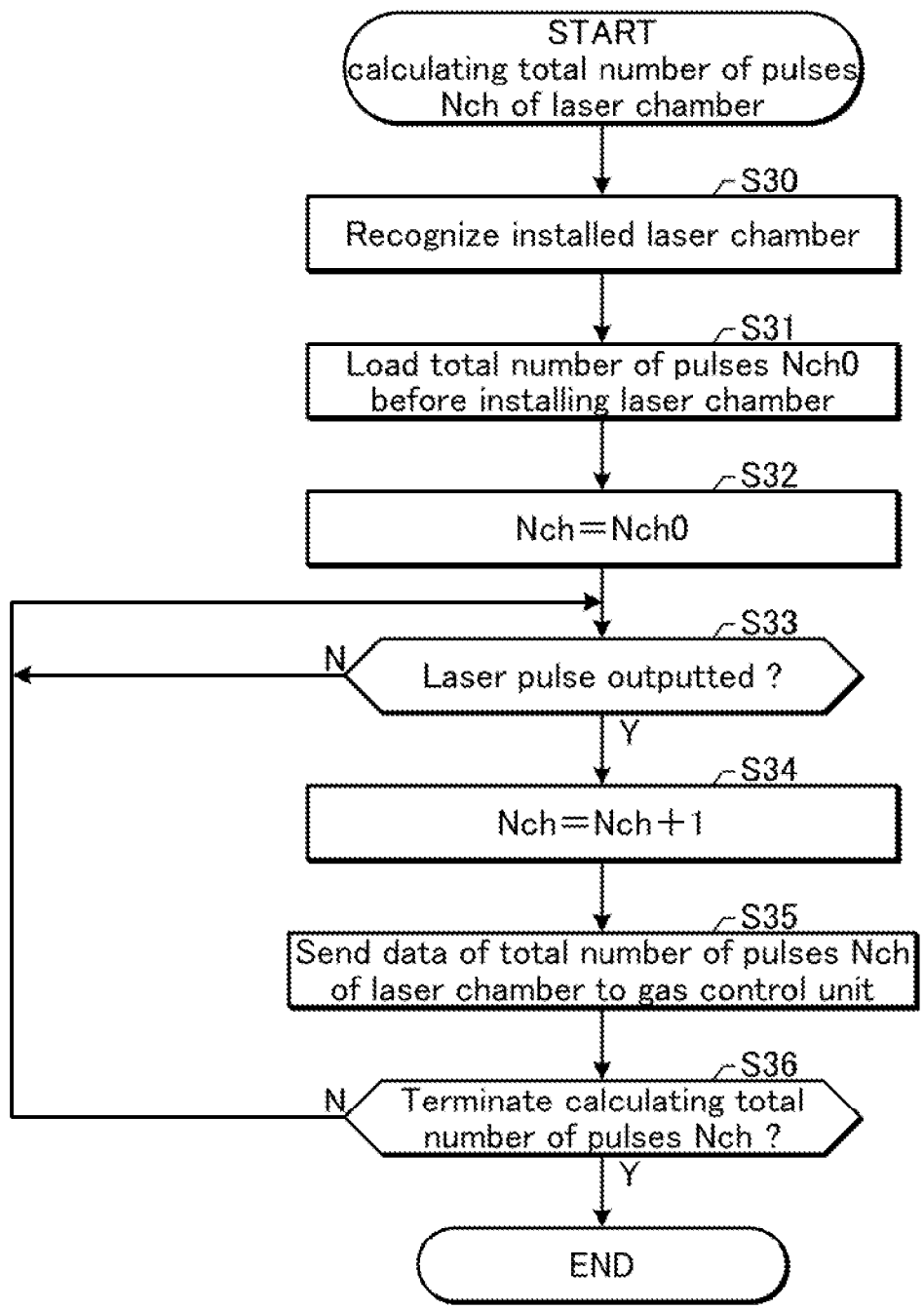
FIG. 7 is a flowchart illustrating a calculation of the total number of pulses of the laser chamber according to the first embodiment.

FIG. 7 is a flowchart illustrating a calculation of the total number of pulses Nch of the laser chamber according to the first embodiment. The process shown in FIG. 7 may be carried out by the laser control unit 30 (FIG. 2) independently from the gas control shown in FIG. 4. The total number of pulses Nch of the laser chamber may be the total number of pulses of the pulse voltage supplied between the pair of electrodes 11a and 11b after the pair of electrodes were installed in the laser chamber. Although the process shown in FIG. 7 is carried out separately from the gas control shown in FIG. 4, however, descriptions are presented below as they may constitute a background of the gas control.

First, when a laser chamber 10 is installed, the laser control unit 30 may recognize the laser chamber (S30). Recognizing the laser chamber may include reading out a code identifying the laser chamber.

Next, the laser control unit 30 may load data showing the total number of pulses Nch0 generated before the laser chamber 10 was installed (S31). In the case where the laser chamber 10 had been used in another place before the laser chamber was installed, or in the case where the laser chamber had been under an operation test, the total number of pulses Nch0 generated before the laser chamber 10 was installed may be larger than 0. The data of the total number of pulses Nch0 generated before the laser chamber 10 was installed may be stored in a storage device with the code identifying the laser chamber. Alternatively, Nch0 may be inputted by a user.

Next, the laser control unit 30 may set the total number of pulses Nch of the laser chamber to Nch0 (S32).

Next, the laser control unit 30 may determine whether or not a laser pulse has been outputted (S33). The laser pulse may be a single pulse of the laser beam. The determination as to whether or not the laser pulse has been outputted may, for example, be carried out based on whether or not the laser control unit 30 has received data of the pulse energy E from the optical sensor module 17. If the laser pulse has not been outputted (S33; NO), the determination may be repeated until the laser pulse is outputted.

If the laser pulse has been outputted (S33; YES), the laser control unit 30 may add 1 to the total number of pulses Nch of the laser chamber (S34).

Next, the laser control unit 30 may send the value of the total number of pulses Nch of the laser chamber to the gas control unit 47 (S35). The total number of pulses Nch of the laser chamber may represent a degree of deterioration of the pair of electrodes 11a and 11b.

Next, the laser control unit 30 may determine whether not the calculation of the total number of pulses Nch of the laser chamber is to be terminated (S36). If the calculation is to be terminated, the process illustrated in this flowchart may end. For example, if the life period of the laser chamber 10 is expired and the laser chamber is to be exchanged, the calculation may end. If the calculation is not to be terminated, the process may return to the aforementioned S33.

Figure 8:
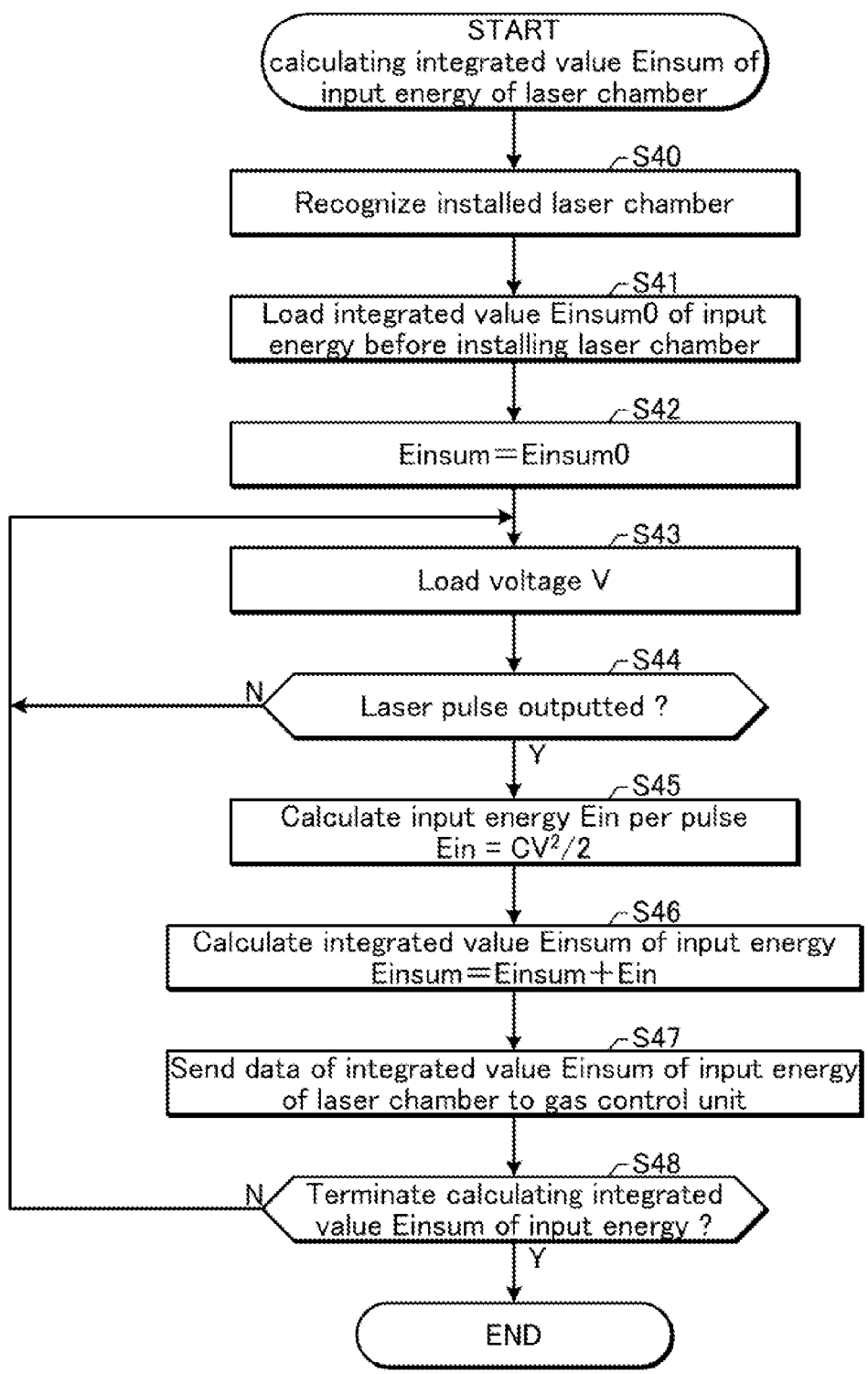
FIG. 8 is a flowchart illustrating a calculation of an integrated value of input energy of the laser chamber according to the first embodiment.

4.5.2 Calculation of an Integrated Value of Input Energy of the Laser Chamber FIG. 8 is a flowchart illustrating a calculation of an integrated value Einsum of input energy of the laser chamber according to the first embodiment. The process shown in FIG. 8 may be carried out by the laser control unit 30 (FIG. 2) independently from the gas control shown in FIG. 4. The integrated value Einsum of input energy of the laser chamber may be an integrated value of energy inputted between the pair of electrodes 11a and 11b after the pair of electrodes were installed in the laser chamber. Although the process shown in FIG. 8 is carried out separately from the gas control shown in FIG. 4, however, descriptions are presented below as they may constitute a background of the gas control.

First, when a laser chamber 10 is installed, the laser control unit 30 may recognize the laser chamber (S40).

Recognizing the laser chamber may include reading out a code identifying the laser chamber.

Next, the laser control unit 30 may load data showing an integrated value Einsum0 of input energy inputted before the laser chamber 10 was installed (S41). In the case where the laser chamber 10 had been used in another place before the laser chamber was installed, or in the case where the laser chamber had been under an operation test, the value of Einsum0 may be larger than 0. The data showing the integrated value Einsum0 of input energy inputted before the laser chamber 10 was installed may be stored in a storage device with the code identifying the laser chamber. Alternatively, Einsum0 may be inputted by a user.

Next, the laser control unit 30 may set the integrated value Einsum of input energy of the laser chamber to Einsum0 (S42).

Next, the laser control unit 30 may load data of the charging voltage V of the charger 12 (S43). The charging voltage V of the charger 12 may be a charging voltage set by the laser control unit 30.

Next, the laser control unit 30 may determine whether or not a laser pulse has been outputted (S44). The laser pulse may be a single pulse of the laser beam. The determination as to whether or not a laser pulse has been outputted may, for example, be carried out based on whether or not the laser control unit 30 has received data of the pulse energy E from the optical sensor module 17. If the laser pulse has not been outputted (S44; NO), the process may return to the aforementioned S43.

If the laser pulse has been outputted (S44; YES), the laser control unit 30 may calculate energy Ein per pulse (S45). The energy Ein per pulse may be calculated by the following formula.

$$Ein = CV^2/2$$

Here, V may be the charging voltage of the charger 12. C may be a value C obtained by the following formula.

$$C = t \cdot C_0$$

where $C_0$ is a capacity of a main capacitor C0 described with reference to FIG. 57, and t is a transfer efficiency of energy in the pulse power module 13.

Next, the laser control unit 30 may update the integrated value Einsum of input energy of the laser chamber in the following formula (S46).

$$Einsum = Einsum + Ein$$

Next, the laser control unit 30 may send the integrated value Einsum of input energy of the laser chamber to the gas control unit 47 (S47). The integrated value Einsum of input energy of the laser chamber may represent a degree of deterioration of the pair of electrodes 11a and 11b.

Next, the laser control unit 30 may determine whether or not the calculation of the integrated value Einsum of input energy is to be terminated (S48). If the calculation is to be terminated, the process illustrated in this flowchart may end. For example, if the life period of the laser chamber 10 is expired and the laser chamber is to be exchanged, the calculation may end. If the calculation is not to be terminated, the process may return to the aforementioned S43.

4.5.3 Calculation of a Stability of Pulse Energy of a Laser Beam

Figure 9:
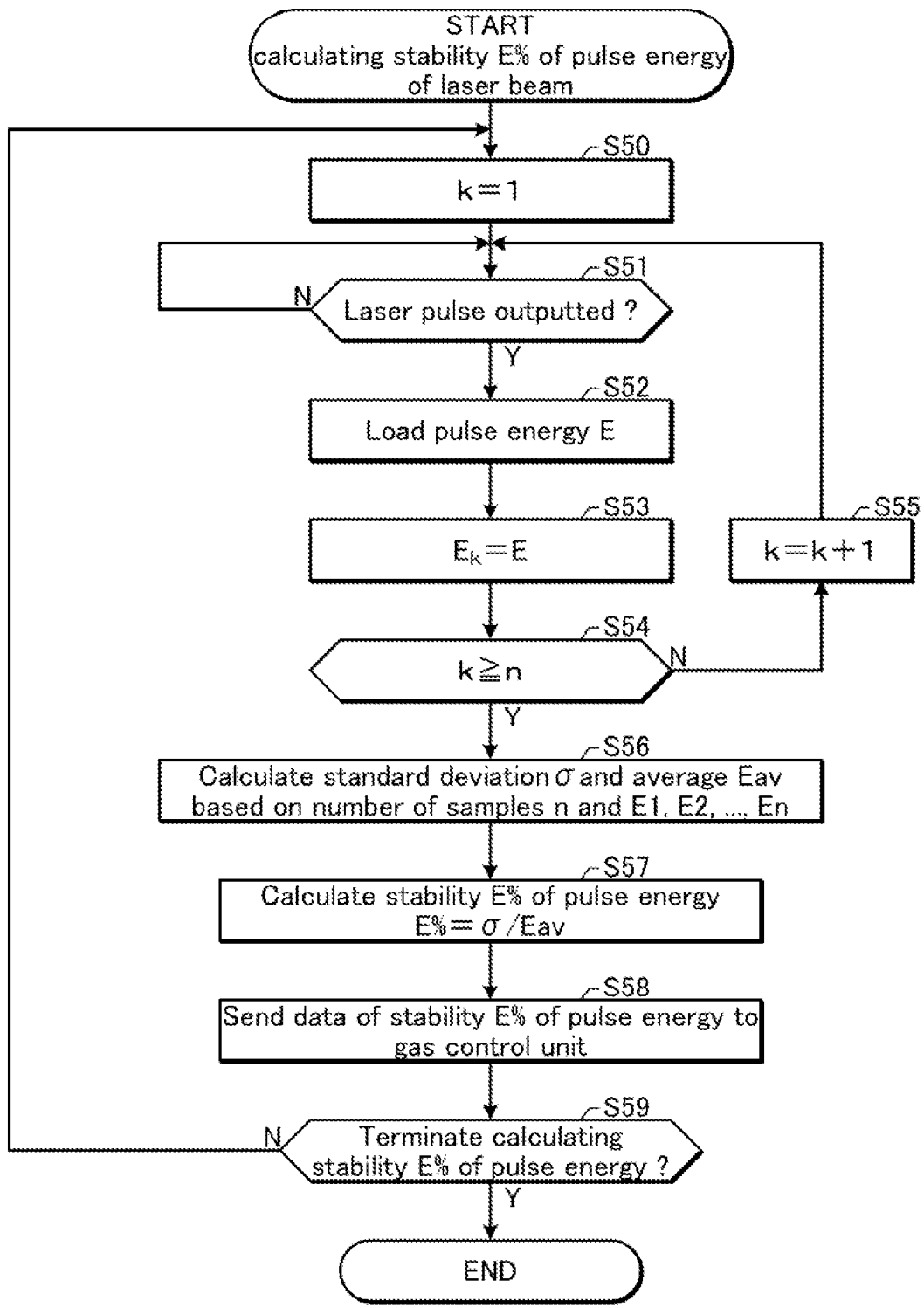
FIG. 9 is a flowchart illustrating a calculation of a stability of pulse energy of a laser beam according to the first embodiment.

FIG. 9 is a flowchart illustrating a calculation of a stability E % of pulse energy of a laser beam according to the first embodiment. The process shown in FIG. 9 may be carried out by the laser control unit 30 (FIG. 2) independently from the gas control shown in FIG. 4. The stability E % of the pulse energy of the laser beam may be calculated based on the pulse energy E received from the optical sensor module 17. Although the process shown in FIG. 9 is carried out separately from the gas control shown in FIG. 4, however, descriptions are presented below as they may constitute a background of the gas control.

First, the laser control unit 30 may set a counter k to 1 (S50). The counter k may be a positive integer.

Next, the laser control unit 30 may determine whether or not a laser pulse has been outputted (S51). The laser pulse may be a single pulse of the laser beam. The determination as to whether or not a laser pulse has been outputted may, for example, be carried out based on whether or not the laser control unit 30 has received data of the pulse energy E from the optical sensor module 17. If the laser pulse has not been outputted (S51; NO), the determination may be repeated until the laser pulse is outputted.

If the laser pulse has been outputted (S51; YES), the laser control unit 30 may load the value of pulse energy E received from the optical sensor module 17 (S52).

Next, the laser control unit 30 may store the value of the pulse energy E as pulse energy Ek in the storage device (S53).

Next, the laser control unit 30 may determine whether the value of the counter k has reached a predetermined number of samples n (S54). The number of samples n may be equal to the number of values of pulse energy E for calculating the stability E % of the pulse energy of the laser beam. The number of samples n may, for example, be equal to or more than 30 and equal to or less than 100.

If the value of the counter k has not been reached n (S54; NO), the laser control unit 30 may add 1 to the value of the counter k (S55), and the process may return to the aforementioned S51.

If the value of the counter k has been reached n (S54; YES), the laser control unit 30 may proceed to a process of S56.

At S56, the laser control unit 30 may calculate a standard deviation σ of the values of the pulse energy and an average value Eav of the values of the pulse energy based on the number of samples n and the values of pulse energy Ek (k=1, 2, . . . n).

Next, the laser control unit 30 may calculate the stability E % of the pulse energy of the laser beam by the following formula (S57).

$$E\% = \sigma/Eav$$

Next, the laser control unit 30 may send the value of the stability E % of the pulse energy of the laser beam to the gas control unit 47 (S58). The stability E % of the pulse energy of the laser beam may represent a degree of deterioration of the pair of electrodes 11a and 11b.

Next, the laser control unit 30 may determine whether or not the calculation of the stability E % of the pulse energy of the laser beam is to be terminated (S59). If the calculation is to be terminated, the process illustrated in this flowchart may end. For example, if the life period of the laser chamber 10 is expired and the laser chamber is to be exchanged, the calculation may end. If the calculation is not to be terminated, the process may return to the aforementioned S50.

Figure 10:
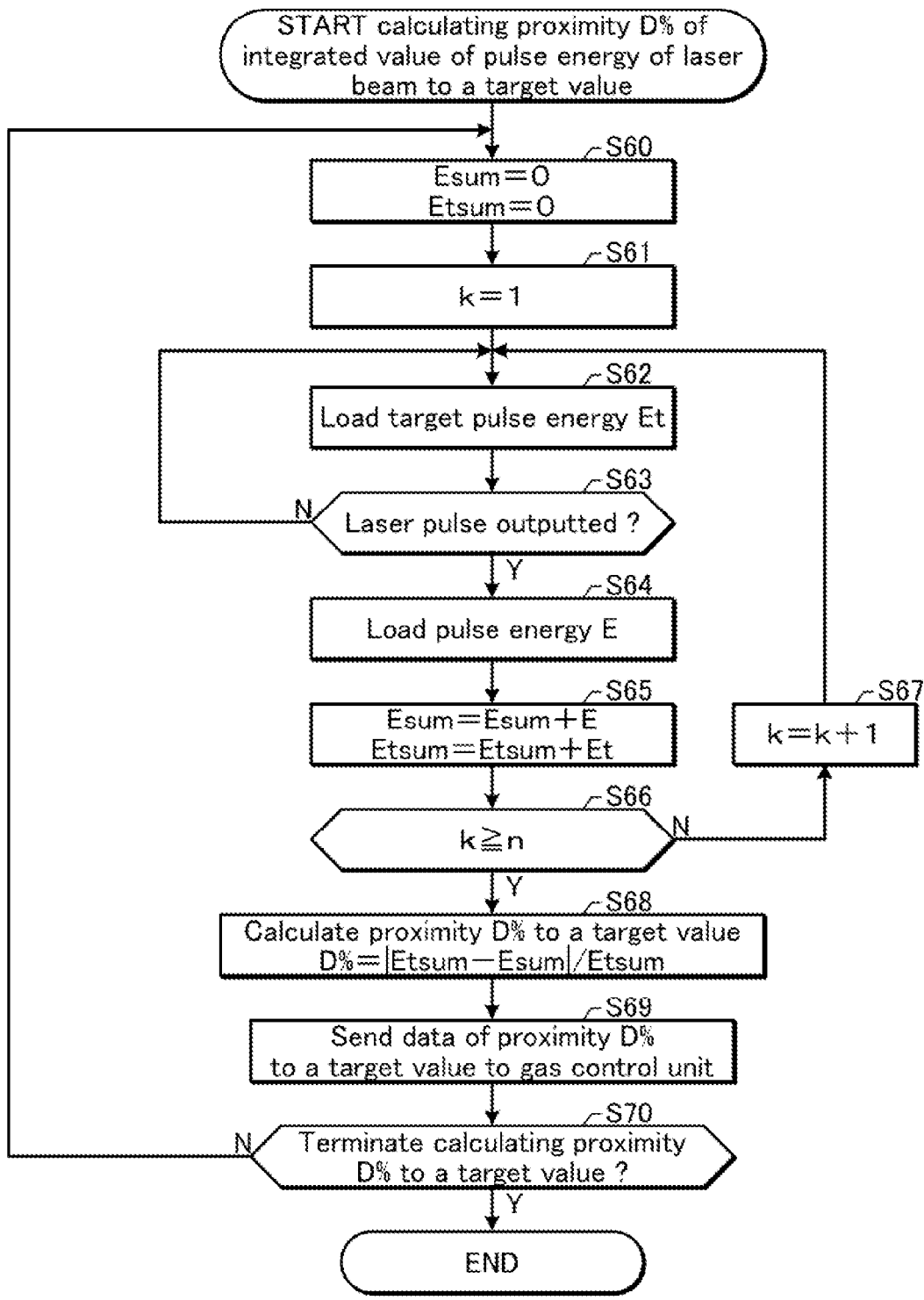
FIG. 10 is a flowchart illustrating a calculation of a proximity of pulse energy of the laser beam to a target value according to the first embodiment.

4.5.4 Calculation of a Proximity of the Pulse Energy of the Laser Beam to a Target Value FIG. 10 is a flowchart illustrating a calculation of a proximity D % of pulse energy of the laser beam to a target value according to the first embodiment. The process shown in FIG. 10 may be carried out by the laser control unit 30 (FIG. 2) independently from the gas control shown in FIG.

4. The proximity D % of the pulse energy of the laser beam to the target value may be calculated based on the pulse energy E received from the optical sensor module 17. Although the process shown in FIG. 10 is carried out separately from the gas control shown in FIG. 4, however, descriptions are presented below as they may constitute a background of the gas control.

First, the laser control unit 30 may set each of a value of a variable Esum and a value of a variable Etsum to an initial value 0 (S60).

Next, the laser control unit 30 may set a counter k to 1 (S61). The counter k may be a positive integer.

Next, the laser control unit 30 may load a value of target pulse energy Et (S62).

Next, the laser control unit 30 may determine whether or not a laser pulse has been outputted (S63). The laser pulse may be a single pulse of the laser beam. The determination as to whether or not a laser pulse has been outputted may, for example, be carried out based on whether or not the laser control unit 30 has received data of the pulse energy E from the optical sensor module 17. If the laser pulse has not been outputted (S63; NO), the process may return to the aforementioned S62.

If the laser pulse has been outputted (S63; YES), the laser control unit 30 may load a value of the pulse energy E received from the optical sensor module 17 (S64).

Next, the laser control unit 30 may update a value of the variable Esum and a value of the variable Etsum by the following formula (S65).

$$E\text{sum} = E\text{sum} + E$$

$$Et\text{sum} = Et\text{sum} + Et$$

Next, the laser control unit 30 may determine whether a value of the counter k has reached a predetermined number of samples n (S66). The number of samples n may, for example, be equal to or more than 30 and equal to or less than 100.

If the value of the counter k has not been reached n (S66; NO), the laser control unit 30 may add 1 to the value of the counter k (S67), and the process may return to the aforementioned S62.

If the value of the counter k has been reached n (S66; YES), the laser control unit 30 may proceed to a process of S68.

At S68, the laser control unit 30 may calculate the proximity D % of the pulse energy of the laser beam to the target value based on the value of the variable Esum and the value of the variable Etsum by the following formula.

$$D\% = |Et\text{sum} - E\text{sum}| / Et\text{sum}$$

Next, the laser control unit 30 may send the value of the proximity D % of the pulse energy of the laser beam to the target value to the gas control unit 47 (S69). The proximity D % of the pulse energy of the laser beam to the target value may represent a degree of deterioration of the pair of electrodes 11a and 11b.

Next, the laser control unit 30 may determine whether or not the calculation of the proximity D % of the pulse energy of the laser beam to the target value is to be terminated (S70). If the calculation is to be terminated, the process illustrated in this flowchart may end. For example, if the life period of the laser chamber 10 is expired and the laser chamber is to be exchanged, the calculation may end. If the calculation is not to be terminated, the process may return to the aforementioned S60.

4.5.5 Calculation of the Number of Pulses after a Complete Gas Replacement

Figure 11:
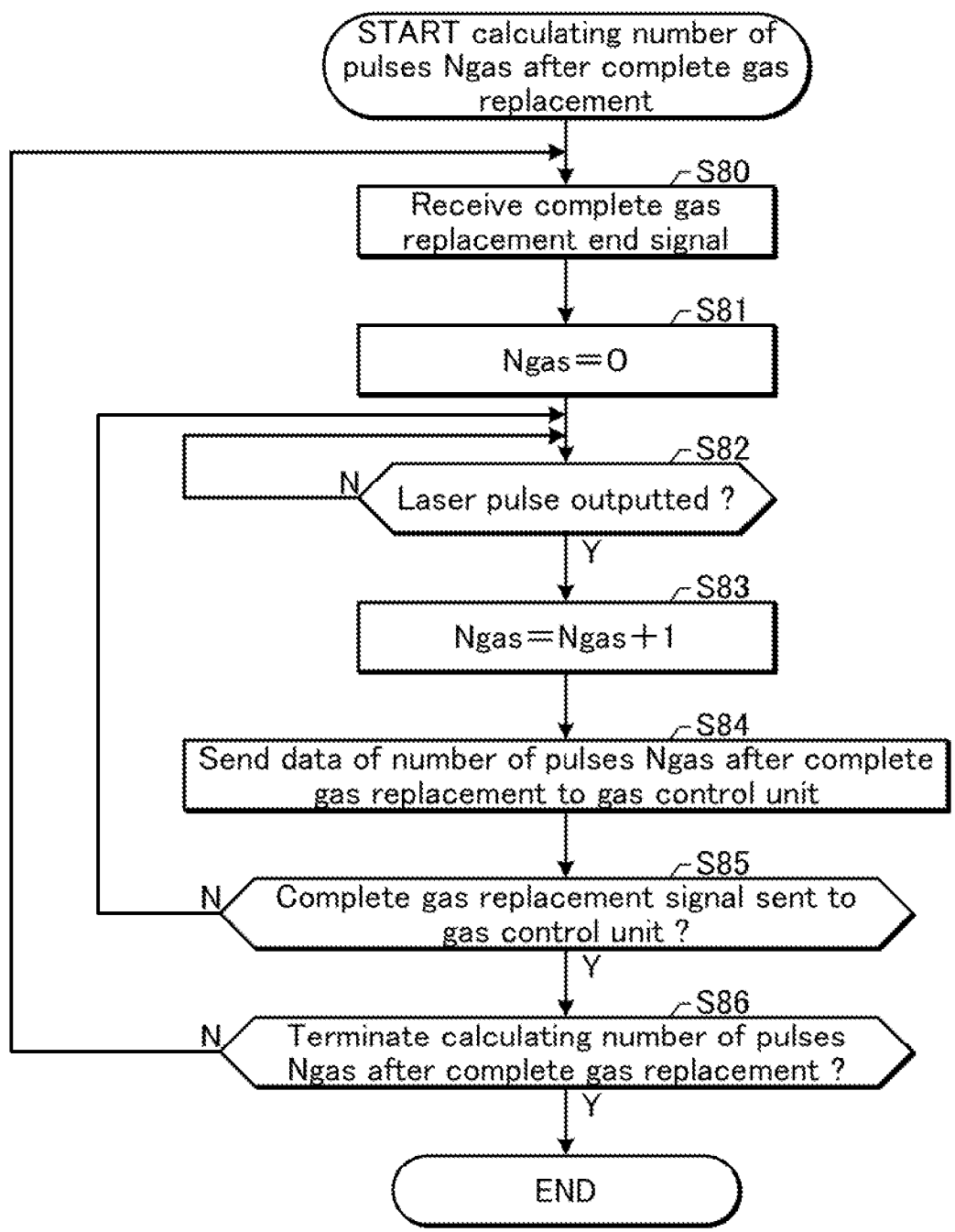
FIG. 11 is a flowchart illustrating a calculation of the number of pulses after a complete gas replacement according to the first embodiment.

FIG. 11 is a flowchart illustrating a calculation of the number of pulses Ngas after a complete gas replacement according to the first embodiment. The process shown in FIG. 11 may be carried out by the laser control unit 30 (FIG. 2) independently from the gas control shown in FIG. 4. The number of pulses Ngas after a complete gas replacement may be the number of voltage pulses supplied between the pair of electrodes after stopping laser oscillation of the laser chamber and performing the complete gas replacement. Although the process shown in FIG. 11 is carried out separately from the gas control shown in FIG. 4, however, descriptions are presented below as they may constitute a background of the gas control.

First, the laser control unit 30 may receive an end signal representing that the complete gas replacement has ended (S80). The end signal may be sent from the gas control unit 47.

Next, the laser control unit 30 may set a value of the number of pulses Ngas after the complete gas replacement to 0 (S81).

Next, the laser control unit 30 may determine whether or not a laser pulse has been outputted (S82). The laser pulse may be a single pulse of the laser beam. The determination as to whether or not a laser pulse has been outputted may, for example, be carried out based on whether or not the laser control unit 30 has received data of the pulse energy E from the optical sensor module 17. If the laser pulse has not been outputted (S82; NO), the determination may be repeated until the laser pulse is outputted.

If the laser pulse has been outputted (S82; YES), the laser control unit 30 may add 1 to the number of pulses Ngas after the complete gas replacement (S83).

Next, the laser control unit 30 may send the value of the number of pulses Ngas after the complete gas replacement to the gas control unit 47 (S84). The number of pulses Ngas after complete gas replacement may not directly represent a degree of deterioration. However, the number of pulses Ngas after complete gas replacement may be used for convenience, instead of the total number of pulses Nch of the laser chamber described in reference to FIG. 7.

Next, the laser control unit 30 may determine whether it has sent a signal to execute the complete gas replacement to the gas control unit 47 (S85). If the laser control unit 30 has not sent the signal to execute the complete gas replacement, the process may return to the aforementioned S82. If the laser control unit 30 has sent the signal to execute the complete gas replacement, the process may proceed to S86.

At S86, the laser control unit 30 may determine whether the calculation of the number of pulses Ngas after the complete gas replacement is to be terminated (S86). If the calculation is to be terminated, the process illustrated in this flowchart may end. If the calculation is not to be terminated, the process may return to the aforementioned S80.

Here, an example to calculate the number of pulses Ngas after the complete gas replacement was described. Alternatively, the number of pulses after replacement of a part of gas in the laser chamber 10 may be calculated.

4.5.6 Calculation of Elapsed Time after the Complete Gas Replacement

Figure 12:
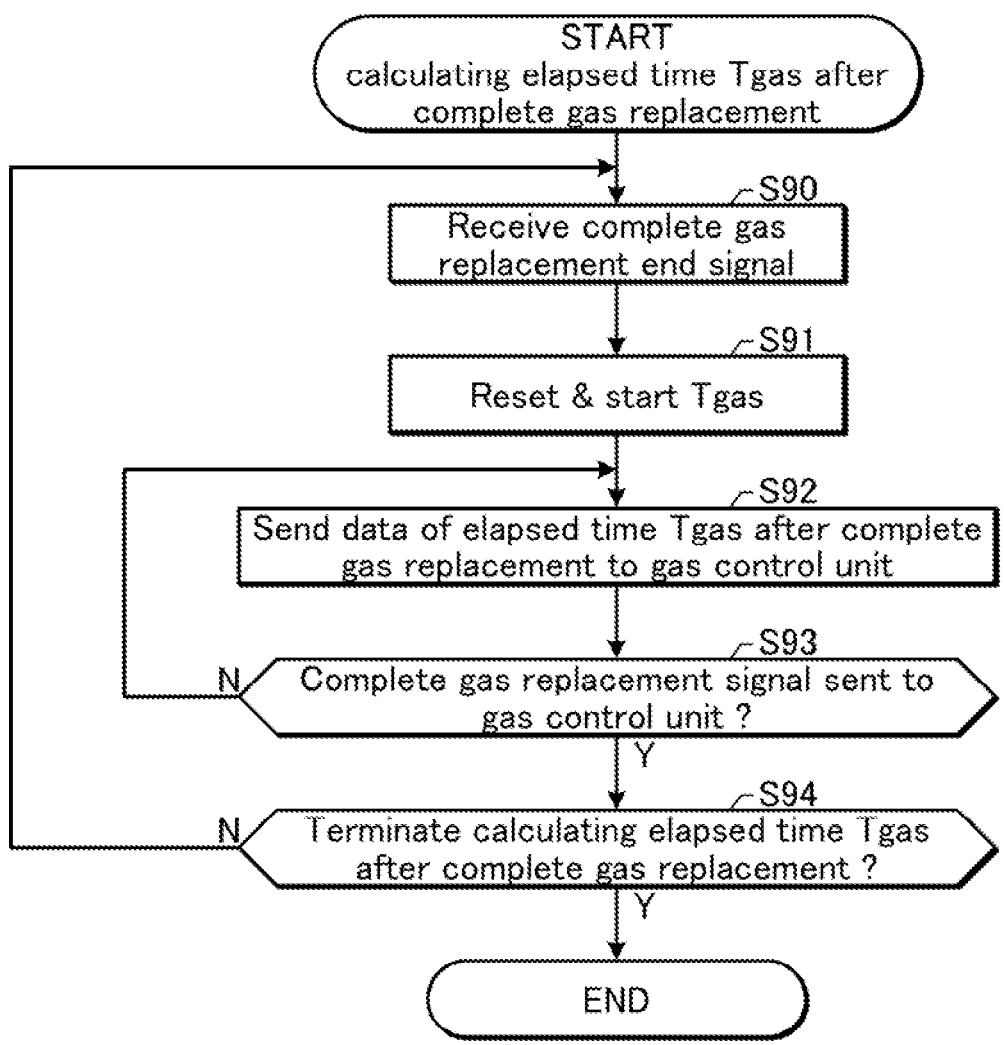
FIG. 12 is a flowchart illustrating a calculation of elapsed time after the complete gas replacement according to the first embodiment.

FIG. 12 is a flowchart illustrating a calculation of elapsed time Tgas after the complete gas replacement according to the first embodiment. The process shown in FIG. 12 may be carried out by the laser control unit 30 (FIG. 2) independently from the gas control shown in FIG. 4. The elapsed time Tgas after the complete gas replacement may be an elapsed time period after stopping laser oscillation of the laser chamber and performing the complete gas replacement. Although the process shown in FIG. 12 is carried out separately from the gas control shown in FIG. 4, however, descriptions are presented below as they may constitute a background of the gas control.

First, the laser control unit 30 may receive an end signal representing that the complete gas replacement has ended (S90). The end signal may be sent from the gas control unit 47.

Next, the laser control unit 30 may set a value of an elapsed time Tgas after the complete gas replacement to 0, and may start updating the value of Tgas according to time (S91).

Next, the laser control unit 30 may send the value of the elapsed time Tgas after the complete gas replacement to the gas control unit 47 (S92). The elapsed time Tgas after the complete gas replacement may not directly represent a degree of deterioration of the pair of electrodes 11a and 11b. However, the elapsed time Tgas after the complete gas replacement may be used for convenience, instead of the total number of pulses Nch of the laser chamber described in reference to FIG. 7.

Next, the laser control unit 30 may determine whether it has sent a signal to execute the complete gas replacement to the gas control unit 47 (S93). If the laser control unit 30 has not sent the signal to execute the complete gas replacement, the process may return to the aforementioned S92. If the laser control unit 30 has sent the signal to execute the complete gas replacement, the process may proceed to S94.

At S94, the laser control unit 30 may determine whether the calculation of the elapsed time Tgas after the complete gas replacement is to be terminated. If the calculation is to be terminated, the process illustrated in this flowchart may end. If the calculation is not to be terminated, the process may return to the aforementioned S90.

Here, an example to calculate the elapsed time Tgas after the complete gas replacement was described. Alternatively, elapsed time after replacement of a part of gas in the laser chamber 10 may be calculated.

4.6 Loading Gas Control Parameters (Details of S200)

Figure 13:
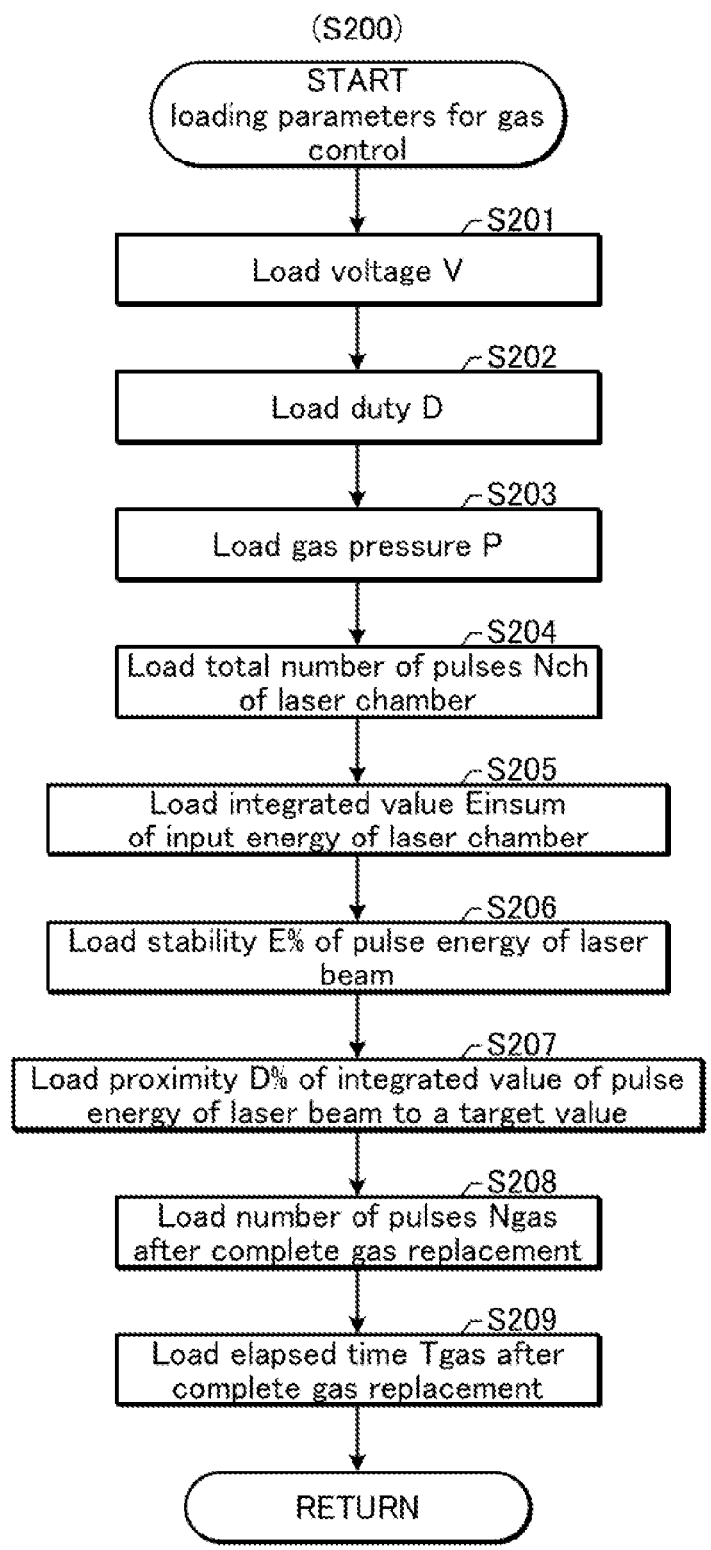
FIG. 13 is a flowchart illustrating a process of loading gas control parameters shown in FIG. 4.

FIG. 13 is a flowchart illustrating a process of loading gas control parameters shown in FIG. 4. The process shown in FIG. 13 may be carried out by the gas control unit 47 as a subroutine of S200 shown in FIG. 4. Further, it is not necessary to follow the order of the respective steps shown in FIG. 13. These steps may be performed in a different order.

The gas control unit 47 may load the charging voltage V of the charger 12 (S201). The charging voltage V may have been sent from the laser control unit 30.

The gas control unit 47 may load the duty D (S202). The duty D may have been calculated by the laser control unit 30 according to the process shown in FIG. 6.

The gas control unit 47 may load the gas pressure P in the laser chamber 10 (S203). The gas pressure P may have been sent from the pressure sensor 16.

In the following S204 to S209, deterioration parameters of the electrodes may be loaded. At least one of the parameters in S204 to S209 may be loaded as the deterioration parameters of the electrodes.

The gas control unit 47 may load the total number of pulses Nch of the laser chamber (S204). The total number of pulses Nch of the laser chamber may have been calculated by the laser control unit 30 according to the process shown in FIG. 7.

The gas control unit 47 may load the integrated value Einsum of input energy of the laser chamber (S205). The integrated value Einsum of input energy of the laser chamber may have been calculated by the laser control unit 30 according to the process shown in FIG. 8.

The gas control unit 47 may load the stability E % of the pulse energy of the laser beam (S206). The stability E % of the pulse energy of the laser beam may have been calculated by the laser control unit 30 according to the process shown in FIG. 9.

The gas control unit 47 may load the proximity D % of the pulse energy of the laser beam to the target value (S207). The proximity D % of the pulse energy of the laser beam to the target value may have been calculated by the laser control unit 30 according to the process shown in FIG. 10.

The gas control unit 47 may load the number of pulses Ngas after the complete gas replacement (S208). The number of pulses Ngas after the complete gas replacement may have been calculated by the laser control unit 30 according to the process shown in FIG. 11.

The gas control unit 47 may load the elapsed time Tgas after the complete gas replacement (S209). The elapsed time Tgas after the complete gas replacement may have been calculated by the laser control unit 30 according to the process shown in FIG. 12.

4.7 Calculating a Gas Control Interval (Details of S300)

Figure 14A:
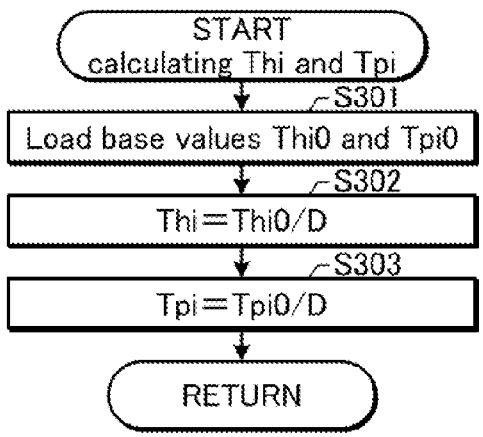
FIG. 14A is a flowchart illustrating a first example of a process to calculate a gas control interval shown in FIG. 4.

FIG. 14A is a flowchart illustrating a first example of a process to calculate a gas control interval shown in FIG. 4. The process shown in FIG. 14A may be carried out by the gas control unit 47 as a subroutine of S300 shown in FIG. 4.

As described above, if laser beam is outputted for a long period of time, the halogen gas in the laser chamber 10 may progressively decrease. Accordingly, the halogen gas replenishment control may be carried out in every predetermined amount of time. Furthermore, if laser beam is outputted for a long period of time, a concentration of impurities in the laser chamber 10 may progressively increase. Accordingly, the partial gas replacement control may be carried out in every predetermined amount of time.

However, the decrease in halogen gas and the increase in the concentration of impurities may also be influenced by the repetition rate of the laser beam, as well as being influenced by the output time of the laser beam. In other words, the decrease in halogen gas and the increase in the concentration of impurities may also be influenced by the duty D (FIG. 6). Accordingly, the gas control unit 47 may perform a correction computation for the predetermined amount of time, through the following process.

First, the gas control unit 47 may load a base value Thi0 of a time interval for the halogen gas replenishment control and a base value Tpi0 of a time interval for the partial gas replacement control (S301).

The gas control unit 47 may then calculate the time interval Thi of the halogen gas replenishment control, based on the base value Thi0 of the time interval for the halogen gas replenishment control and the duty D of the excimer laser apparatus, as Thi0/D (S302). The duty D may have been sent from the laser control unit 30.

In addition, the gas control unit 47 may calculate the time interval Tpi of the partial gas replacement control, based on the base value Tpi0 of the time interval for the partial gas replacement control and the duty D of the excimer laser apparatus, as Tpi0/D (S303). The duty D may have been sent from the laser control unit 30.

Figure 14B:
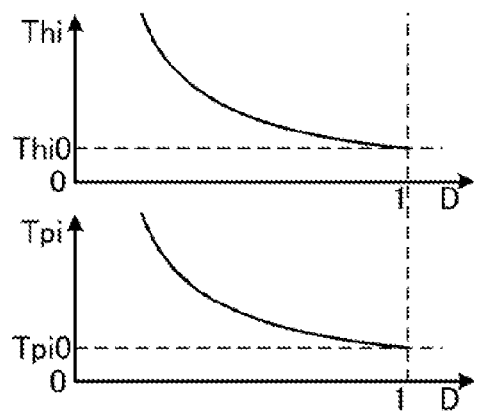
FIG. 14B is a graph showing a relationship between a duty of the excimer laser apparatus and the gas control interval calculated in FIG. 14A.

FIG. 14B is a graph showing a relationship between a duty D of the excimer laser apparatus and the gas control interval calculated in FIG. 14A. The time interval Thi of the halogen gas replenishment control calculated as shown in FIG. 14A may be a minimum value Thi0 when the duty D is 1 (that is, when oscillating at the maximum repetition rate). In the case where the duty D is less than 1, the time interval Thi of the halogen gas replenishment control may be a value that is greater than the base value Thi0.

Likewise, the time interval Tpi of the partial gas replacement control calculated as shown in FIG. 14A may be a minimum value Tpi0 when the duty D is 1 (that is, when oscillating at the maximum repetition rate). In the case where the duty B is less than 1, the time interval Tpi for the partial gas replacement control may be a value that is greater than the base value Tpi0.

Through this, the halogen gas replenishment control and the partial gas replacement control may be carried out at an appropriate timing in accordance with the duty of the excimer laser apparatus.

It may also be noted that a decrease in the halogen gas and an increase in the concentration of impurities may also occur even if the laser beam is not oscillating. Accordingly, an upper limit value for the gas control interval may be provided and the gas control interval may be prevented from exceeding the upper limit value.

4.8 Calculating a Partial Pressure of Halogen Gas (Details of S400)

Figure 15:
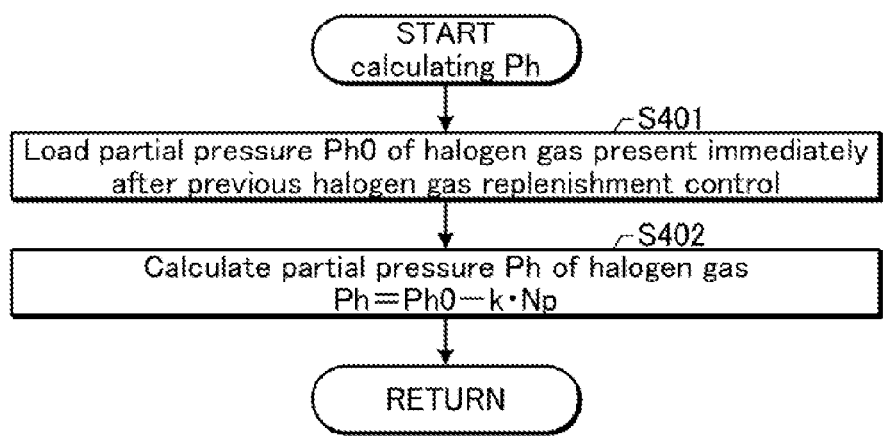
FIG. 15 is a flowchart illustrating an example of a process to calculate a partial pressure of halogen gas shown in FIG. 4.

FIG. 15 is a flowchart illustrating an example of a process to calculate a partial pressure Ph of halogen gas shown in FIG. 4. The process shown in FIG. 15 may be carried out by the gas control unit 47 as a subroutine of S400 shown in FIG. 4.

As described above, a decrease in the halogen gas in the laser chamber 10 may be influenced by the repetition rate or the duty D (FIG. 6) of the laser beam. Accordingly, the partial pressure of the halogen gas may be calculated as follows, in order to add a proper amount of halogen gas into the laser chamber 10 in the halogen gas replenishment control, and to supply a laser gas having a proper halogen gas concentration into the laser chamber 10 in the partial gas replacement control.

First, the gas control unit 47 may load a partial pressure Ph0 of the halogen gas present in the laser chamber 10 immediately after the previous halogen gas replenishment control (S401).

Next, the gas control unit 47 may calculate the partial pressure Ph of the halogen gas as Ph0-$k$·Np, based on the partial pressure Ph0 of the halogen gas present immediately after the previous halogen gas replenishment control, the number of oscillation pulses Np (FIG. 6) during a set amount of time, and a proportionality constant k (S402).

The partial pressure Ph of the halogen gas may be calculated in consideration to the time interval Thi of the halogen gas replenishment control as well as to the repetition rate or the duty D of the laser beam. For example, as the time interval Thi of the halogen gas replenishment control becomes longer, the partial pressure Ph of the halogen gas may become lower.

Further, the partial pressure Ph of the halogen gas may be calculated in consideration to the charging voltage V of the charger 12. For example, as the charging voltage V becomes higher, the partial pressure Ph of the halogen gas may become lower.

4.9 Calculating a Gas Replacement Amount (Details of S500)

Figure 16A:
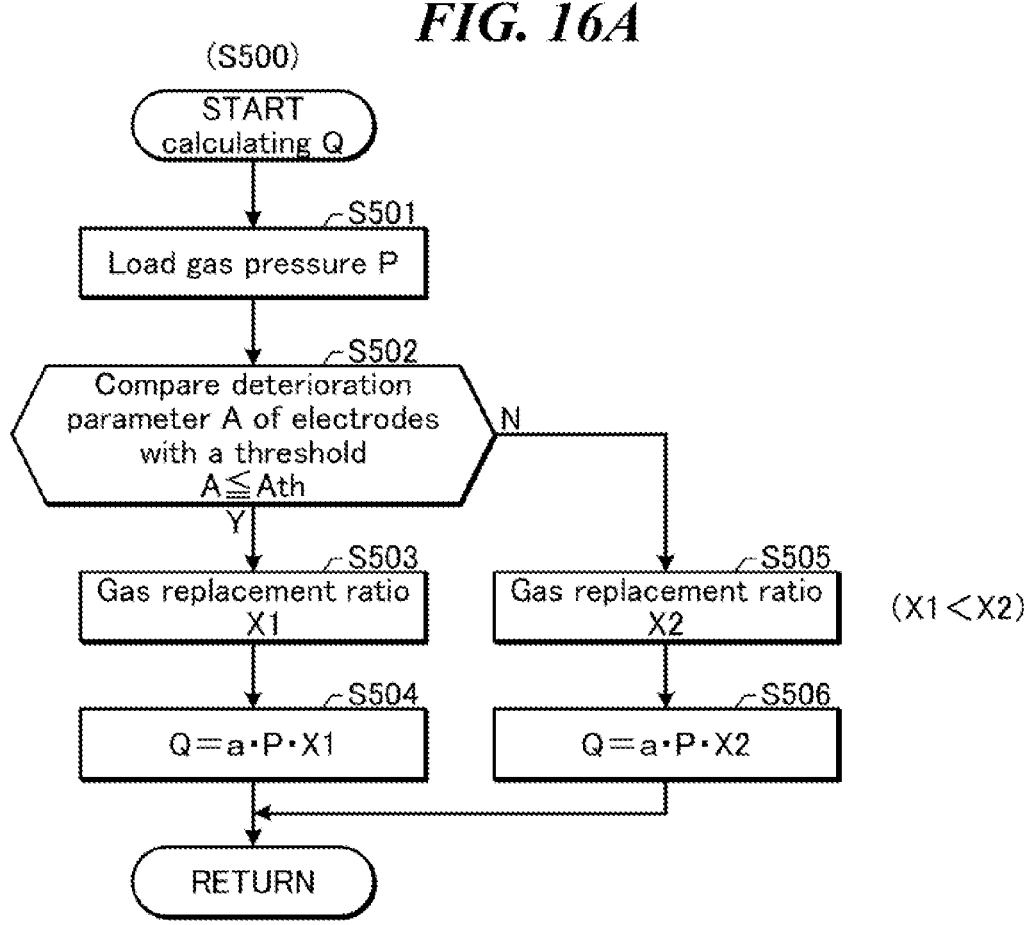
FIG. 16A is a flowchart illustrating a first example of a process to calculate a gas replacement amount shown in FIG. 4.

4.9.1 Relationship Between a Gas Replacement Ratio and the Deterioration Parameters of the Electrodes FIG. 16A is a flowchart illustrating a first example of a process to calculate a gas replacement amount Q shown in FIG. 4. The process shown in FIG. 16A may be carried out by the gas control unit 47 as a subroutine of S500 shown in FIG. 4. In order to replace an appropriate amount of gas in the partial gas replacement control, the gas replacement amount Q may be calculated as follows.

First, the gas control unit 47 may load the gas pressure P in the laser chamber 10 that is received from the pressure sensor 16 (S501).

Next, the gas control unit 47 may compare a deterioration parameter A of the electrodes with a threshold value Ath (S502). The deterioration parameter A may be a parameter which is loaded in one of S204 to S209 shown in FIG. 13. Alternatively, data of the threshold value Ath may be stored by the gas control unit 47 in advance.

In S502, if the deterioration parameter A of the electrode is equal to or lower than the threshold value Ath (A≤Ath), the gas control unit 47 may set the gas replacement ratio to a first value X1 (S503). After the gas replacement ratio is set to the first value X1, the gas control unit 47 may calculate the gas replacement amount Q by the following formula (S504).

$$Q = a \cdot P \cdot X1$$

Here, a is a proportionality constant that itself is proportional to a volume of an inside space of the laser chamber.

If the deterioration parameter A of the electrode is higher than the threshold value Ath (A>Ath) at S502, the gas control unit 47 may set the gas replacement ratio to a second value X2 (S505). The second value X2 may be higher than the first value X1. After the gas replacement ratio is set to the second value X2, the gas control unit 47 may calculate the gas replacement amount Q by the following formula (S506).

$$Q = a \cdot P \cdot X2$$

Figure 16B:
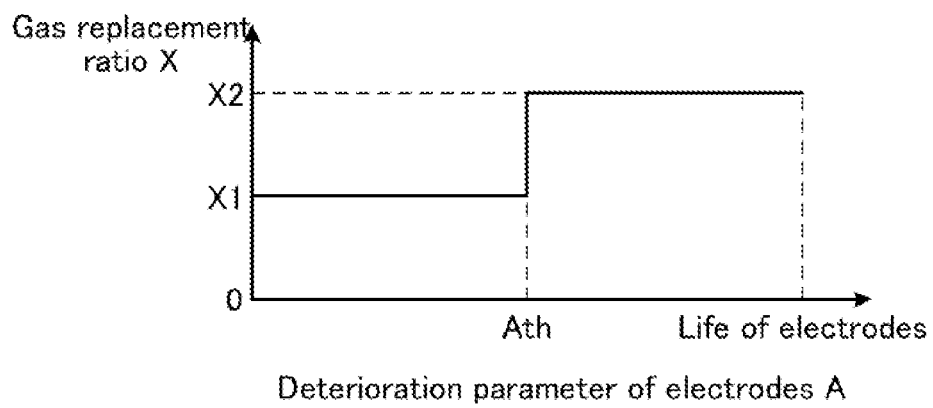
FIG. 16B is a graph showing a relationship between a deterioration parameter of electrodes and a gas replacement ratio set in FIG. 16A.

FIG. 16B is a graph showing a relationship between a deterioration parameter A of electrodes and a gas replacement ratio X set in FIG. 16A. As stated above, as a concentration of impurities of the laser gas becomes higher, an efficiency to generate the laser beam may decrease. The efficiency to generate the laser beam may be a ratio of output pulse energy of the laser beam against input energy. The efficiency may decrease due to the fact that impurities may absorb the laser beam or worsen a condition of discharge. Further, the efficiency to generate the laser beam may decrease in another situation where the pair of electrodes 11a and 11b is getting old and the deterioration is progressing.

Accordingly, as shown in FIG. 16B, the gas replacement ratio X may be changed based on a value of the deterioration parameter A of the electrodes. In this configuration, during the period where a degree of deterioration is low, even if the concentration of the impurities in the laser gas is slightly high, decrease in the efficiency to generate the laser beam may be moderate. As a result, the gas replacement ratio X may be kept small and consumption of the laser gas may be decreased. After the degree of deterioration becomes high, the gas replacement ratio X may be increased so that the concentration of the impurities in the laser gas is decreased. According to this, decrease in the efficiency to generate the laser beam may be moderate.

Here, the deterioration parameter A of the electrodes is compared to a single threshold value Ath with the gas replacement ratio X being controlled in two steps of X1 and X2. However, two or more threshold values may be provided for the deterioration parameter A of the electrodes. The gas replacement ratio X may be controlled in three or more steps. Furthermore, as explained in reference to FIG. 1, the gas replacement ratio may be continuously variable according to the deterioration parameter A of the electrodes.

4.9.2 Relationship Between the Gas Replacement Ratio and the Gas Pressure

Figure 17A:
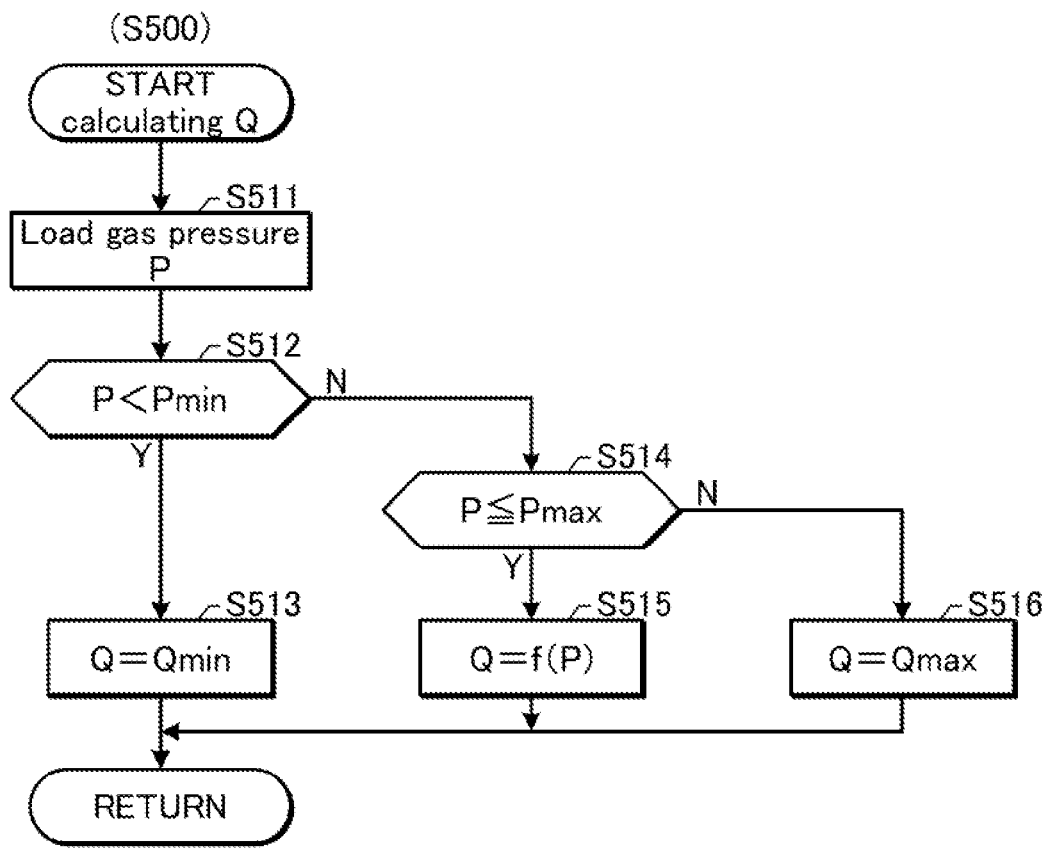
FIG. 17A is a flowchart illustrating a second example of the process to calculate the gas replacement amount shown in FIG. 4.

FIG. 17A is a flowchart illustrating a second example of the process to calculate the gas replacement amount Q shown in FIG. 4. The process shown in FIG. 17A may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may load a gas pressure P in the laser chamber 10 received from the pressure sensor 16 (S511).

Next, the gas control unit 47 may compare the gas pressure P in the laser chamber 10 with a first threshold value Pmin (S512). Data of the first threshold value Pmin may be stored by the gas control unit 47 in advance.

If the gas pressure P is lower than the first threshold value Pmin (P<Pmin), the gas control unit 47 may set a gas replacement amount Q to a minimum value Qmin (S513).

If the gas pressure P is equal to or higher than the first threshold value Pmin (P≤Pmin), the gas control unit 47 may compare the gas pressure P in the laser chamber 10 with a second threshold value Pmax (S514). The second threshold value Pmax may be higher than the first threshold value Pmin. Data of the second threshold value Pmax may be stored by the gas control unit 47 in advance.

If the gas pressure P is equal to or lower than the second threshold value Pmax (P Pmax), the gas control unit 47 may set the gas replacement amount Q to a variable that may continuously vary between the minimum value Qmin and a maximum value Qmax depending on the gas pressure P. For example, the gas replacement amount Q may be a variable represented by f(P) (S515).

If the gas pressure P is still higher than the second threshold value Pmax (P>Pmax), the gas control unit 47 may set the gas replacement amount Q to the maximum value Qmax (S516).

Figure 17B:
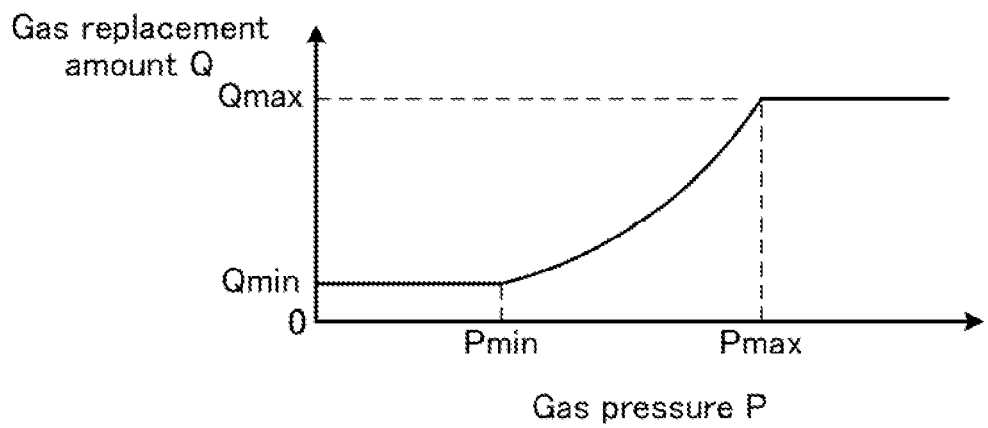
FIG. 17B is a graph showing a relationship between a gas pressure in the laser chamber and the gas replacement amount calculated in FIG. 17A.
Figure 17C:
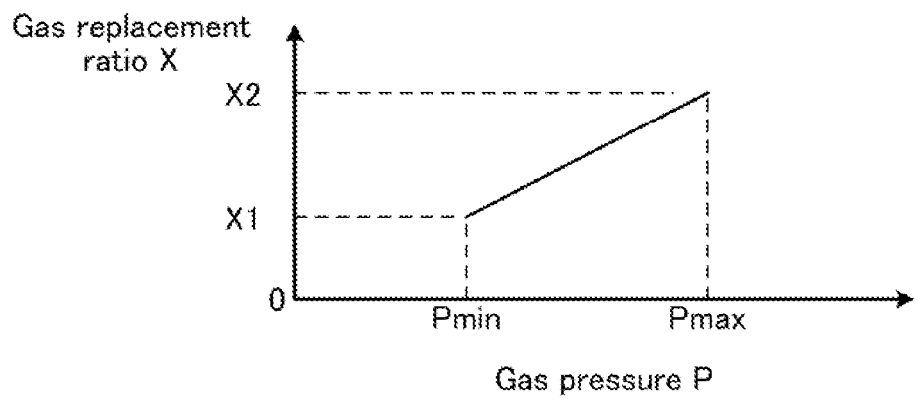
FIG. 17C is a graph showing a relationship between the gas pressure P in the laser chamber and the gas replacement ratio X, where the gas pressure P is in a range from a first threshold value Pmin to a second threshold value Pmax.

FIG. 17B is a graph showing a relationship between a gas pressure P in the laser chamber and the gas replacement amount Q calculated in FIG. 17A. FIG. 17C is a graph showing a relationship between the gas pressure P in the laser chamber and the gas replacement ratio X, where the gas pressure P is in a range from a first threshold value Pmin to a second threshold value Pmax. A situation where the gas pressure P in the laser chamber 10 is increased may occur, as described above, when the charging voltage V of the charger 12 is high and the gas pressure is increased in the gas pressure control (S600). In other words, a situation where the gas pressure P in the laser chamber 10 is increased may occur, when the amount of impurities in the laser chamber 10 is increased or the electrodes are deteriorated and the efficiency to generate the laser beam is worsened.

Accordingly, if the gas pressure P in the laser chamber 10 is high, the gas replacement amount Q may be increased. Through this, impurities in the laser chamber 10 may be decreased and the efficiency to generate the laser beam may be recovered. Contrary, if the gas pressure P in the laser chamber 10 is low, the gas replacement amount Q may be decreased. Here, in a case where the gas pressure P is high as shown in FIG. 17C, the gas replacement ratio X may be higher than in a case where the gas pressure P is low. Namely, by decreasing the gas replacement ratio X when the gas pressure P is low, the gas consumption may be decreased. Therefore, as shown in FIG. 17B, the function Q=f(P) may be a monotonically increasing and downward convex function. For example, the function Q=f(P) may be an n-th degree function, where n is a positive integer, or an exponential function.

Figure 18A:
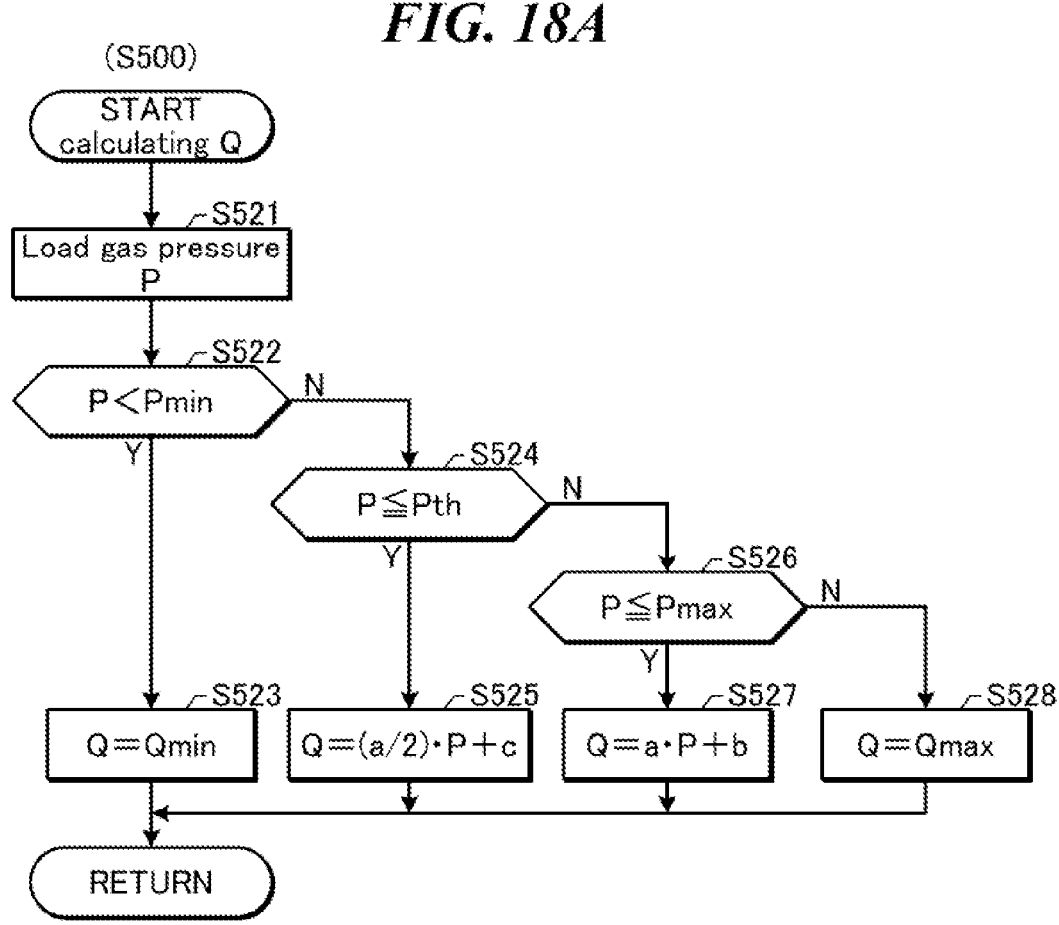
FIG. 18A is a flowchart illustrating a third example of the process to calculate the gas replacement amount shown in FIG. 4.

FIG. 18A is a flowchart illustrating a third example of the process to calculate the gas replacement amount Q shown in FIG. 4. The process shown in FIG. 18A may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may load a gas pressure P in the laser chamber 10 received from the pressure sensor 16 (S521).

Next, the gas control unit 47 may compare the gas pressure P in the laser chamber 10 with a first threshold value Pmin (S522). Data of the first threshold value Pmin may be stored by the gas control unit 47 in advance.

If the gas pressure P is lower than the first threshold value Pmin (P<Pmin), the gas control unit 47 may set a gas replacement amount Q to a minimum value Qmin (S523).

If the gas pressure P is equal to or higher than the first threshold value Pmin (P Pmin), the gas control unit 47 may compare the gas pressure P in the laser chamber 10 with a third threshold value Pth (S524). The third threshold value Pth may be higher than the first threshold value Pmin. Data of the third threshold value Pth may be stored by the gas control unit 47 in advance.

If the gas pressure P is equal to or lower than the third threshold value Pth (P≤Pth), the gas control unit 47 may set the gas replacement amount Q to a value obtained from the following linear function (S525).

$$Q=(a/2)\cdot P+c$$

Here, each of a and c may be a constant value. This function may be a linear function corresponding to a line passing through (Pmin, Qmin).

If the gas pressure P is still higher than the third threshold value Pth (P>Pth), the gas control unit 47 may compare the gas pressure P in the laser chamber 10 with a second threshold value Pmax (S526). The second threshold value Pmax may be higher than the third threshold value Pth. Data of the second threshold value Pmax may be stored by the gas control unit 47 in advance.

If the gas pressure P is equal to or lower than the second threshold value Pmax (P≤Pmax), the gas control unit 47 may set the gas replacement amount Q to a value obtained from the following linear function (S527).

$$Q=a\cdot P+b$$

Here, b may be a constant value. This function may correspond to a line passing through (Pmax, Qmax).

If the gas pressure P is still higher than the second threshold value Pmax (P>Pmax), the gas control unit 47 may set the gas replacement amount Q to the maximum value Qmax (S528).

Figure 18B:
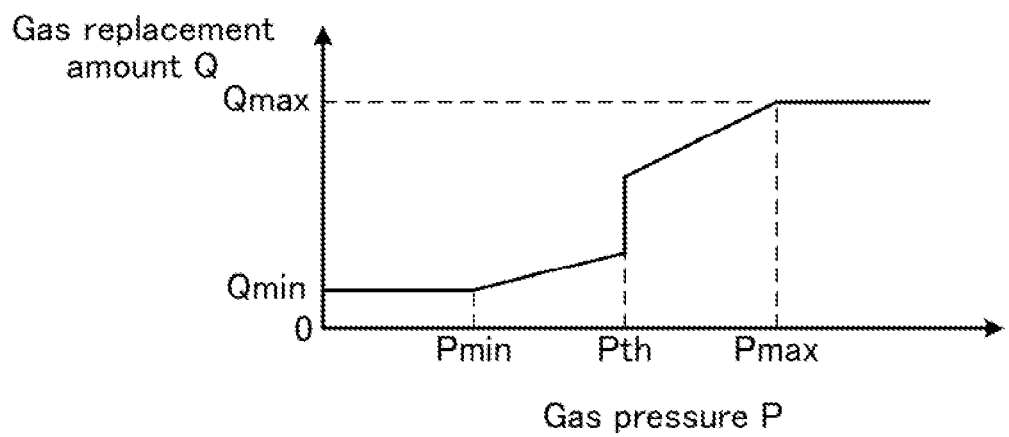
FIG. 18B is a graph showing a relationship between the gas pressure in the laser chamber and the gas replacement amount calculated in FIG. 18A.
Figure 18C:
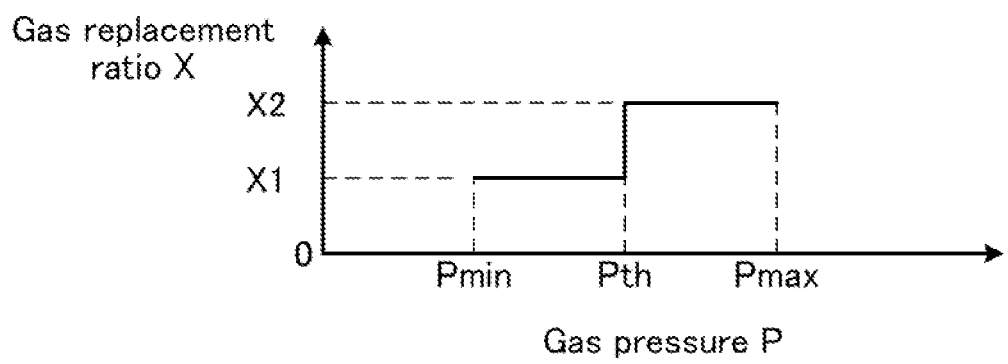
FIG. 18C is a graph showing a relationship between the gas pressure P in the laser chamber and the gas replacement ratio X, where the gas pressure P is in the range from the first threshold value Pmin to the second threshold value Pmax.

FIG. 18B is a graph showing a relationship between the gas pressure P in the laser chamber and the gas replacement amount Q calculated in FIG. 18A. FIG. 18C is a graph showing a relationship between the gas pressure P in the laser chamber and the gas replacement ratio X, where the gas pressure P is in the range from the first threshold value Pmin to the second threshold value Pmax. As described in reference to FIG. 17B, if the gas pressure P in the laser chamber 10 is high, the gas replacement amount Q may be increased so as to decrease impurities in the laser chamber 10 and recover the efficiency to generate the laser beam. Contrary, if the gas pressure P in the laser chamber 10 is low, the gas replacement amount Q may be decreased. Here, as shown in FIG. 18C, in the situation where the gas pressure P is high, the gas replacement ratio X may be higher than that in the situation where the gas pressure P is low. Namely, gas replacement ratio X may be decreased when the gas pressure P is low. Therefore, gas consumption may be decreased. In this configuration, as shown in FIG. 18B, in the situation where the gas pressure P is higher than the third threshold value Pth, the gas replacement amount Q may be significantly larger than in the situation where the gas pressure P is equal to or lower than the third threshold value Pth.

4.9.3 Process of Prolonging Life

Figure 19A:
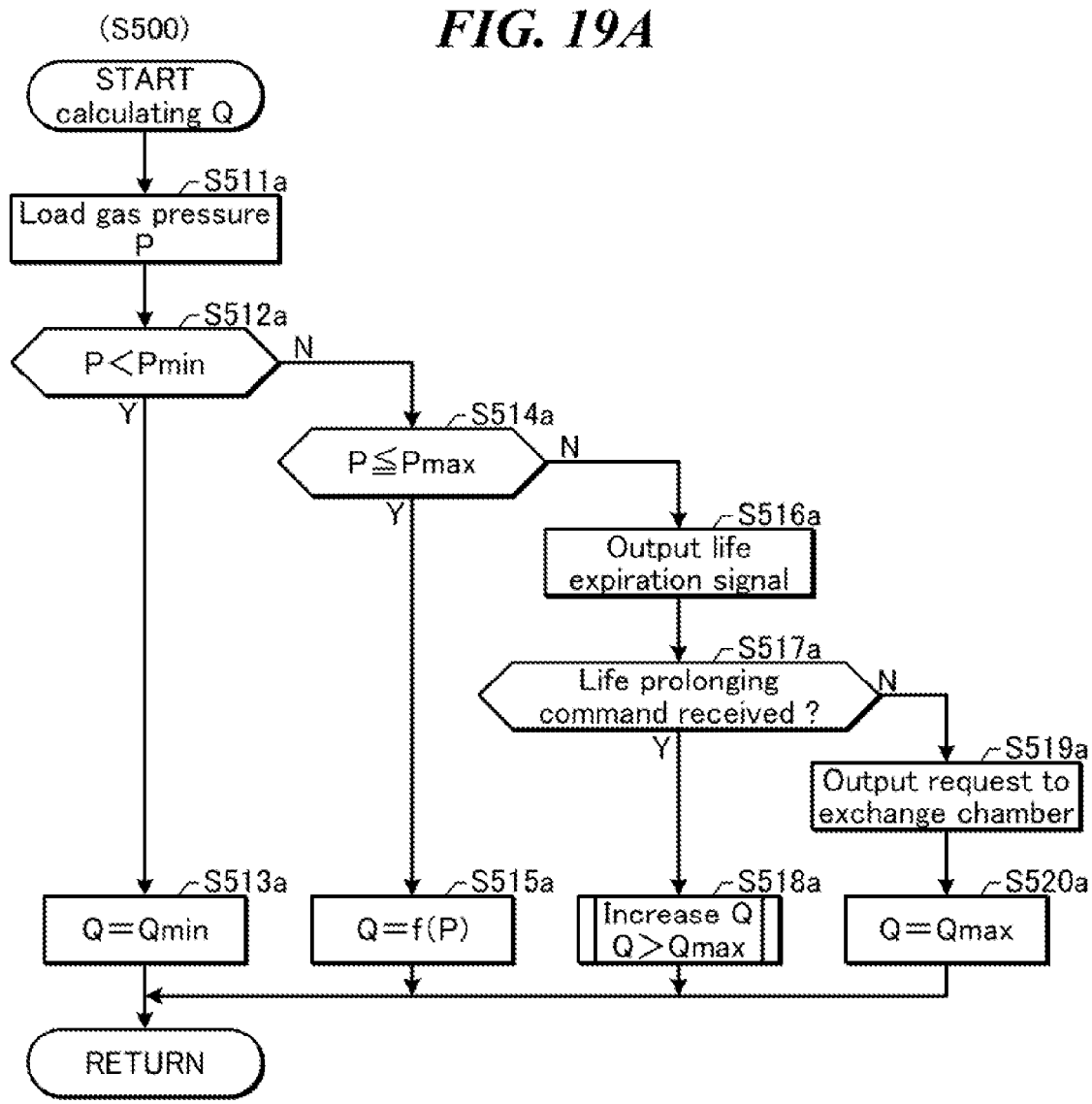
FIG. 19A is a flowchart illustrating a fourth example of a process to calculate the gas replacement amount Q shown in FIG. 4.

FIG. 19A is a flowchart illustrating a fourth example of a process to calculate the gas replacement amount Q shown in FIG. 4. The process shown in FIG. 19A may be carried out by the gas control unit 47 as a subroutine of S500 shown in FIG. 4. In order to replace an appropriate amount of gas in the partial gas replacement control, a gas replacement amount Q may be calculated as follows.

The process of S511a to S515a in FIG. 19A may be substantially the same as the process of S511 to S515 described in reference to FIG. 17A.

At S514a, if the gas pressure P is higher than the second threshold value Pmax (P>Pmax), the gas control unit 47 may output a life expiration signal (S516a). The life expiration signal may be a control signal for outputting an alarm sound via a speaker (not shown), or a control signal for outputting an alarm display via a display device (not shown).

The gas control unit 47 may determine whether or not it received a life prolonging command (S517a). The life prolonging command may be a command signal inputted by a user via an input device (not shown). The gas control unit 47 may, if it did not receive the life prolonging command, output a signal requesting to exchange the chamber (S519a). The signal requesting to exchange the chamber may be a control signal for outputting an alarm sound via a speaker (not shown), or a control signal for outputting an alarm display via a display device (not shown). After S519a, the gas control unit 47 may set the gas replacement amount Q to the maximum value Qmax (S520a).

At S517a, if the gas control unit 47 received the life prolonging command, the gas control unit 47 may execute a process to increase the gas replacement amount Q still further than the maximum value Qmax (S518a). Details of the process of S518a will be provided later in reference to FIGS. 19C and 19D.

Figure 19B:
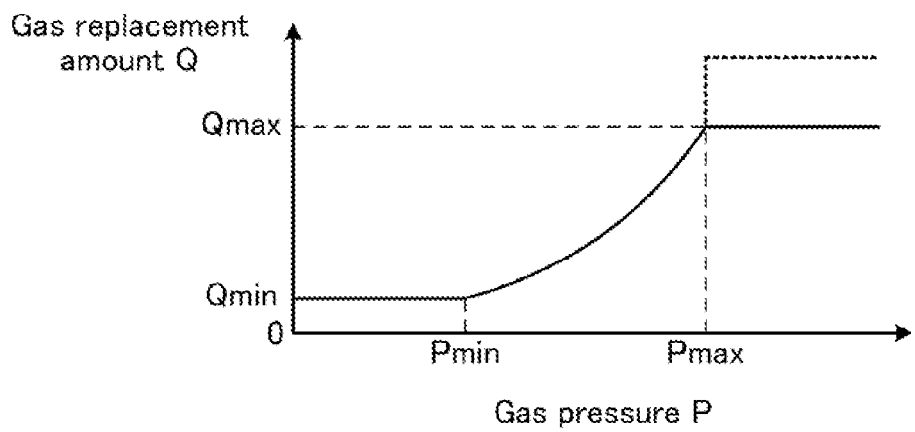
FIG. 19B is a graph showing a relationship between the gas pressure P in the laser chamber and the gas replacement amount Q calculated in FIG. 19A.

FIG. 19B is a graph showing a relationship between the gas pressure P in the laser chamber and the gas replacement amount Q calculated in FIG. 19A. This graph may be substantially the same as the graph shown in FIG. 17B, if the gas pressure P in the laser chamber is in a range between the first threshold value Pmin and the second threshold value Pmax. In FIG. 19B, if the gas pressure P in the laser chamber exceeded the threshold value Pmax and the gas control unit 47 received the life prolonging command, the gas replacement amount Q may be set to a value higher than Qmax.

Figure 19C:
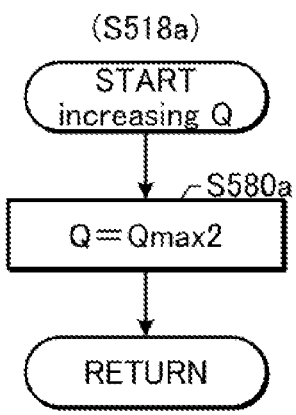
FIG. 19C is a flowchart illustrating a first example of a process to increase the gas replacement amount Q shown in FIG. 19A beyond a maximum value Qmax.

FIG. 19C is a flowchart illustrating a first example of a process to increase the gas replacement amount Q shown in FIG. 19A beyond the maximum value Qmax. The process shown in FIG. 19C may be carried out by the gas control unit 47 as a subroutine of S518a shown in FIG. 19A. If the gas pressure P in the laser chamber exceeded the threshold value Pmax and the gas control unit 47 received the life prolonging command, the gas replacement amount Q may be set to a value higher than Qmax as follows.

The gas control unit 47 may set the gas replacement amount Q to a constant value Qmax2 larger than Qmax (S580a). After S580a, the gas control unit 47 may terminate the process in this flowchart.

Figure 19D:
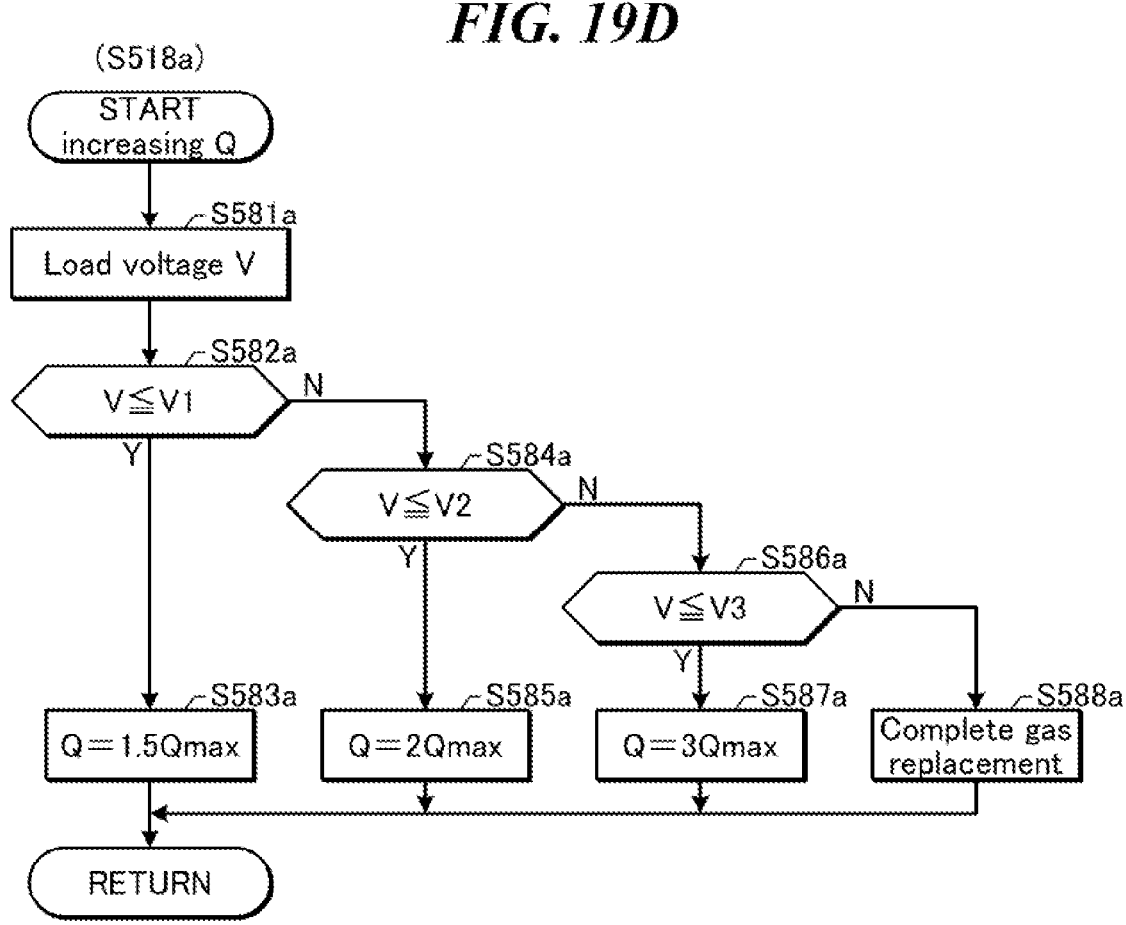
FIG. 19D is a flowchart illustrating a second example of a process to increase the gas replacement amount Q shown in FIG. 19A beyond the maximum value Qmax.

FIG. 19D is a flowchart illustrating a second example of a process to increase the gas replacement amount Q shown in FIG. 19A beyond the maximum value Qmax. The process shown in FIG. 15D may be carried out by the gas control unit 47 as a subroutine of S518a shown in FIG. 19A. If the gas pressure P in the laser chamber exceeded the threshold value Pmax and the gas control unit 47 received the life prolonging command, the gas replacement amount Q may be set to a value higher than Qmax as follows.

First, the gas control unit 47 may load the charging voltage V of the charger 12 (S581a).

Next, the gas control unit 47 may compare the charging voltage V with the first threshold value V1 (S582a). Data of the first threshold value V1 may be stored by the gas control unit 47 in advance.

If the charging voltage V is equal to or lower than the first threshold value V1 (V≤V1), the gas control unit 47 may set the gas replacement amount Q to a value that is 1.5 times larger than Qmax (S583a).

If the charging voltage V is higher than the first threshold value V1 (V>V1), the gas control unit 47 may compare the charging voltage V with the second threshold value V2 (S584a). The second threshold value V2 may be higher than the first threshold value V1. Data of the second threshold value V2 may be stored by the gas control unit 47 in advance.

If the charging voltage V is equal to or lower than the second threshold value V2 (V≤V2), the gas control unit 47 may set the gas replacement amount Q to a value that is 2 times larger than Qmax (S585a).

If the charging voltage V is higher than the second threshold value V2 (V>V2), the gas control unit 47 may compare the charging voltage V with the third threshold value V3 (S586a). The third threshold value V3 may be higher than the second threshold value V2. Data of the third threshold value V3 may be stored by the gas control unit 47 in advance.

If the charging voltage V is equal to or lower than the third threshold value V3 (V≤V3), the gas control unit 47 may set the gas replacement amount Q to a value that is 3 times larger than Qmax (S587a).

If the charging voltage V is higher than the third threshold value V3 (V>V3), the gas control unit 47 may terminate the calculation of the gas replacement amount Q for the partial gas replacement. The gas control unit 47 may perform the complete gas replacement (S588a).

Figure 20A:
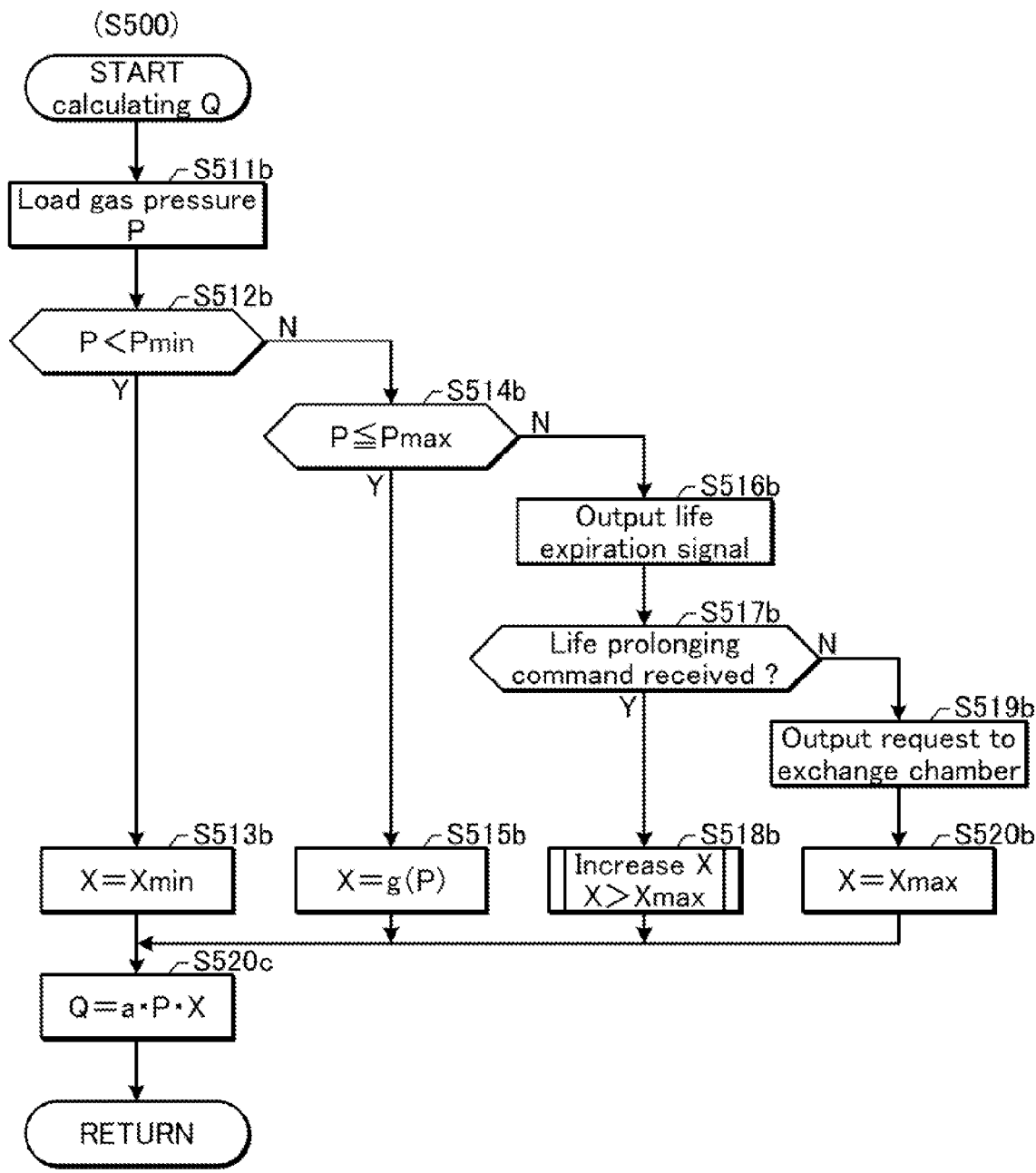
FIG. 20A is a flowchart illustrating a fifth example of a process to calculate the gas replacement amount Q shown in FIG. 4.

FIG. 20A is a flowchart illustrating a fifth example of a process to calculate the gas replacement amount Q shown in FIG. 4. The process shown in FIG. 20A may be carried out by the gas control unit 47 as a subroutine of S500 shown in FIG. 4. In order to replace an appropriate amount of gas in the partial gas replacement control, a gas replacement amount Q may be calculated as follows.

The process of S511b to S520b in FIG. 20A may be substantially the same as the process of S511a to S520a described in reference to FIG. 19A. However, at S513b, S515b, S518b, and S520b of FIG. 20A, the gas replacement ratio X may be set instead of the gas replacement amount Q.

At S513b, the gas replacement ratio X may be set to a minimum value Xmin. At S515b, the gas replacement ratio X may be set to a variable that may continuously vary between the minimum value Xmin and a maximum value Xmax depending on the gas pressure P. For example, the gas replacement ratio X may be a variable represented by g(P).

At S520b, the gas replacement ratio X may be set to the maximum value Xmax. At S518b, the gas replacement ratio X may be increased beyond the maximum value Xmax. Details of the process of S518b may be described later in reference to FIGS. 20B and 20C.

After setting the gas replacement ratio X at S513b, S515b, S518b, or S520b, the gas control unit 47 may calculate the gas replacement amount Q by the following formula (S520c).

$$Q = a \cdot P \cdot X$$

Here, a is a proportionality constant that itself is proportional to a volume of an inside space of the laser chamber.

Figure 20B:
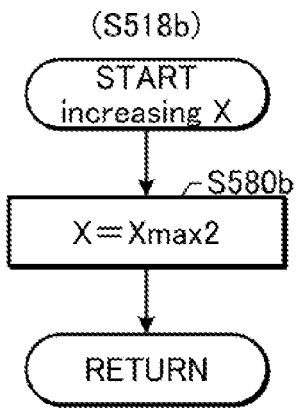
FIG. 20C is a flowchart illustrating a second example of a process to increase the gas replacement ratio X shown in FIG. 20A beyond the maximum value Xmax.

FIG. 20B is a flowchart illustrating a first example of a process to increase the gas replacement ratio X shown in FIG. 20A beyond a maximum value Xmax. The process shown in FIG. 20B may be carried out by the gas control unit 47 as a subroutine of S518b shown in FIG. 20A. If the gas pressure P in the laser chamber exceeded the threshold value Pmax and the gas control unit 47 received the life prolonging command, the gas replacement ratio X may be set to a value higher than Xmax as follows.

The gas control unit 47 may set the gas replacement ratio X to a constant value Xmax2 that is higher than Xmax (S580b). After S580b, the gas control unit 47 may terminate the process of this flowchart.

Figure 20C:
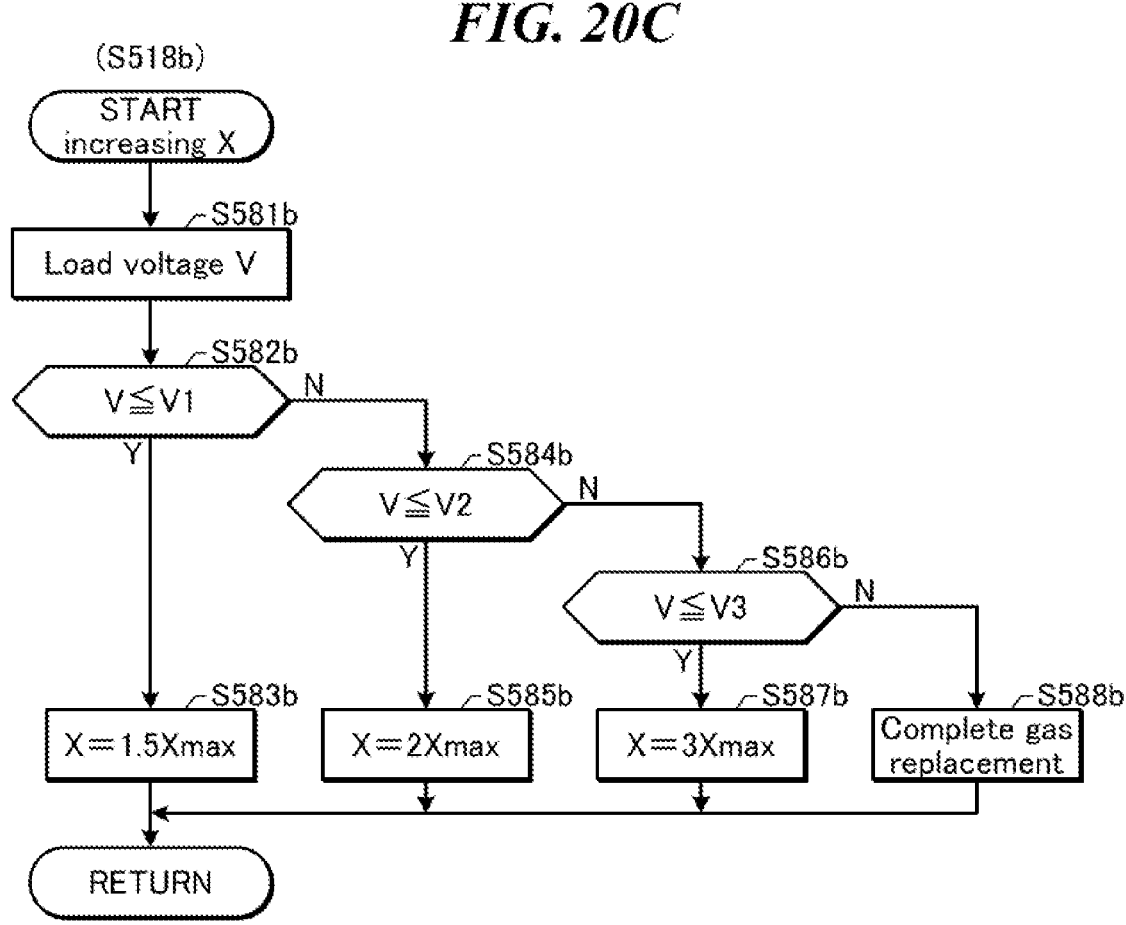

FIG. 20C is a flowchart illustrating a second example of a process to increase the gas replacement ratio X shown in FIG. 20A beyond the maximum value Xmax. The process shown in FIG. 20C may be carried out by the gas control unit 47 as a subroutine of S518b shown in FIG. 20A. If the gas pressure P in the laser chamber exceeded the threshold value Pmax and the gas control unit 47 received the life prolonging command, the gas replacement ratio X may be set to a value higher than Xmax as follows.

The process of S581b to S588b in FIG. 20C may be substantially the same as the process of S581a to S588a described in reference to FIG. 19D. However, at S583b, S585b, and S587b of FIG. 20C, the gas replacement ratio X may be set instead of the gas replacement amount Q.

At S583b, the gas replacement ratio X may be set to a value that is 1.5 times higher than Xmax.

At S585b, the gas replacement ratio X may be set to a value that is 2 times higher than Xmax.

At S587b, the gas replacement ratio X may be set to a value that is 3 times higher than Xmax.

Figure 21:
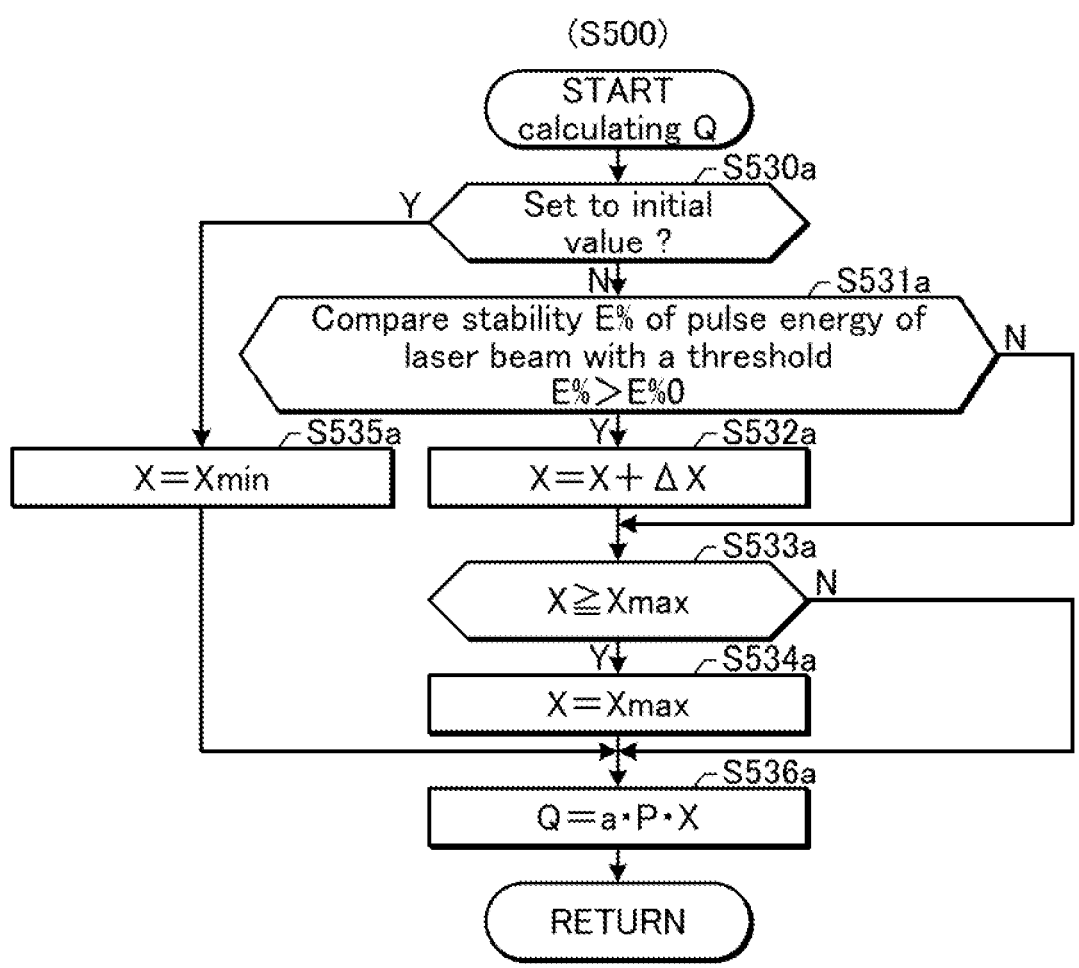
FIG. 21 is a flowchart illustrating a sixth example of a process to calculate the gas replacement amount Q shown in FIG. 4.

4.9.4 Relationship Between the Gas Replacement Ratio and the Stability of the Pulse Energy FIG. 21 is a flowchart illustrating a sixth example of a process to calculate the gas replacement amount Q shown in FIG. 4. The process shown in FIG. 21 may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may determine whether or not the gas replacement ratio X is to be set to an initial value (S530a). In a case where the process of this flowchart is executed for the first time, the gas control unit 47 may determine that the gas replacement ratio X is to be set to the initial value, and then proceed to S535a. At S535a, the gas control unit 47 may set the gas replacement ratio X to the initial value Xmin. In a case where the process of this flowchart has been executed before, the gas control unit 47 may skip the process of setting the gas replacement ratio X to the initial value, and proceed to S531a. At S531a, the gas control unit 47 may compare the stability E % of the pulse energy of the laser beam with a threshold value E % 0. The stability E % of the pulse energy of the laser beam may be a parameter loaded in the process shown in FIG. 13. Data of the threshold value E % 0 may be stored by the gas control unit 47 in advance.

If the stability E % of the pulse energy of the laser beam is higher than the threshold value E % 0 (E %>E %0), the gas control unit 47 may add a constant value ΔX to the present gas replacement ratio X to reset a value of the gas replacement ratio X to a higher value (S532a). Then, the gas control unit 47 may proceed to S533a.

If the stability E % of the pulse energy of the laser beam is equal to or lower than the threshold value E %0 (E % E %0), the gas control unit 47 may proceed to S533a without resetting the value of the gas replacement ratio X.

At S533a, the gas control unit 47 may compare the gas replacement ratio X with the threshold value Xmax.

If the gas replacement ratio X is equal to or higher than the threshold value Xmax (X≥Xmax), the gas control unit 47 may reset the replacement ratio X to Xmax (S534a).

If the gas replacement ratio X is lower than the threshold value Xmax (X<Xmax), the gas control unit 47 may avoid to reset the gas replacement ratio X.

After setting the gas replacement ratio X as mentioned above, the gas control unit 47 may calculate the gas replacement amount Q by the following formula (S535a).

$$Q = a \cdot P \cdot X$$

Here, a is a proportionality constant that itself is proportional to a volume of an inside space of the laser chamber.

Figure 22:
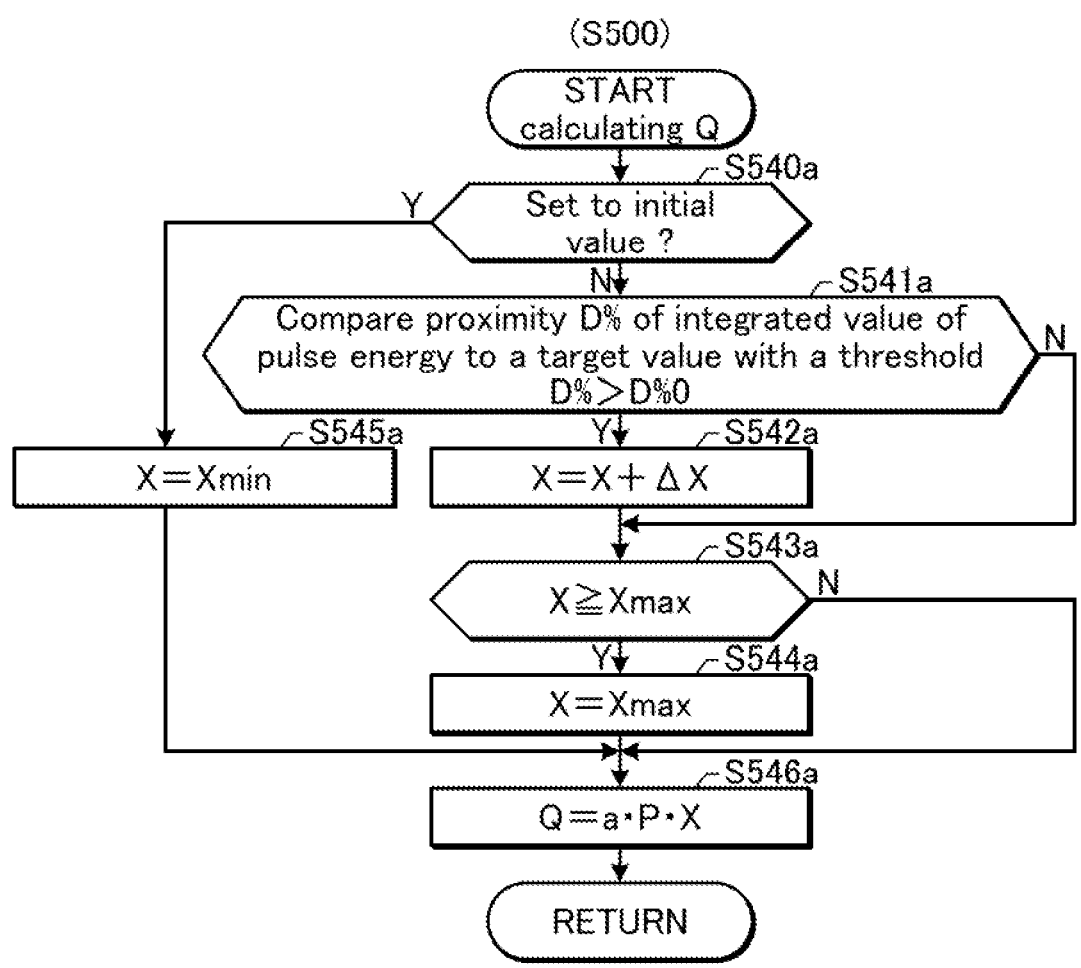
FIG. 22 is a flowchart illustrating a seventh example of a process to calculate the gas replacement amount Q shown in FIG. 4.

4.9.5 Relationship Between the Gas Replacement Amount and the Proximity of the Pulse Energy to the Target Value FIG. 22 is a flowchart illustrating a seventh example of a process to calculate the gas replacement amount Q shown in FIG. 4. The process shown in FIG. 22 may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may determine whether the gas replacement ratio X is to be set to an initial value (S540a). In a case where the process of this flowchart is executed for the first time, the gas control unit 47 may determine that the gas replacement ratio X is to be set to the initial value, and then proceed to S545a. At S545a, the gas control unit 47 may set the gas replacement ratio X to the initial value Xmin. In a case where the process of this flowchart has been executed before, the gas control unit 47 may skip the process of setting the gas replacement ratio X to the initial value, and proceed to S541a. At S541a, the gas control unit 47 may compare the proximity D % of the pulse energy of the laser beam to the target value with a threshold value D %0. The proximity D % of the pulse energy of the laser beam to the target value may be a parameter loaded in the process shown in FIG. 13. Data of the threshold value D %0 may be stored by the gas control unit 47 in advance.

If the proximity D % of the pulse energy of the laser beam to the target value is higher than the threshold value D %0 (D %>D %0), the gas control unit 47 may add a constant value ΔX to the present value of the gas replacement ratio X to reset the value of the gas replacement ratio X to a higher value (S542a). Then, the gas control unit 47 may proceed to S543a.

If the proximity D % of the pulse energy of the laser beam to the target value is equal to or lower than the threshold value D %0 (D %≤%0), the gas control unit 47 may proceed to S543a without resetting the value of the gas replacement ratio X.

At S543a, the gas control unit 47 may compare the gas replacement ratio X with the threshold value Xmax.

If the gas replacement ratio X is equal to or higher than the threshold value Xmax (X≥Xmax), the gas control unit 47 may reset the gas replacement ratio X to Xmax (S544a).

If the gas replacement ratio X is lower than the threshold value Xmax (X<Xmax), the gas control unit 47 may avoid to reset the gas replacement ratio X.

After setting the gas replacement ratio X as mentioned above, the gas control unit 47 may calculate the gas replacement amount Q by the following formula (S546a).

$$Q=a\cdot P\cdot X$$

Here, a is a proportionality constant that itself is proportional to a volume of an inside space of the laser chamber.

Figure 23A:
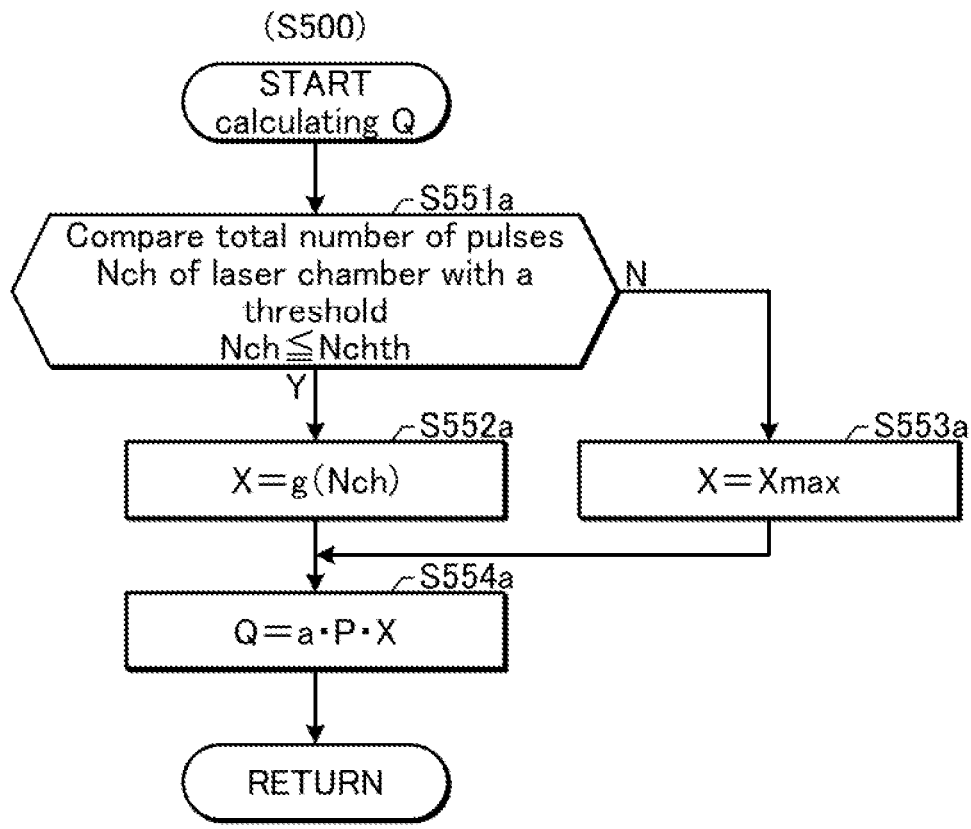
FIG. 23A is a flowchart illustrating an eighth example of a process to calculate the gas replacement amount Q shown in FIG. 4.

4.9.6 Relationship Between the Gas Replacement Amount and the Total Number of Pulses of the Laser Chamber FIG. 23A is a flowchart illustrating an eighth example of a process to calculate the gas replacement amount Q shown in FIG. 4. The process shown in FIG. 23A may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may compare the total number of pulses Nch of the laser chamber with a threshold value Nchth (S551a). The total number of pulses Nch of the laser chamber may be a parameter loaded in the process of FIG. 13. Data of the threshold value Nchth may be stored by the gas control unit 47 in advance.

If the total number of pulses Nch of the laser chamber is equal to or smaller than the threshold value Nchth (Nch≤Nchth), the gas control unit 47 may set the gas replacement ratio X to a variable that may continuously vary between the minimum value Xmin and the maximum value Xmax depending on Nch. For example, the gas replacement ratio X may be a variable represented by g(Nch) (S552a).

If the total number of pulses Nch of the laser chamber is larger than the threshold value Nchth (Nch>Nchth), the gas control unit 47 may set the gas replacement ratio X to the maximum value Xmax (S553a).

After setting the gas replacement ratio X as mentioned above, the gas control unit 47 may calculate the gas replacement amount Q by the following formula (S554a).

$$Q=a\cdot P\cdot X$$

Here, a is a proportionality constant that itself is proportional to a volume of an inside space of the laser chamber.

Figure 23B:
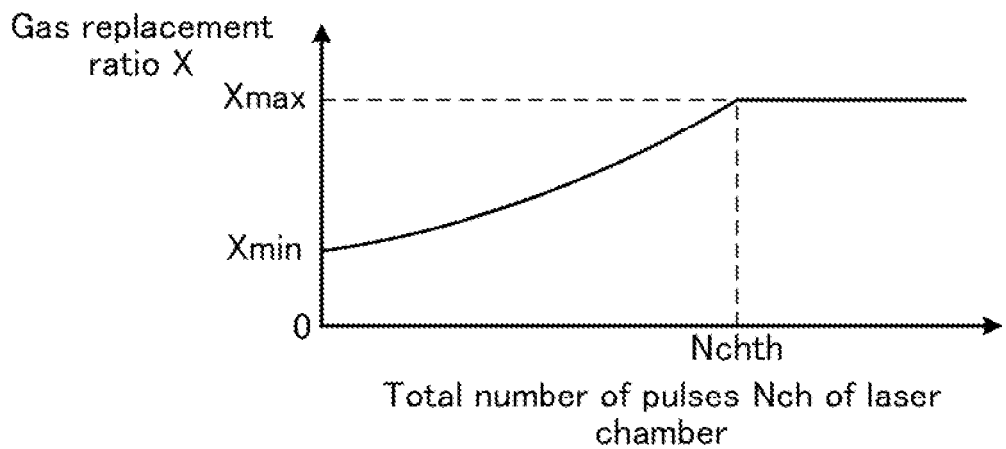
FIG. 23B is a graph showing a relationship between the total number of pulses Nch of the laser chamber and the gas replacement ratio X calculated in FIG. 23A.

FIG. 23B is a graph showing a relationship between the total number of pulses Nch of the laser chamber and the gas replacement ratio X calculated in FIG. 23A. If the total number of pulses Nch of the laser chamber is large, the pair of electrodes 11a and 11b may be old and a degree of deterioration may have been progressed. Accordingly, where the total number of pulses Nch of the laser chamber is large, it is preferable that the gas replacement ratio is higher than where the total number of pulses Nch of the laser chamber is small. As shown in FIG. 23B, the function X=g(Nch) is preferably a monotonically increasing function. For example, the function may be an n-th degree function, where n is a positive integer, or an exponential function.

Here, the gas replacement ratio X was calculated based on the total number of pulses Nch of the laser chamber. However, the number of pulses Ngas after the complete gas replacement may be used instead of the total number of pulses Nch of the laser chamber. Alternatively, the elapsed time Tgas after the complete gas replacement may be used instead of the total number of pulses Nch of the laser chamber.

Figure 24A:
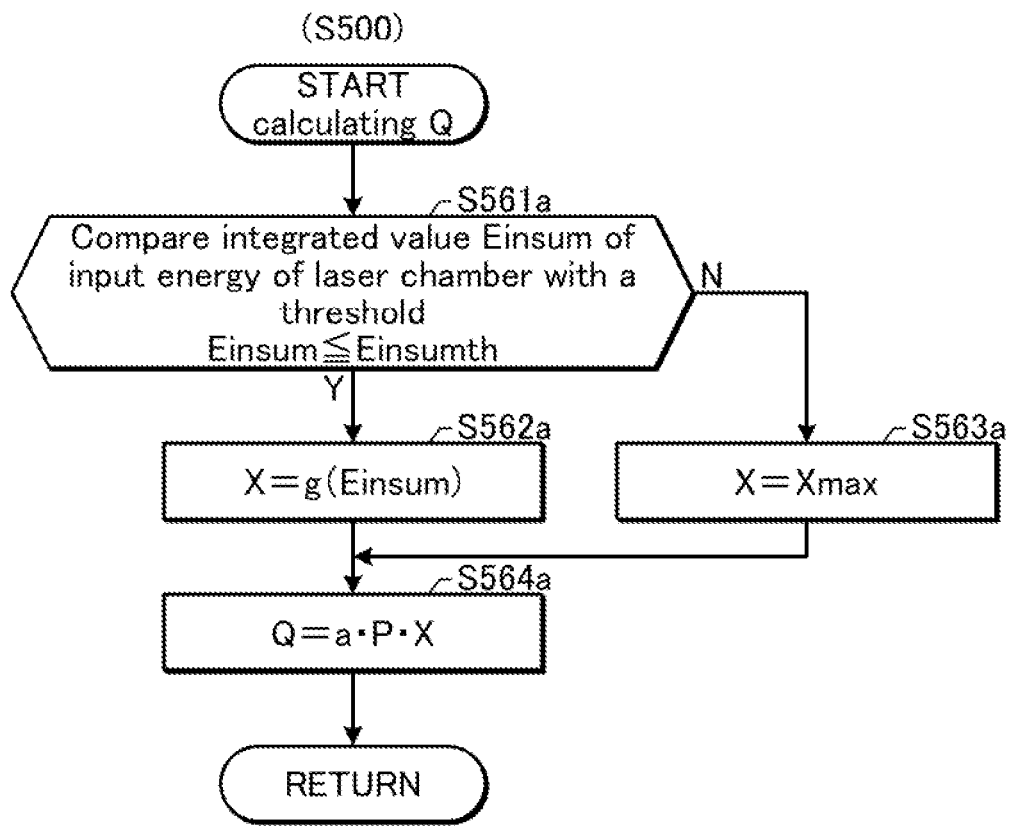
FIG. 24A is a flowchart illustrating a ninth example of a process to calculate the gas replacement amount Q shown in FIG. 4.

4.9.7 Relationship Between the Gas Replacement Amount and the Integrated Value of Input Energy of the Laser Chamber FIG. 24A is a flowchart illustrating a ninth example of a process to calculate the gas replacement amount Q shown in FIG. 4. The process shown in FIG. 24A may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may compare the integrated value Einsum of input energy of the laser chamber with a threshold value Einsumth (S561a). The integrated value Einsum of input energy of the laser chamber may be a parameter loaded in the process of FIG. 13. Data of the threshold value Einsumth may be stored by the gas control unit 47 in advance.

If the integrated value Einsum of input energy of the laser chamber is equal to or lower than the threshold value Einsumth (Einsum≤Einsumth), the gas control unit 47 may set the gas replacement ratio X to a variable that may continuously vary between the minimum value Xmin and the maximum value Xmax depending on Einsum. For example, the gas replacement ratio X may be a variable represented by g(Einsum) (S562a).

If the integrated value Einsum of input energy of the laser chamber is higher than the threshold value Einsumth (Einsum>Einsumth), the gas control unit 47 may set the gas replacement ratio X to the maximum value Xmax (S563a).

After setting the gas replacement ratio X, the gas control unit 47 may calculate the gas replacement amount Q by the following formula (S564a).

$$Q=a\cdot P\cdot X$$

Here, a is a proportionality constant that itself is proportional to a volume of an inside space of the laser chamber.

Figure 24B:
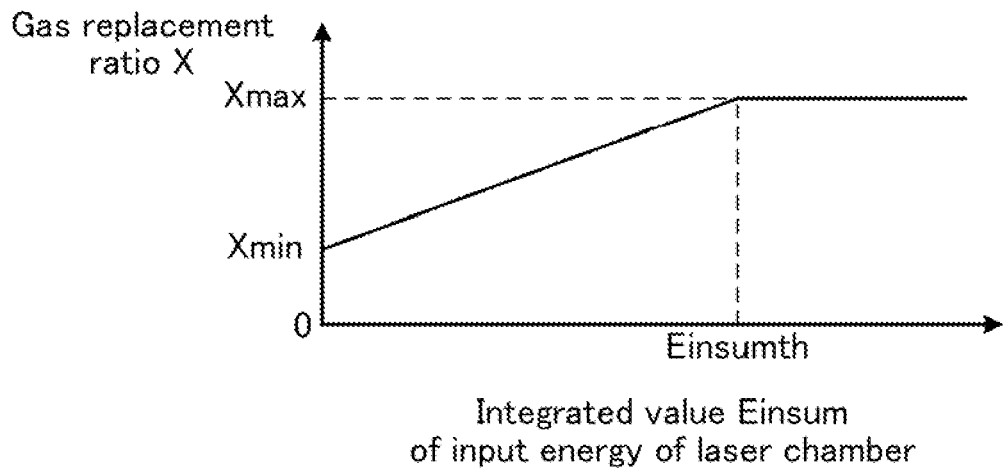
FIG. 24B is a graph showing a relationship between the integrated value Einsum of input energy of the laser chamber and the gas replacement ratio X calculated in FIG. 24A.

FIG. 24B is a graph showing a relationship between the integrated value Einsum of input energy of the laser chamber and the gas replacement ratio X calculated in FIG. 24A. If the integrated value Einsum of input energy of the laser chamber is large, the pair of electrodes 11a and 11b may be old and a degree of deterioration may have been progressed. Accordingly, where the integrated value Einsum of input energy of the laser chamber is large, it is preferable that the gas replacement ratio is higher than where the integrated value Einsum of input energy of the laser chamber is small. As shown in FIG. 24B, the function X=g(Einsum) is preferably a monotonically increasing function. For example, the function may be an n-th degree function, where n is a positive integer, or an exponential function.

Figure 25:
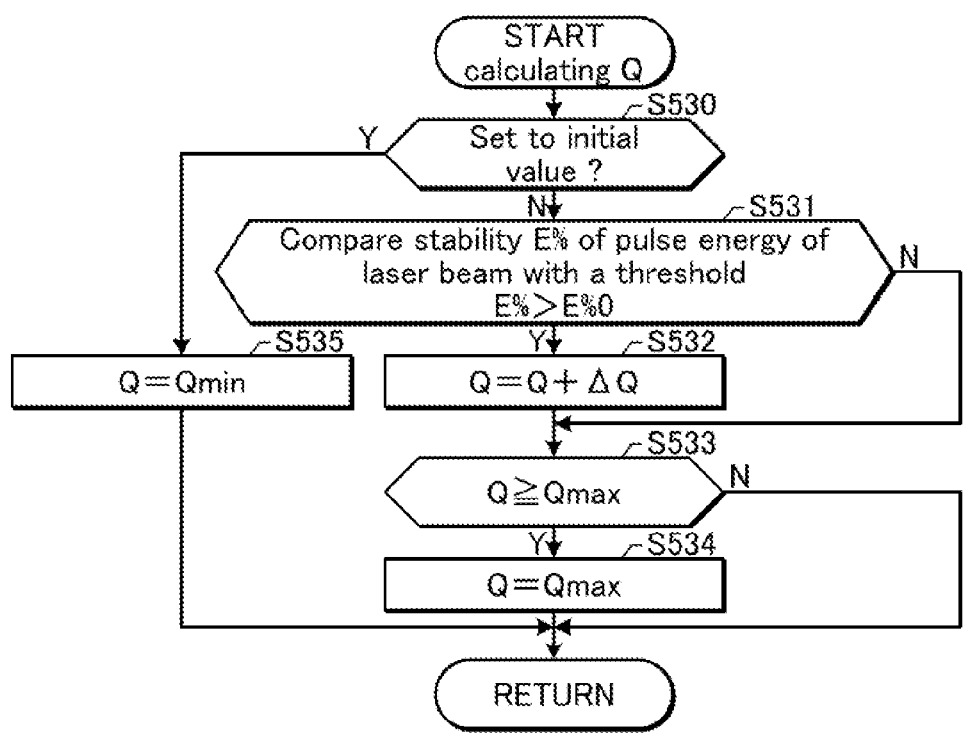
FIG. 25 is a flowchart illustrating a tenth example of a process to calculate the gas replacement amount shown in FIG. 4.

4.9.8 Relationship Between the Gas Replacement Amount and the Stability of the Pulse Energy FIG. 25 is a flowchart illustrating a tenth example of a process to calculate the gas replacement amount Q shown in FIG. 4. The process shown in FIG. 25 may be carried out by the gas control unit 47 as a subroutine of S500 shown in FIG.

4. In order to replace an appropriate amount of gas in the partial gas replacement control, a gas replacement amount Q may be calculated as follows.

First, the gas control unit 47 may determine whether or not the gas replacement amount Q is to be set to an initial value (S530). In a case where the process of this flowchart is executed for the first time, the gas control unit 47 may determine that the gas replacement amount Q is to be set to the initial value, and then proceed to S535. At S535, the gas control unit 47 may set the gas replacement amount Q to the initial value Qmin. In a case where the process of this flowchart has been executed before, the gas control unit 47 may skip the process of setting the gas replacement amount Q to the initial value, and proceed to S531. At S531, the gas control unit 47 may compare the stability E % of the pulse energy of the laser beam with a threshold value E %0. The stability E % of the pulse energy of the laser beam may be a parameter loaded in the process of FIG. 13. Data of the threshold value E %0 may be stored by the gas control unit 47 in advance.

If the stability E % of the pulse energy of the laser beam is higher than the threshold value E %0 (E %>E %0), the gas control unit 47 may add a constant value ΔQ to a present value of the gas replacement amount Q to reset a value of the gas replacement amount Q to a higher value (S532). Then, the gas control unit 47 may proceed to S533.

If the stability E of the pulse energy of the laser beam is equal to or lower than the threshold value E %0 (E %≤E %0), the gas control unit 47 may proceed to S533 without changing the gas replacement amount Q.

At S533, the gas control unit 47 may compare the gas replacement amount Q with the threshold value Qmax.

If the gas replacement amount Q is equal to or higher than the threshold value Qmax (Q≥Qmax), the gas control unit 47 may reset the gas replacement amount Q to Qmax (S534), and then terminate the process of this flowchart.

If the gas replacement amount Q is lower than the threshold value Qmax (Q<Qmax), the gas control unit 47 may terminate the process of this flowchart without resetting the gas replacement amount Q.

Figure 26:
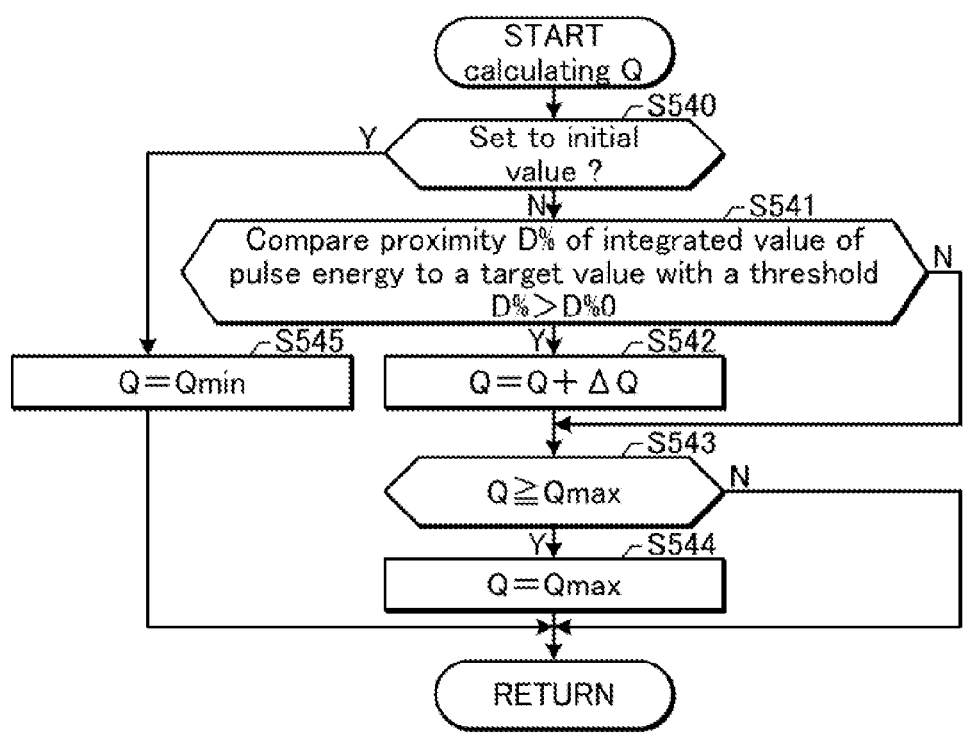
FIG. 26 is a flowchart illustrating an eleventh example of a process to calculate the gas replacement amount shown in FIG. 4.

4.9.9 Relationship Between the Gas Replacement Amount and the Proximity of the Pulse Energy to the Target Value FIG. 26 is a flowchart illustrating an eleventh example of a process to calculate the gas replacement amount Q shown in FIG. 4. The process shown in FIG. 26 may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may determine whether or not the gas replacement amount Q is to be set to an initial value (S540). In a case where the process of this flowchart is executed for the first time, the gas control unit 47 may determine that the gas replacement amount Q is to be set to the initial value, and then proceed to S545. At S545, the gas control unit 47 may set the gas replacement amount Q to the initial value Qmin. In a case where the process of this flowchart has been executed before, the gas control unit 47 may skip the process of setting the gas replacement amount Q to the initial value, and proceed to S541. At S541, the gas control unit 47 may compare the proximity D % of the pulse energy of the laser beam to the target value with a threshold value D %0. The proximity D % of the pulse energy of the laser beam to the target value may be a parameter loaded in the process of FIG. 13. Data of the threshold value D %0 may be stored by the gas control unit 47 in advance.

If the proximity D % of the pulse energy of the laser beam to the target value is higher than the threshold value D %0 (D %>D %0), the gas control unit 47 may add a constant value ΔQ to a present value of the gas replacement amount Q to reset a value of the gas replacement amount Q to a higher value (S542). Then, the gas control unit 47 may proceed to S543.

If the proximity D % of the pulse energy of the laser beam to the target value is equal to or lower than the threshold value D %0 (D %≤D %0), the gas control unit 47 may proceed to S543 without changing the gas replacement amount Q.

At S543, the gas control unit 47 may compare the gas replacement amount Q with the threshold value Qmax.

If the gas replacement amount Q is equal to or larger than the threshold value Qmax (Q Qmax), the gas control unit 47 may reset the gas replacement amount Q to Qmax (S544), and then terminate the process of this flowchart.

If the gas replacement amount Q is lower than the threshold value Qmax (Q<Qmax), the gas control unit 47 may terminate the process of this flowchart without resetting the gas replacement amount Q.

Figure 27A:
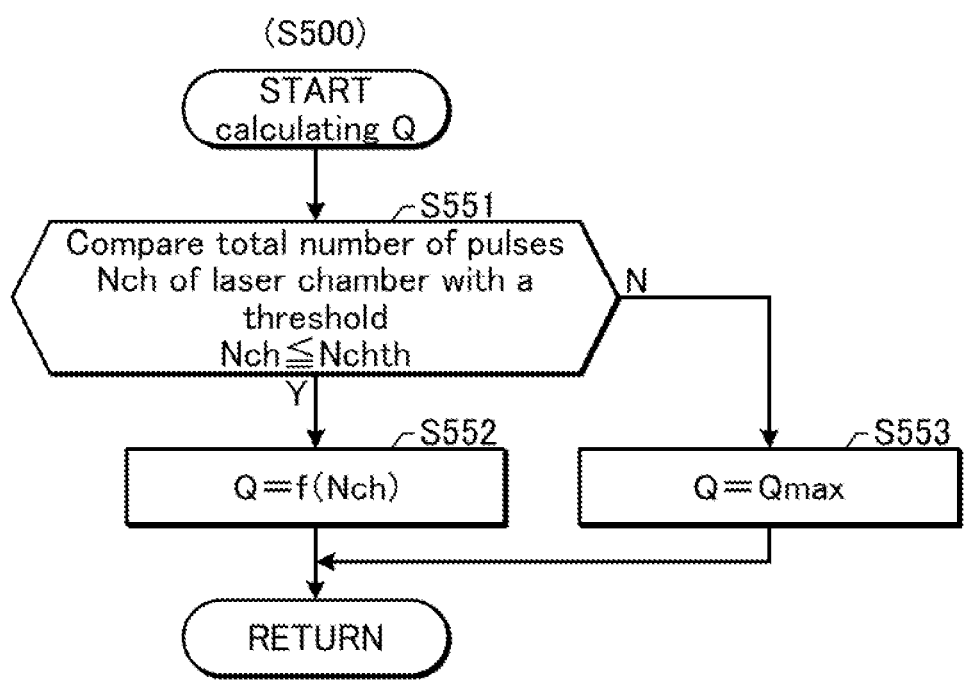
FIG. 27A is a flowchart illustrating a twelfth example of a process to calculate the gas replacement amount shown in FIG. 4.

4.9.10 Relationship Between the Gas Replacement Amount and the Total Number of Pulses of the Laser Chamber FIG. 27A is a flowchart illustrating a twelfth example of a process to calculate the gas replacement amount Q shown in FIG. 4. The process shown in FIG. 27A may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may compare the total number of pulses Nch of the laser chamber with a threshold value Nchth (S551). The total number of pulses Nch of the laser chamber may be a parameter loaded by the process of FIG. 13. Data of the threshold value Nchth may be stored by the gas control unit 47 in advance.

If the total number of pulses Nch of the laser chamber is equal to or less than a threshold value Nchth (Nch≤Nchth), the gas control unit 47 may set the gas replacement amount Q to a variable that may continuously vary between the minimum value Qmin and the maximum value Qmax depending on Nch. For example, the gas replacement amount Q may be a variable represented by f(Nch) (S552).

If the total number of pulses Nch of the laser chamber is larger than the threshold value Nchth (Nch>Nchth), the gas control unit 47 may set the gas replacement amount Q to the maximum value Qmax (S553).

Figure 27B:
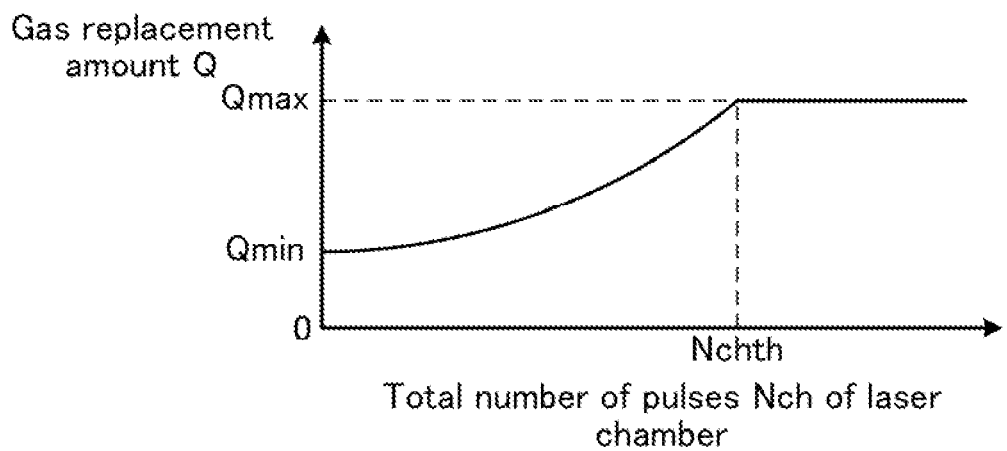
FIG. 27B is a graph showing a relationship between the total number of pulses of the laser chamber and the gas replacement amount calculated in FIG. 27A.

FIG. 27B is a graph showing a relationship between the total number of pulses Nch of the laser chamber and the gas replacement amount Q calculated in FIG. 27A. If the total number of pulses Nch of the laser chamber is large, the pair of electrodes 11a and 11b may be old and a degree of deterioration may have been progressed. Accordingly, where the total number of pulses Nch of the laser chamber is large, it is preferable that the gas replacement ratio or the gas replacement amount is higher than where the total number of pulses Nch of the laser chamber is small. As shown in FIG. 27B, the function Q=f(Nch) is preferably a monotonically increasing and downward convex function. For example, the function may be an n-th degree function, where n is a positive integer, or an exponential function.

Here, the gas replacement amount Q was calculated based on the total number of pulses Nch of the laser chamber. However, the number of pulses Ngas after the complete gas replacement may be used instead of the total number of pulses Nch of the laser chamber. Alternatively, the elapsed time Tgas after the complete gas replacement may be used instead of the total number of pulses Nch of the laser chamber.

Figure 28A:
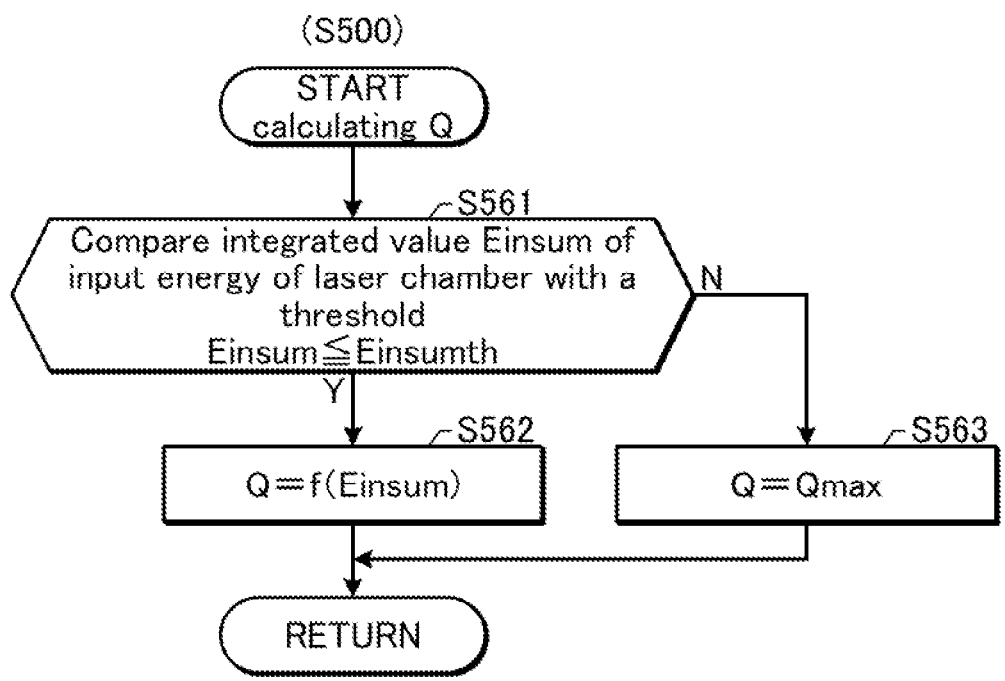
FIG. 28A is a flowchart illustrating a thirteenth example of a process to calculate the gas replacement amount shown in FIG. 4.

4.9.11 Relationship Between the Gas Replacement Amount and the Integrated Value of Input Energy of the Laser Chamber FIG. 28A is a flowchart illustrating a thirteenth example of a process to calculate the gas replacement amount Q shown in FIG. 4. The process shown in FIG. 28A may be carried out by the gas control unit 47 as a subroutine of S500 shown in FIG. 4. In order to replace an appropriate amount of gas in the partial gas replacement control, a gas replacement amount Q may be calculated as follows.

First, the gas control unit 47 may compare the integrated value Einsum of input energy of the laser chamber with a threshold value Einsumth (S561). The integrated value Einsum of input energy of the laser chamber may be a parameter loaded in the process of FIG. 13. Data of the threshold value Einsumth may be stored by the gas control unit 47 in advance.

If the integrated value Einsum of input energy of laser chamber is equal to or lower than the threshold value Einsumth (Einsum≤Einsumth), the gas control unit 47 may set the gas replacement amount Q to a variable that may continuously vary between the minimum value Qmin and the maximum value Qmax depending on Einsum. For example, the gas replacement amount Q may be a variable represented by f(Einsum) (S562).

If the integrated value Einsum of input energy of the laser chamber is higher than the threshold value Einsumth (Einsum>Einsumth), the gas control unit 47 may set the gas replacement amount Q to the maximum value Qmax (S563).

Figure 28B:
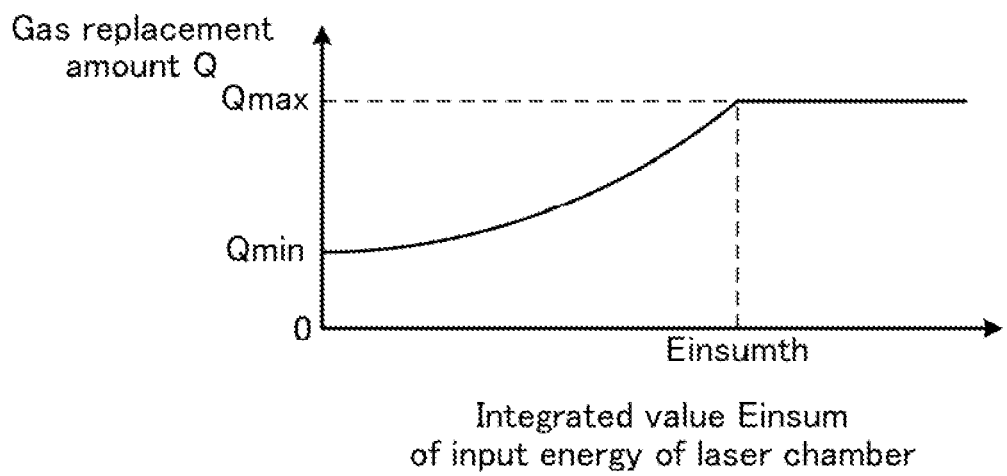
FIG. 28B is a graph showing a relationship between the integrated value of input energy of the laser chamber and the gas replacement amount calculated in FIG. 28A.

FIG. 28B is a graph showing a relationship between the integrated value Einsum of input energy of the laser chamber and the gas replacement amount Q calculated in FIG. 28A. If the integrated value Einsum of input energy of the laser chamber is large, the pair of electrodes 11a and 11b may be old and a degree of deterioration may have been progressed. Accordingly, where the integrated value Einsum of input energy of the laser chamber is large, it is preferable that the gas replacement ratio or the gas replacement amount is higher than where the integrated value Einsum of input energy of the laser chamber is small. As shown in FIG. 28B, the function Q=f(Einsum) is preferably a monotonically increasing and downward convex function. For example, the function may be an n-th degree function, where n is a positive integer, or an exponential function.

4.10 Relationship Between the Gas Control Interval and the Deterioration Parameter of the Electrodes (Details of S300)

Figure 29A:
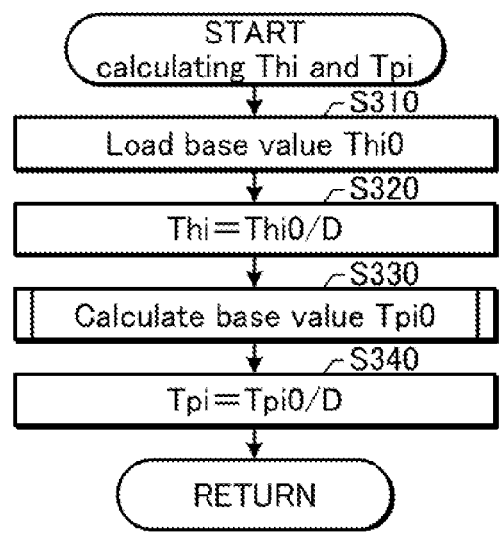
FIG. 29A is a flowchart illustrating a second example of a process to calculate the gas control interval shown in FIG. 4.

FIG. 29A is a flowchart illustrating a second example of a process to calculate the gas control interval shown in FIG. 4. The process shown in FIG. 29A may be carried out by the gas control unit 47 as a subroutine of S300 shown in FIG. 4.

In the process shown in FIG. 29A, the base value Tpi0 of the time interval for the partial gas replacement control may be calculated (S330), which may be different from the process described in reference to FIG. 14A. In other aspects, the process in FIG. 29A may be substantially the same as the process described in reference to FIG. 14A.

First, the gas control unit 47 may load the base value Thi0 of the time interval for the halogen gas replenishment control (S310).

Next, the gas control unit 47 may calculate the time interval Thi for the halogen gas replenishment control, based on the base value Thi0 of the time interval for the halogen gas replenishment control and the duty D of the excimer laser apparatus, as Thi0/D (S320).

Next, the gas control unit 47 may calculate the base value Tpi0 of the time interval for the partial gas replacement control (S330). Details of this process will be described later in reference to FIG. 29B.

Next, the gas control unit 47 may calculate the time interval Tpi of the time interval for the partial gas replacement control, based on the base value Tpi0 of the time interval for the partial gas replacement control and the duty D of the excimer laser apparatus, as Tpi0/D (S340).

FIG. 23B is a flowchart illustrating a process to calculate a base value Tpi0 of the time interval for partial gas replacement control shown in FIG. 29A. The process shown in FIG. 29B may be carried out by the gas control unit 47 as a subroutine of S330 shown in FIG. 29A.

First, the gas control unit 47 may compare the total number of pulses Nch of the laser chamber with the threshold value Nchth (S331). The total number of pulses Nch of the laser chamber may be a parameter loaded in the process of FIG. 13. Data of the threshold value Nchth may be stored by the gas control unit 47 in advance.

If the total number of pulses Nch of the laser chamber is equal to or less than the threshold value Nchth (Nch≤Nchth), the gas control unit 47 may set the base value Tpi0 to a variable that may continuously vary between the minimum value Tmin and the maximum value Tmax depending on Nch. For example, the base value Tpi0 may be a variable represented by 1/f(Nch) (S332). Accordingly, 1/Tpi0=f(Nch) may be satisfied.

If the total number of pulses Nch of the laser chamber is more than the threshold value Nchth (Nch>Nchth), the gas control unit 47 may set the base value Tpi0 to the minimum value Tmin (S333).

Figure 29B:
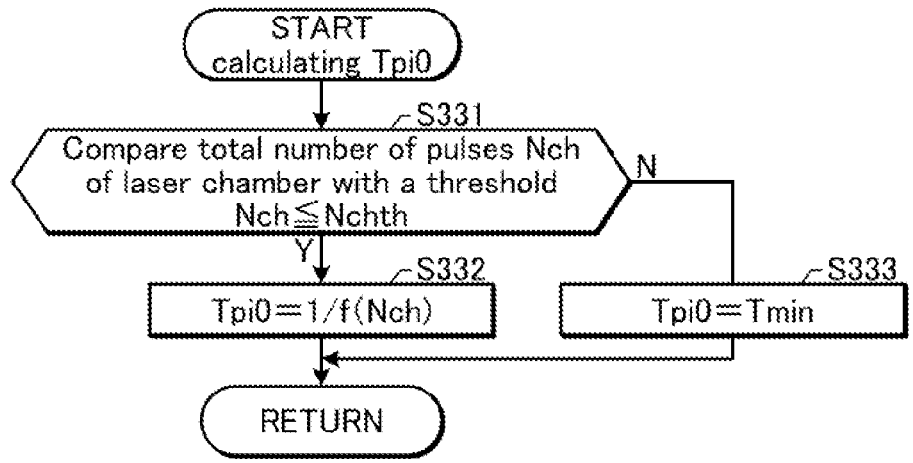
FIG. 29B is a flowchart illustrating a process to calculate a base value of the time interval for partial gas replacement control shown in FIG. 29A.
Figure 29C:
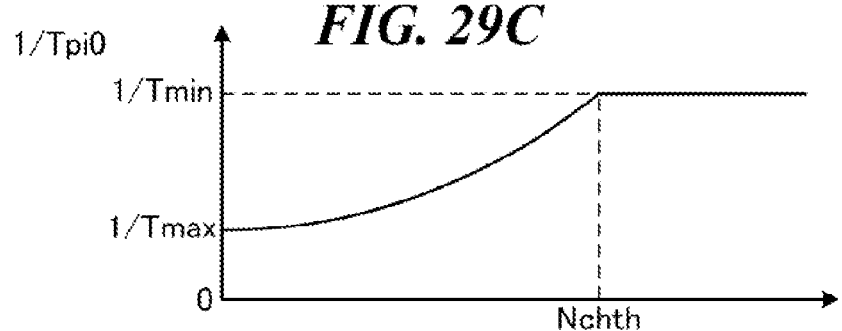
FIG. 29C is a graph showing a relationship between the total number of pulses of the laser chamber and the base value calculated in FIG. 29B.

FIG. 29C is a graph showing a relationship between the total number of pulses Nch of the laser chamber and the base value Tpi0 calculated in FIG. 29B. If the total number of pulses Nch of the laser chamber is large, the pair of electrodes 11a and 11b may be old and a degree of deterioration may have been progressed. Accordingly, where the total number of pulses Nch of the laser chamber is large, it is preferable that the base value Tpi0 of the time interval for the partial gas replacement control is shorter than where the total number of pulses Nch of the laser chamber is small, so that the partial gas replacement control is frequently performed. As shown in FIG. 29C, the function 1/Tpi0=f(Nch) is preferably a monotonically increasing and downward convex function. For example, the function may be an n-th degree function, where n is a positive integer, or an exponential function.

In the process shown in FIG. 29E, the total number of pulses Nch of the laser chamber was used as the deterioration parameter. However, one of the parameters loaded by one of S205 to S209 of FIG. 13 may also be used as the deterioration parameter.

4.11 Gas Pressure Control (Details of S600)

Figure 30:
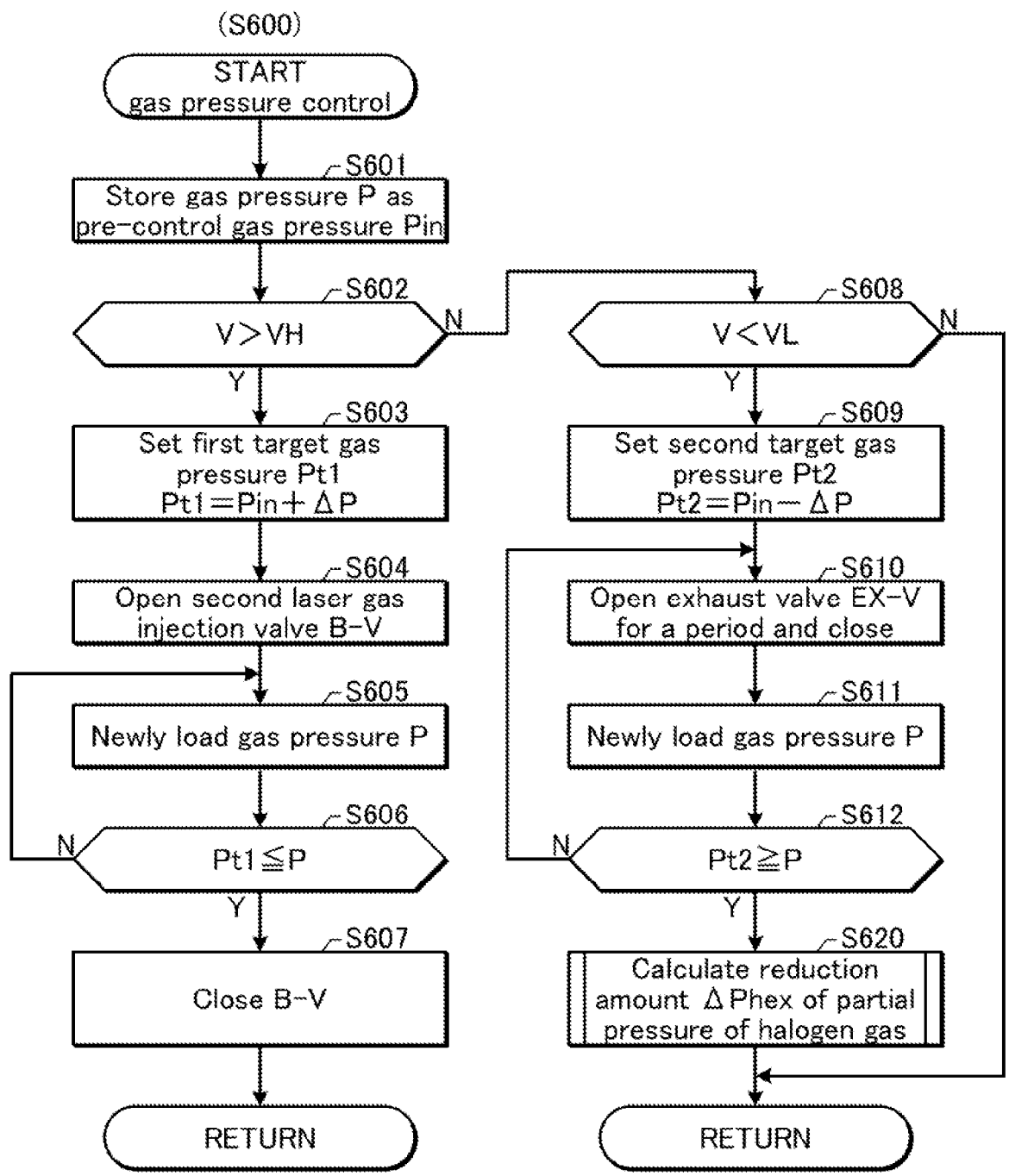
FIG. 30 is a flowchart illustrating gas pressure control shown in FIG. 4.

FIG. 30 is a flowchart illustrating gas pressure control shown in FIG. 4. The process shown in FIG. 30 may be carried out by the gas control unit 47 as a subroutine of S600 shown in FIG. 4.

First, the gas control unit 47 may store the gas pressure P in the laser chamber 10 as a pre-control gas pressure Pin in the storage device (S601). The gas pressure P may have been received from the pressure sensor 16.

Next, the gas control unit 47 may determine whether or not the charging voltage V supplied between the pair of electrodes 11a and 11b is greater than the first threshold value VH (S602). In the case were the charging voltage V is greater than the first threshold value VH (S602: YES), the gas control unit 47 may carry out the control from S603 to S607, for supplying the second laser gas to the laser chamber 10. In the case where the charging voltage V is not greater than the first threshold value VH (S602: NO), the process may transit to S608.

In the case where the charging voltage V is greater than the first threshold value VH (S602: YES), the gas control unit 47 may set a value (Pin+ΔP) obtained by adding a gas pressure change amount ΔP to the pre-control gas pressure Pin as a first target gas pressure Pt1 (S603).

Next, the gas control unit 47 may supply the second laser gas to the interior of the laser chamber 10 by opening the second laser gas injection valve B-V and the control valve C-V (S604). The flow rate of the second laser gas may be controlled by the mass flow controller B-MFC. As described above, a mixed gas that is a mixture of argon and neon may be used as the second laser gas. By supplying the second laser gas, which does not contain halogen gas, to the interior of the laser chamber 10, it may be possible to suppress a fluctuation in the partial pressure of the halogen gas in the laser chamber 10. In other words, aside from raising the gas pressure P in the laser chamber 10, fluctuations in the oscillation conditions of the laser beam may be suppressed. Therefore, it may be possible to ensure the stability of the performance of the excimer laser apparatus.

Next, the gas control unit 47 may newly load a gas pressure P in the laser chamber 10 (S605). Next, the gas control unit 47 may determine whether or not the newly-loaded gas pressure P has reached the first target gas pressure Pt1 (S606). In the case where the gas pressure P has not reached the first target gas pressure Pt1 (Pt1>P), the process may return to the aforementioned. 3605 with the second laser gas injection valve B-V remaining open, and may stand by until the gas pressure P reaches the first target gas pressure Pt1. In the case where the gas pressure P has reached the first target gas pressure Pt1 (Pt1≤P), the gas control unit 47 may close the control valve C-V and the second laser gas injection valve B-V (S607).

In the case where the charging voltage V supplied between the pair of electrodes 11a and 11b is not greater than the first threshold value VH (S602: NO), the gas control unit 47 may determine whether or not the charging voltage V is lower than the second threshold value VL (S608). Here, based on the results of the determinations in S590 of the main flow and S602 of the present subroutine, V<VL may already hold true at the point in time where the process has moved to S608. In this case, the determination of YES in S608 may be omitted. In the case where the charging voltage V is lower than the second threshold value VL (S608: YES), the gas control unit 47 may partially exhaust the gas from within the laser chamber 10 in S609 through S620. In the case where the charging voltage V is not lower than the second threshold value VL (S608: NO), the control of S609 through S620 need not be carried out. In other words, in the case where the charging voltage V supplied between the pair of electrodes 11a and 11b is within the range from the first threshold value VH to the second threshold value VL, the gas pressure control need not be started.

In the case where the charging voltage V is less than the second threshold value VL (S608: YES), the gas control unit 47 may set a value obtained by subtracting the gas pressure change amount ΔP from the pre-control gas pressure Pin (Pin-ΔP) as a second target gas pressure Pt2 (S609). At this time, the gas control unit 47 may start the exhaust pump 46 and open the control valve C-V.

Next, the gas control unit 47 may partially exhaust the gas from within the laser chamber 10 by opening the exhaust valve EX-V for a predetermined amount of time and then closing the exhaust valve EX-V (S610).

Next, the gas control unit 47 may newly load a pressure P in the laser chamber 10 (S611). Next, the gas control unit 47 may determine whether or not the newly-loaded gas pressure P has reached the second target gas pressure Pt2 (S612). In the case where the gas pressure P has not reached the second target gas pressure Pt2 (Pt2<P), the process may return to the aforementioned S610, and the partial exhaust of the gas from within the laser chamber 10 may be repeated until the gas pressure P reaches the second target gas pressure Pt2. In the case where the gas pressure P has reached the second target gas pressure Pt2 (Pt2≥P), the gas control unit 47 may calculate a reduction amount ΔPhex of the partial pressure of the halogen gas resulting from the gas exhaust (S620). At this time, the gas control unit 47 may close the control valve C-V and stop the exhaust pump 46.

Figure 31:
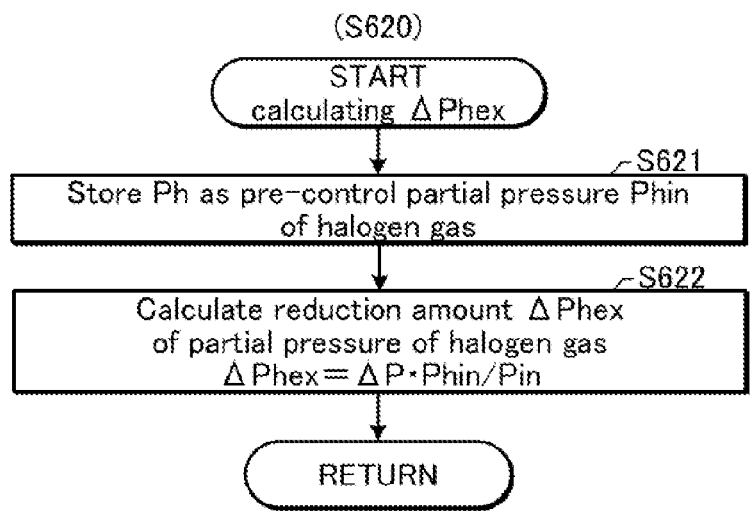
FIG. 31 is a flowchart illustrating a process to calculate a reduction amount of the partial pressure of halogen gas shown in FIG. 30.

FIG. 31 is a flowchart illustrating a process to calculate a reduction amount ΔPhex of the partial pressure of halogen gas shown in FIG. 30. When the gas pressure is reduced through the control carried out in S609 through S612 of FIG. 30, the partial pressure of the halogen gas in the laser chamber 10 may decrease. Accordingly, the gas control unit 47 may, through the following processing, calculate the reduction amount ΔPhex of the partial pressure of the halogen gas.

First, the gas control unit 47 may load the partial pressure Ph of the halogen gas calculated in the aforementioned S400 (FIG. 4), and may store the partial pressure Ph of the halogen gas in the storage device as a pre-control partial pressure Phin of the halogen gas (S621).

Next, the gas control unit 47 may calculate the reduction amount ΔPhex of the partial pressure of the halogen gas as ΔP·Phin/Pin, using the gas pressure change amount ΔP resulting from the gas pressure control, the pre-control partial pressure Phin of the halogen gas, and the pre-control gas pressure Pin (S622).

Note that after the process of S620 shown in FIG. 31 ends, the processing may return to S200 in FIG. 4, and the partial pressure Ph of the halogen gas may be recalculated in S400. At this time, the partial pressure Ph of the halogen gas may be recalculated by subtracting the reduction amount ΔPhex from the partial pressure of the halogen gas calculated in FIG. 31. The halogen gas replenishment control (S700) may be carried out using the partial pressure Ph of the halogen gas calculated in this manner.

Figure 32A:
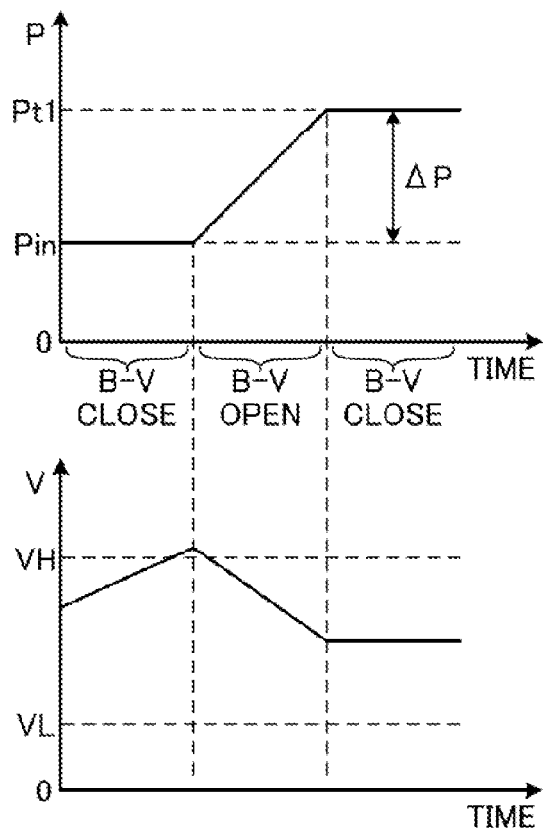
FIG. 32A is a graph showing changes in the gas pressure in the laser chamber and the voltage applied between the electrodes resulting from opening/closing of a second laser gas injection valve shown in FIG. 30.

FIG. 32A is a graph showing changes in the gas pressure in the laser chamber and the voltage applied between the electrodes resulting from opening/closing of a second laser gas injection valve shown in FIG. 30.

In the case where the charging voltage V supplied between the pair of electrodes 11a and 11b is within the range from the first threshold value VH to the second threshold value VL, it may be possible that the gas pressure control is not started. However, as shown in FIG. 32A, the gas pressure control may start if the charging voltage V exceeds the first threshold value VH. In the case where the charging voltage V has exceeded the first threshold value VH, the second laser gas injection valve B-V may be opened as a result of the gas pressure control, and the gas pressure P in the laser chamber 10 may increase gradually from the pre-control gas pressure Pin. When the gas pressure P in the laser chamber 10 increases, the output of the excimer laser apparatus also tends to increase. Therefore, the charging voltage V may be decreased through the processing shown in FIG. 5 in order to make the output of the excimer laser apparatus constant. When the gas pressure P in the laser chamber 10 reaches the first target gas pressure Pt1, the second laser gas injection valve B-V is closed. Thus, the increase in the gas pressure P may stop, which in turn may also stop the decrease in the charging voltage V.

In this manner, by increasing the gas pressure P in the laser chamber 10, an excessive increase in the charging voltage V supplied between the pair of electrodes 11a and 11b may be suppressed.

Figure 32B:
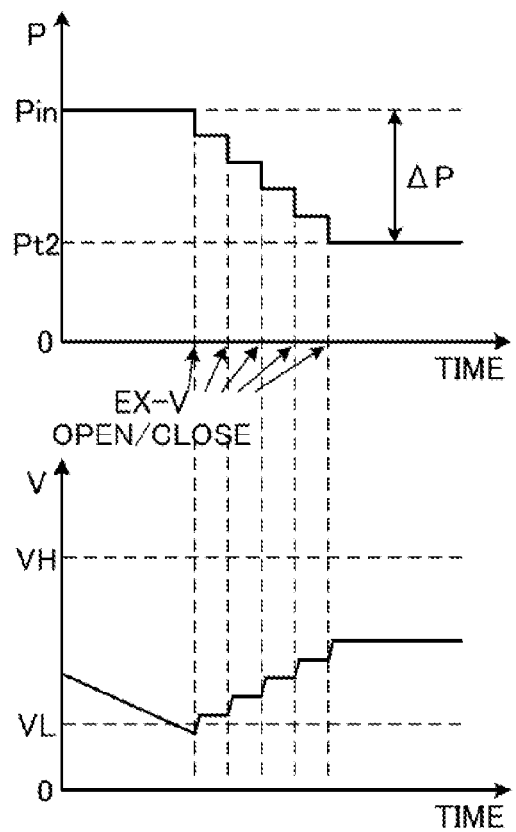
FIG. 32B is a graph showing changes in the gas pressure in the laser chamber and the voltage applied between the electrodes resulting from opening/closing of an exhaust valve shown in FIG. 30.

FIG. 32B is a graph showing changes in the gas pressure in the laser chamber and the voltage applied between the electrodes resulting from opening/closing of an exhaust valve shown in FIG. 30.

In the case where the charging voltage V supplied between the pair of electrodes 11a and 11b is within the range from the first threshold value VH to the second threshold value VL, it may be possible that the gas pressure control is not started. However, as shown in FIG. 32B, the gas pressure control may start if the charging voltage V becomes less than the second threshold value VL. In the case where the charging voltage V has become less than the second threshold value VL, the exhaust valve EX-V may be opened for a predetermined amount of time and then be closed as a result of the gas pressure control. Thus, the gas pressure P in the laser chamber 10 may decrease slightly from the pre-control gas pressure Pin. When the gas pressure P in the laser chamber 10 decreases, the output of the excimer laser apparatus also tends to decrease. Accordingly, in order to make the output of the excimer laser apparatus constant, the charging voltage V may be increased through the processing shown in FIG. 5.

The opening/closing operations of the exhaust valve EX-V may be repeated until the gas pressure P in the laser chamber 10 reaches the second target gas pressure Pt2. With each repetition, the gas pressure P in the laser chamber 10 may decrease slightly, and the charging voltage V may increase slightly. When the gas pressure P in the laser chamber 10 reaches the second target gas pressure Pt2, the opening/closing operations of the exhaust valve EX-V may end. Thus, the decrease in the gas pressure P may stop, which in turn may also stop the increase in the charging voltage V.

In this manner, by decreasing the gas pressure P in the laser chamber 10, an excessive decrease in the charging voltage V supplied between the pair of electrodes 11a and 11b may be suppressed.

4.12 Halogen Gas Replenishment Control (Details of S700)

Figure 33:
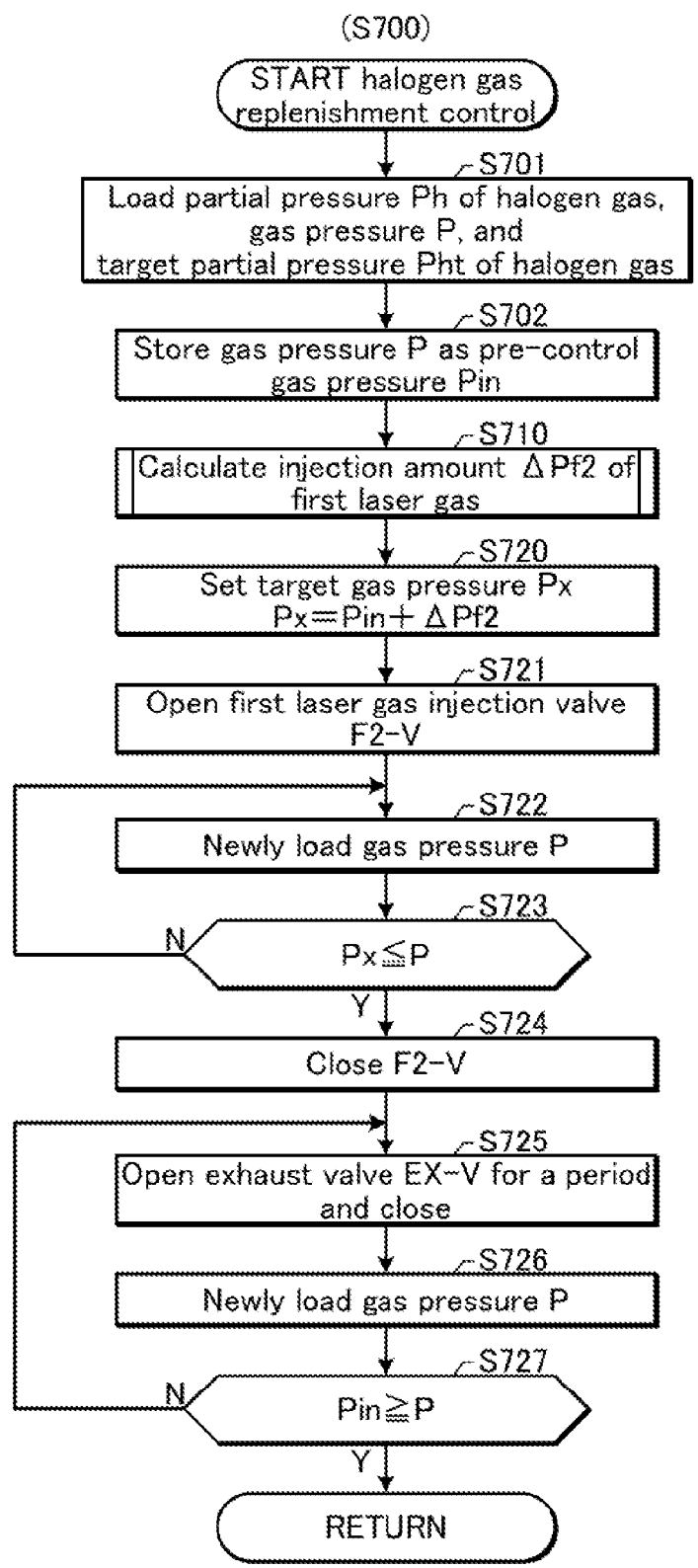
FIG. 33 is a flowchart illustrating halogen gas replenishment control shown in FIG. 4.

FIG. 33 is a flowchart illustrating halogen gas replenishment control shown in FIG. 4. The process shown in FIG. 33 may be carried out by the gas control unit 47 as a subroutine of S700 shown in FIG. 4.

First, the gas control unit 47 may load the partial pressure Ph of the halogen gas, the gas pressure P, and a target partial pressure Pht of the halogen gas (S701). The partial pressure Ph of the halogen gas may be that calculated in the aforementioned 3400 (FIG. 4). The gas pressure P may have been received from the pressure sensor 16. The target partial pressure Pht of the halogen gas may be a value that is set in accordance with operational conditions of the excimer laser apparatus.

Next, the gas control unit 47 may store the gas pressure P as the pre-control gas pressure Pin in the storage device (S702). Next, the gas control unit 47 may calculate an injection amount $\Delta Pf2$ of a first laser gas, thereby controlling the partial pressure of the halogen gas in the laser chamber 10 to the target partial pressure Pht of the halogen gas (S710). Details of this calculation process will be provided later.

Next, the gas control unit 47 may add the injection amount $\Delta Pf2$ of the first laser gas to the pre-control gas pressure Pin to obtain a value Pin+$\Delta Pf2$. The gas control unit 47 may set the value Pin+$\Delta Pf2$ as a target gas pressure Px present following the first laser gas injection and before exhausting gas (S720). Next, the gas control unit 47 may supply the first laser gas to the interior of the laser chamber 10 by opening the first laser gas injection valve F2-V and the control valve C-V (S721). The flow rate of the first laser gas may be controlled by the mass flow controller F2-MFC. As described above, a mixed gas that is a mixture of argon, neon, and fluorine may be used as the first laser gas. The partial pressure of the halogen gas in the laser chamber 10 may be increased by supplying the first laser gas, which includes fluorine gas, to the interior of the laser chamber 10.

Next, the gas control unit 47 may newly load a gas pressure P in the laser chamber 10 (S722). Next, the gas control unit 47 may determine whether or not the newly-loaded gas pressure P has reached the target gas pressure Px present following the first laser gas injection (S723). In the case where the gas pressure P has not reached the target gas pressure Px (Px>P), the process may return to the aforementioned S722 with the first laser gas injection valve F2-V remaining open, and may stand by until the gas pressure P reaches the target gas pressure Px. In the case where the gas pressure P has reached the target gas pressure Px (Px≤P), the gas control unit 47 may close the control valve C-V and the first laser gas injection valve F2-V (S724). After this, the gas control unit 47 may start the exhaust pump 46 and open the control valve C-V. At this time, the exhaust valve EX-V may be closed.

Next, the gas control unit 47 may partially exhaust the gas from within the laser chamber 10 by opening the exhaust valve EX-V for a predetermined amount of time and then closing the exhaust valve EX-V (S725).

Next, the gas control unit 47 may newly load a gas pressure P in the laser chamber 10 (S726). Next, the gas control unit 47 may determine whether or not the newly-loaded gas pressure P has returned to the pre-control gas pressure Pin (S727). In the case where the gas pressure P has not returned to the pre-control gas pressure Pin (Pin<P), the process may return to the aforementioned S725. The partial exhaust of gas from within the laser chamber 10 may be repeated until the gas pressure P returns to the pre-control gas pressure Pin. During this operation, the exhaust pump 46 may be running, and the control valve C-V may be open. In the case where the gas pressure P has returned to the pre-control gas pressure Pin (Pin≥P), the gas control unit 47 may close the control valve C-V and stop the exhaust pump 46. Then, the processing of this flowchart may end.

Figure 34:
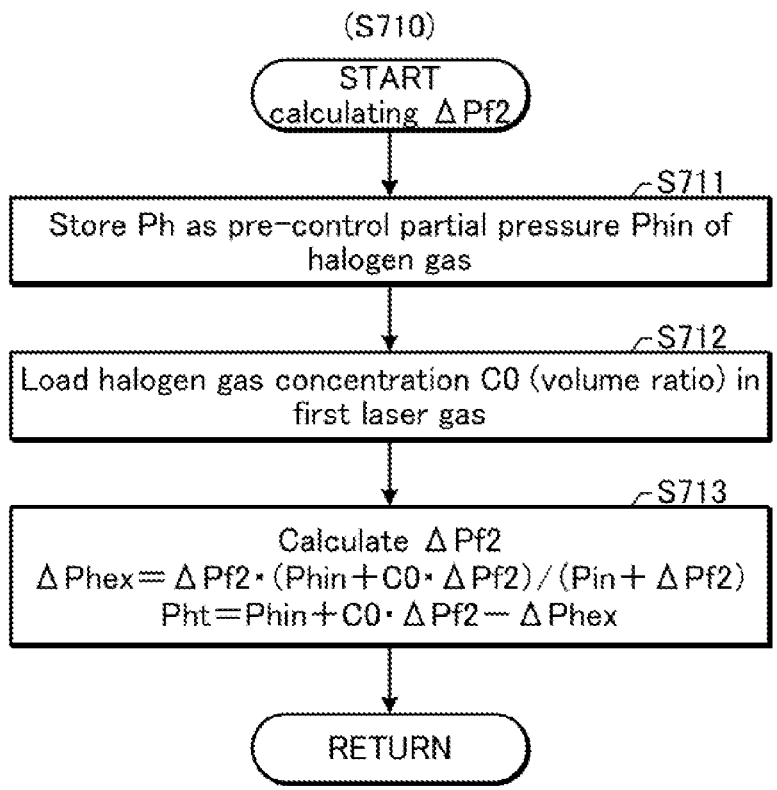
FIG. 34 is a flowchart illustrating a process to calculate an injection amount of a first laser gas shown in FIG. 33.

FIG. 34 is a flowchart illustrating a process to calculate an injection amount $\Delta Pf2$ of a first laser gas shown in S710 of FIG. 33. The gas control unit 47 may, through the following processing, calculate an injection amount $\Delta Pf2$ of the first laser gas.

First, the gas control unit 47 may store the partial pressure Ph of the halogen gas calculated in the aforementioned S400 (FIG. 4) in the storage device as the pre-control partial pressure Phin of the halogen gas (S711).

Next, the gas control unit 47 may load a halogen gas concentration (volume ratio) C0 in the first laser gas (S712). The halogen gas concentration in the first laser gas may be a halogen gas concentration (volume ratio) in the first receptacle F2. Alternatively, the halogen gas concentration in the first laser gas may be inputted into the gas control unit 47 in advance and retrievably stored by the gas control unit 47.

An increase amount $\Delta Ph$ of the partial pressure of the halogen gas in the case where the first laser gas is injected into the laser chamber 10 (by the injection amount $\Delta Pf2$) may be expressed by the following formula.

$$\Delta Ph = C0 \cdot \Delta Pf2$$

After the first laser gas has been injected into the laser chamber 10, exhausting (exhausting an amount of gas equivalent to the injection amount Pf2) may be performed to the pre-control gas pressure Pin. The partial pressure of the halogen gas to be decreased due to such exhausting (that is, a reduction amount $\Delta Phex$) may be expressed by the following formula.

$$\Delta Phex = \Delta Pf2 \cdot (Phin + C0 \cdot \Delta Pf2)/(Pin + \Delta Pf2) \qquad \text{Formula 1}$$

Meanwhile, the target partial pressure Pht of the halogen gas may be expressed by the following formula.

$$Pht = Phin + C0 \cdot \Delta Pf2 - \Delta Phex \qquad \text{Formula 2}$$

Accordingly, the gas control unit 47 may calculate the injection amount $\Delta Pf2$ of the first laser gas that fulfills Formulas 1 and 2 (S713). Alternatively, the gas control unit 47 may have table data in advance and the injection amount $\Delta Pf2$ of the first laser gas may be determined by referring to this table. The table may hold values of the injection amount $\Delta Pf2$ of the first laser gas in relation to values of, for example, the gas pressure P, the partial pressure Ph of the halogen gas, the target partial pressure Pht of the halogen gas, or the like.

Figure 35:
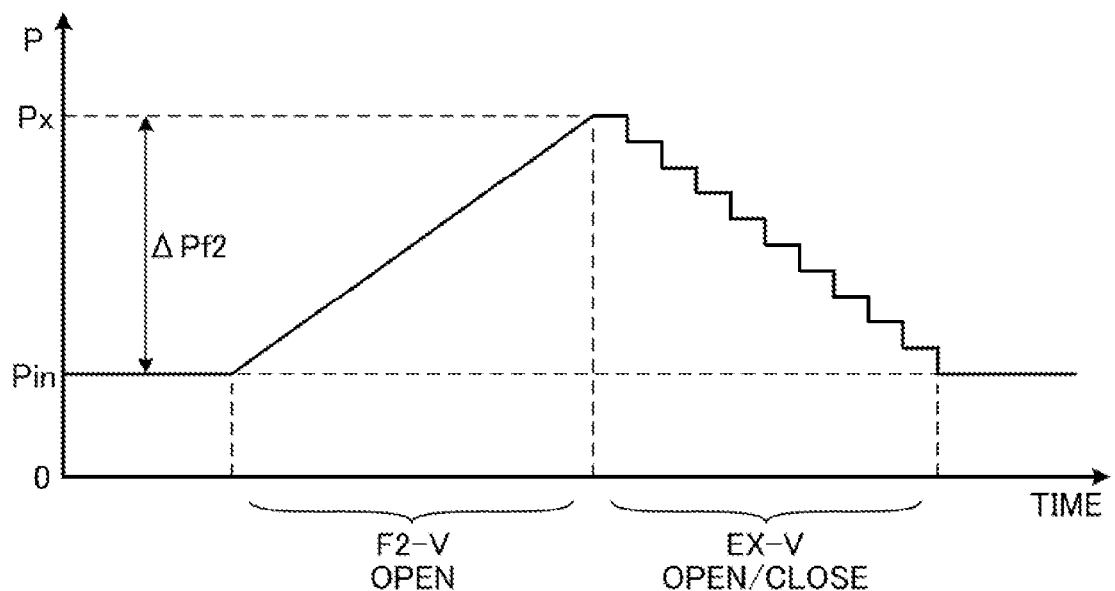
FIG. 35 is a graph showing a change in the gas pressure in the laser chamber resulting from the halogen gas replenishment control shown in FIG. 33.

FIG. 35 is a graph showing a change in the gas pressure in the laser chamber resulting from the halogen gas replenishment control shown in FIG. 33. The gas control unit 47 may start the halogen gas replenishment control at every time interval Thi of the halogen gas replenishment control. When the halogen gas replenishment control is started, the first laser gas injection valve F2-V and the control valve C-V are opened, and thus the gas pressure P in the laser chamber 10 may increase gradually from the pre-control gas pressure Pin. When the gas pressure P in the laser chamber 10 reaches the target gas pressure Px, the control valve C-V and the first laser gas injection valve F2-V are closed, and thus the increase in the gas pressure P may be stopped.

Next, the exhaust pump 46 may be started, and the control valve C-V may be opened. After that, the exhaust valve EX-V may be opened for a predetermined amount of time and then closed. As a result, the gas pressure P in the laser chamber 10 may decrease slightly from the target gas pressure Px. The opening/closing operations of the exhaust valve EX-V are repeated until the gas pressure P in the laser chamber 10 reaches the pre-control gas pressure Pin, and with each repetition, the gas pressure P in the laser chamber 10 may decrease slightly. If the gas pressure P in the laser chamber 10 reaches the pre-control gas pressure Pin, the opening/closing operations of the exhaust valve EX-II may end. Thus the decrease in the gas pressure P may stop. Thereafter, the control valve C-V may be closed and the exhaust pump 46 may be stopped.

In this manner, the halogen gas may be supplied to the interior of the laser chamber 10, and the gas pressure P in the laser chamber 10 may then be returned to a value that is close to the pre-control gas pressure Pin. Accordingly, in the halogen gas replenishment control, fluctuations in the oscillation conditions of the laser beam may be suppressed, even while the partial pressure of the halogen gas in the laser chamber 10 is increased. Therefore, it may be possible to ensure the stability of the performance of the excimer laser apparatus.

4.13 Partial Gas Replacement Control (Details of S800)

Figure 36:
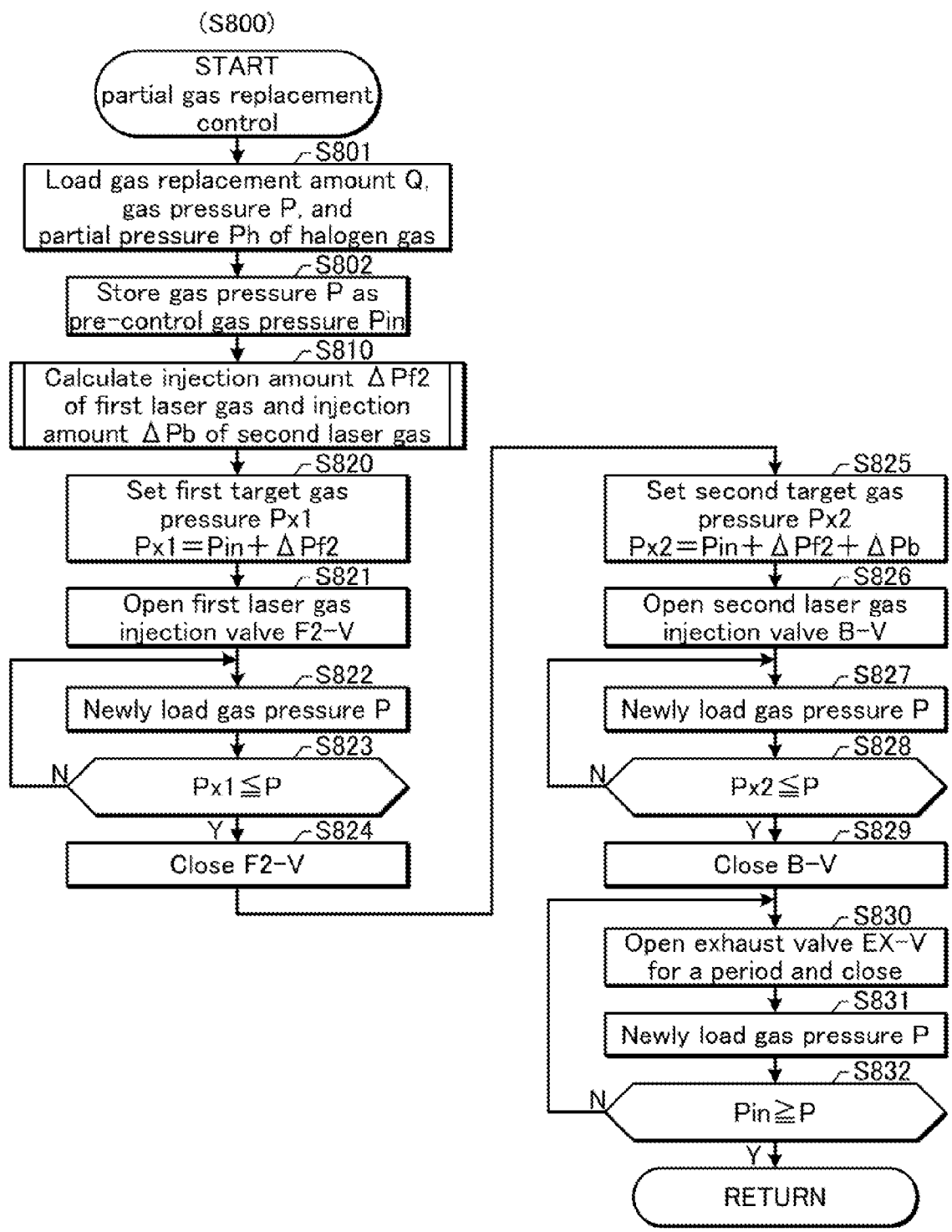

FIG. 36 is a flowchart illustrating the partial gas replacement control shown in FIG. 4. The process shown in FIG. 36 may be carried out by the gas control unit 47 as a subroutine of S800 shown in FIG. 4.

First, the gas control unit 47 may load the gas replacement amount Q, the gas pressure P, and the partial pressure Ph of the halogen gas (S801). The gas replacement amount Q may be that calculated in the aforementioned S500 (FIG. 4). The gas pressure P may have been received from the pressure sensor 16. The partial pressure Ph of the halogen gas may have been calculated in the aforementioned S400 (FIG. 4).

Next, the gas control unit 47 may store the gas pressure P as the pre-control gas pressure Pin in the storage device (S802). Next, the gas control unit 47 may calculate the injection amount $\Delta Pf2$ of the first laser gas and an injection amount $\Delta Pb$ of the second laser gas for the partial gas replacement control (S810). Details of this calculation process will be provided later.

Next, the gas control unit 47 may add the injection amount $\Delta Pf2$ of the first laser gas to the pre-control gas pressure Pin to obtain a value Pin+$\Delta Pf2$. The gas control unit 47 may set the value Pin+$\Delta Pf2$ as a first target gas pressure Px1 present following the first laser gas injection (S820). Next, the gas control unit 47 may supply the first laser gas to the interior of the laser chamber 10 by opening the first laser gas injection valve F2-V and the control valve C-V (S821). The flow rate of the first laser gas may be controlled by the mass flow controller F2-MFC. As described above, a mixed gas that is a mixture of argon, neon, and fluorine may be used as the first laser gas. Through this, the first laser gas, which contains fluorine gas, may be supplied to the interior of the laser chamber 10.

Next, the gas control unit 47 may newly load a gas pressure P in the laser chamber 10 (S822). Next, the gas control unit 47 may determine whether or not the newly-loaded gas pressure P has reached the first target gas pressure Px1 present following the first laser gas injection (S823). In the case where the gas pressure P has not reached the first target gas pressure Px1 (Px1>P), the process may return to the aforementioned S822 with the first laser gas injection valve F2-V remaining open. Then, the gas control unit 47 may stand by until the gas pressure in the laser chamber reaches the first target gas pressure Px1. In the case where the gas pressure P has reached the first target gas pressure Px1 (Px1≤P), the gas control unit 47 may close the control valve C-V and the first laser gas injection valve F2-V (S824).

Next, the gas control unit 47 may add the injection amount $\Delta Pf2$ of the first laser gas and the injection amount $\Delta Pb$ of the second laser gas to the pre-control gas pressure Pin to obtain a value Pin+$\Delta Pf2$+$\Delta Pb$. The gas control unit 47 may set the value Pin+$\Delta Pf2$+$\Delta Pb$ as a second target gas pressure Px2 present following the second laser gas injection (S825). Next, the gas control unit 47 may supply the second laser gas to the interior of the laser chamber 10 by opening the second laser gas injection valve B-V and the control valve C-V (S826). The flow rate of the second laser gas may be controlled by the mass flow controller B-MFC. As described above, a mixed gas that is a mixture of argon and neon may be used as the second laser gas. By properly calculating the injection amount $\Delta Pf2$ of the first laser gas and the injection amount ΔPb of the second laser gas (S810), the partial pressure of the halogen gas in the laser chamber 10 may be prevented from fluctuating between before and after the partial gas replacement control is carried out.

Next, the gas control unit 47 may newly load a gas pressure P in the laser chamber 10 (S827). Next, the gas control unit 47 may determine whether or not the newly-loaded gas pressure P has reached the second target gas pressure Px2 present following the second laser gas injection (S828). In the case where the gas pressure P has not reached the second target gas pressure Px2 (Px2>P), the process may return to the aforementioned S827 with the second laser gas injection valve B-V remaining open. Then, the gas control unit 47 may stand by until the gas pressure in the laser chamber reaches the second target gas pressure Px2. In the case where the gas pressure P has reached the second target gas pressure Px2 (Px2≤P), the gas control unit 47 may close the control valve C-V and the second laser gas injection valve B-V (S829). After this, the gas control unit 47 may start the exhaust pump 46 and open the control valve C-V. During this operation, the exhaust valve EX-V may be closed.

Next, the gas control unit 47 may partially exhaust the gas from within the laser chamber 10 by opening the exhaust valve EX-V for a predetermined amount of time and then closing the exhaust valve EX-V (S830).

Next, the gas control unit 47 may newly load a gas pressure P in the laser chamber 10 (S831). Next, the gas control unit 47 may determine whether or not the newly-loaded gas pressure P has returned to the pre-control gas pressure Pin (S832). In the case where the gas pressure P has not returned to the pre-control gas pressure Pin (Pin<P), the process may return to the aforementioned S830. Then, the partial exhaust of gas from within the laser chamber 10 may be repeated until the gas pressure P returns to the pre-control gas pressure Pin. During this operation, the exhaust pump 46 may be running, and the control valve C-V may be open. In the case where the gas pressure P has returned to the pre-control gas pressure Pin (Pin L' 2), the gas control unit 47 may close the control valve C-V and stop the exhaust pump 46. The processing of this flowchart may then end.

FIG. 37 is a flowchart illustrating a process to calculate an injection amount ΔPf2 of the first laser gas and an injection amount ΔPb of the second laser gas shown in FIG. 36. The gas control unit 47 may, through the following processing, calculate the injection amount ΔPf2 of the first laser gas and the injection amount ΔPb of the second laser gas.

First, the gas control unit 47 may store the partial pressure Ph of the halogen gas calculated in the aforementioned S400 (FIG. 4) in the storage device as the pre-control partial pressure Phin of the halogen gas (S811). Next, the gas control unit 47 may load a halogen gas concentration (volume ratio) C0 in the first laser gas (S812). The halogen gas concentration in the first laser gas may be inputted into the gas control unit 47 in advance and retrievably stored by the gas control unit 47.

The gas control unit 47 may calculate a halogen gas concentration (volume ratio) ch0 in the laser chamber 10 through the following formula (S813).

$$Ch0 = Phin/Pin$$

A halogen gas concentration (volume ratio) in the injected gases, containing both the first laser gas and the second laser gas, may be equal to the pre-control halogen gas concentration (volume ratio) Ch0. In this case, the following equation may hold true.

$$Ch0 = C0 \cdot \Delta Pf2/(\Delta Pf2 + \Delta Pb) \qquad \text{Formula 3}$$

Here, ΔPf2 is an injection amount of the first laser gas, C0 is a halogen gas concentration of the first laser gas, and ΔPb is an injection amount of the second laser gas.

Meanwhile, the gas replacement amount Q may be expressed through the following formula.

$$Q = \Delta Pf2 + \Delta Pb \qquad \text{Formula 4}$$

Accordingly, the gas control unit 47 may calculate the injection amount ΔPf2 of the first laser gas and the injection amount ΔPb of the second laser gas to fulfill Formulas 3 and 4 (S814).

FIG. 38 is a graph showing a change in the gas pressure in the laser chamber resulting from the partial gas replacement control shown in FIG. 36. The gas control unit 47 may start the partial gas replacement control at every time interval Tpi of the partial gas replacement control. When the partial gas replacement control is started, the first laser gas injection valve F2-V and the control valve C-V are opened, and the gas pressure P in the laser chamber 10 may increase gradually from the pre-control gas pressure Pin. When the gas pressure P in the laser chamber 10 reaches the first target gas pressure Px1, the control valve C-V and the first laser gas injection valve F2-V may be closed. Next, the second laser gas injection valve B-V and the control valve C-V may be opened, and thus the gas pressure P in the laser chamber 10 may further increase from the first target gas pressure Px1. When the gas pressure P in the laser chamber 10 reaches the second target gas pressure Px2, the control valve C-V and the second laser gas injection valve B-V may be closed. Thus, the increase in the gas pressure P may be stopped.

Next, the exhaust pump 46 may be started, and the control valve C-V may be opened. Then, the exhaust valve EX-V may be opened for a predetermined amount of time and then closed. As a result, the gas pressure P in the laser chamber 10 may decrease slightly from the second target gas pressure Px2. The opening/closing operations of the exhaust valve EX-V may be repeated, until the gas pressure P in the laser chamber 10 reaches the pre-control gas pressure Pin. With each repetition, the gas pressure P in the laser chamber 10 may decrease slightly. If the gas pressure P in the laser chamber 10 reaches the pre-control gas pressure Pin, the opening/closing operations of the exhaust valve EX-V may end. Thus the decrease in the gas pressure P may stop. Thereafter, the control valve C-V may be closed and the exhaust pump 46 may be stopped.

As described above, the injection amount ΔPf2 of the first laser gas and the injection amount ΔPb of the second laser gas may be calculated so that the partial pressure of the halogen gas does not change between before and after the partial gas replacement control. Furthermore, the gas pressure in the laser chamber 10 may be almost entirely prevented from changing between before and after the partial gas replacement control by exhausting essentially the same amount as the total injection amounts of the first laser gas and the second laser gas. Accordingly, fluctuations in the oscillation conditions of the laser beam may be suppressed, while at the same time reducing the concentration of impurities. Therefore, it may be possible to ensure the stability of the performance of the excimer laser apparatus.

In addition, the second laser gas may be supplied to the interior of the laser chamber 10 after the first laser gas has been supplied to the interior of the laser chamber 10. Therefore, halogen gas that remains in the first pipe 41, which is a shared pipe, may be pushed into the laser chamber 10 by the second laser gas. Accordingly, the partial pressure of the halogen gas in the laser chamber 10 may be precisely controlled.

5. Second Embodiment (An Integrated Control of Partial Gas Replacement and Halogen Gas Replenishment)

5.1 Outline of a Gas Control

Figure 39:
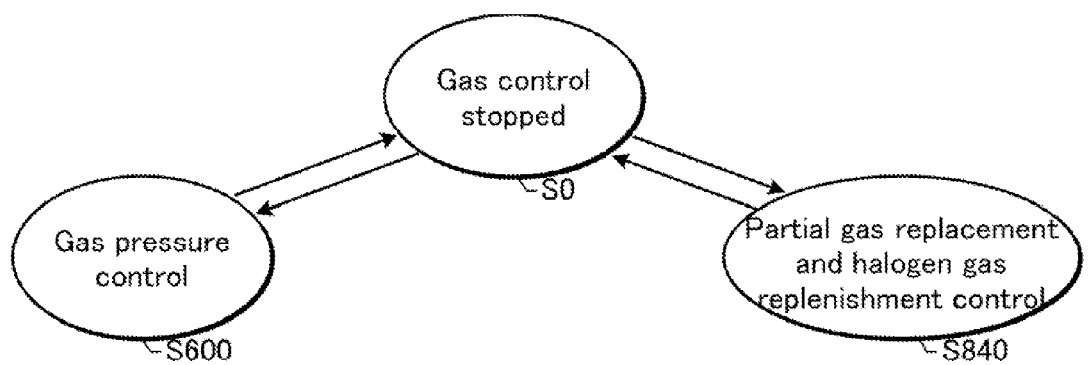
FIG. 39 is a state transition diagram illustrating gas control according to a second embodiment.

FIG. 39 is a state transition diagram illustrating gas control according to a second embodiment. As shown in FIG. 39, the gas control according to the second embodiment may include the gas pressure control (S600) and partial gas replacement and halogen gas replenishment control (S840). A gas control stopped state (S0) may be included as well. The configuration of the excimer laser apparatus may be the same as in the first embodiment.

The partial gas replacement and halogen gas replenishment control (S840) may, like the partial gas replacement control according to the first embodiment, perform injecting the first laser gas and the second laser gas into the laser chamber 10 and exhausting an amount of gas equivalent to the total injection amounts of those gases from the laser chamber 10. However, in the partial gas replacement and halogen gas replenishment control according to the second embodiment, the injection amount of the first laser gas and the injection amount of the second laser gas may be calculated so that the partial pressure of the halogen gas, which has decreased due to laser beam output over a long period of time, is restored to a predetermined value.

5.2 Main Flow

Figure 40:
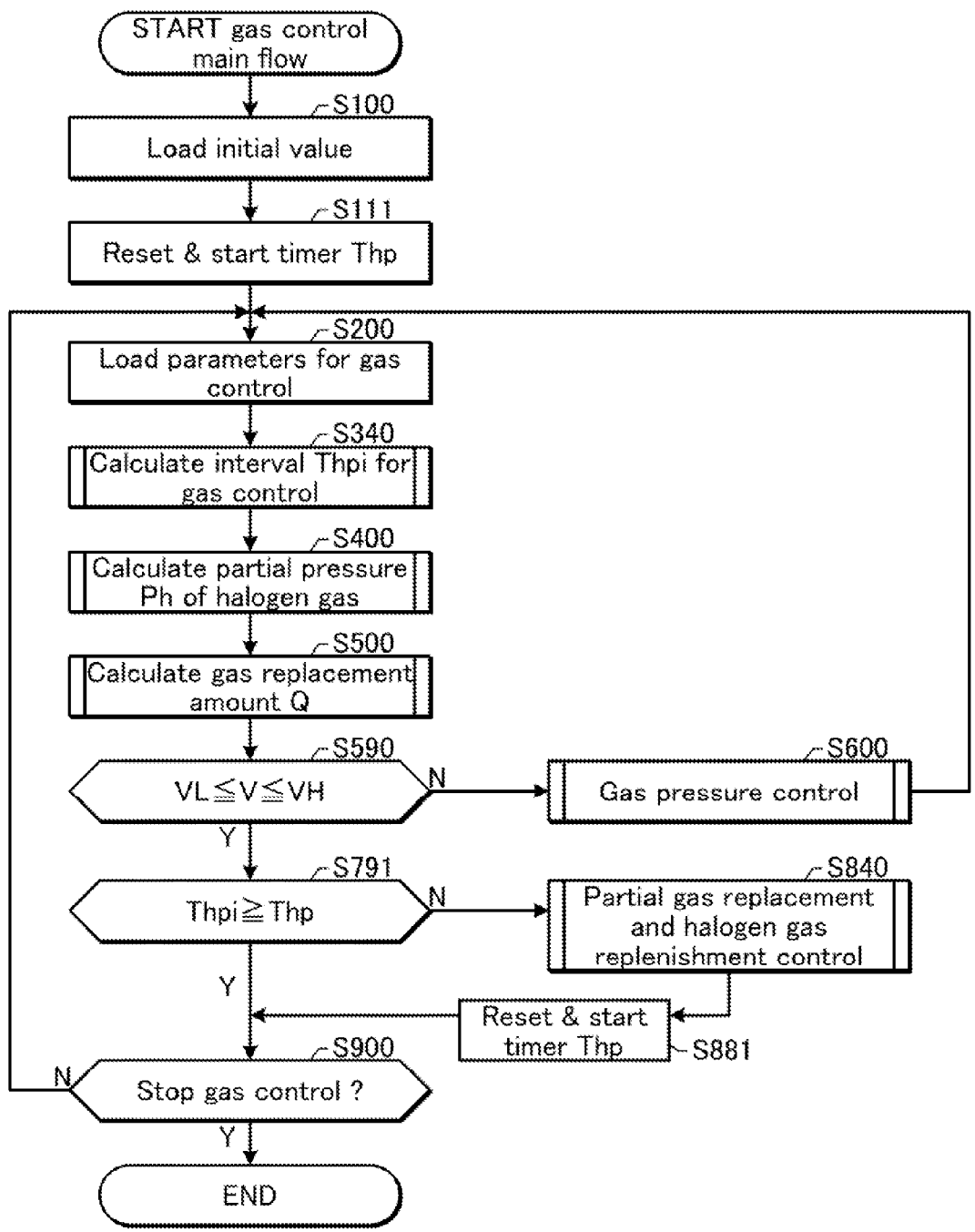
FIG. 40 is a flowchart illustrating the gas control according to the second embodiment.

FIG. 40 is a flowchart illustrating the gas control according to the second embodiment. The processing shown in FIG. 40 may be carried out by the gas control unit 47 (FIG. 2). In the processing shown in FIG. 40, at S1ll, the gas control unit 47 may start measuring time using a timer Thp instead of the timers Th and Tp described in the first embodiment. Further, a gas control interval Thpi may be calculated (at S340) instead of the gas control intervals Thi and Tpi described in the first embodiment. The calculation of the gas control interval Thpi will be described later.

In addition, the processing illustrated in FIG. 40 may differ from that described in the first embodiment in that the partial gas replacement and halogen gas replenishment control (S840) may be included as a single state, instead of the halogen gas replenishment control and the partial gas replacement control being included as individual states as in the first embodiment.

In the second embodiment, in the case where the conditions for gas pressure control are not in place (S590: YES), the gas control unit 47 may compare the timer Thp with the time interval Thpi for the partial gas replacement and halogen gas replenishment control (S791).

In the case where the timer Thp has reached the time interval Thpi of the partial gas replacement and halogen gas replenishment control (Thpi<Thp), the gas control unit 47 may carry out the partial gas replacement and halogen gas replenishment control (S840). The details of the partial gas replacement and halogen gas replenishment control will be described later. When the partial gas replacement and halogen gas replenishment control has ended, the timer Thp may be reset and restarted (S881). The other processes may be the same as those described in the first embodiment.

5.3 Calculation of a Gas Control Interval (Details of S340)

Figure 41A:
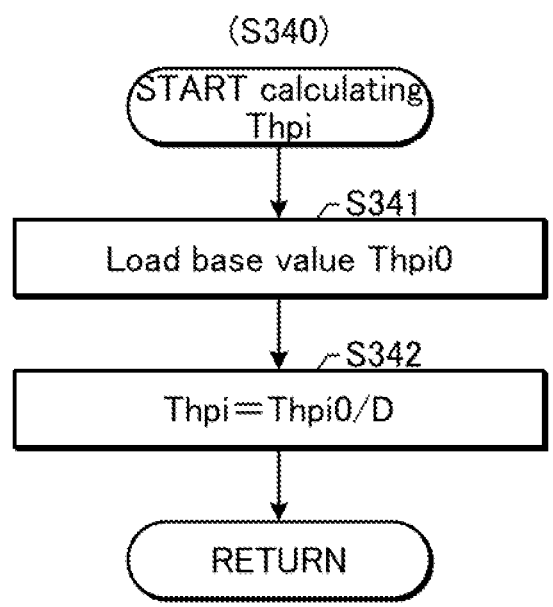
FIG. 41A is a flowchart illustrating an example of a process to calculate a gas control interval shown in FIG. 40.
Figure 41B:
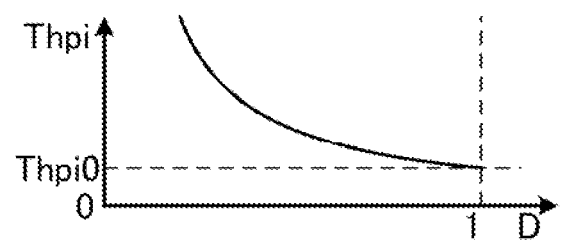
FIG. 41B is a graph showing a relationship between a duty of an excimer laser apparatus and the gas control interval calculated in FIG. 41A.

FIG. 41A is a flowchart illustrating an example of a process to calculate a gas control interval Thpi shown in FIG. 40. FIG. 41B is a graph showing a relationship between a duty D of an excimer laser apparatus and the gas control interval Thpi calculated in FIG. 41A.

First, the gas control unit 47 may load a base value Thpi0 of a time interval for the partial gas replacement and halogen gas replenishment control (2341).

Next, the gas control unit 47 may calculate the time interval Thpi for the partial gas replacement and halogen gas replenishment control as Thpi0/D, based on the loaded base value Thpi0 and the duty D of the excimer laser apparatus (S342).

As described in the first embodiment, an upper limit may be provided in the gas control interval Thpi.

5.4 Partial Gas Replacement and Halogen Gas Replenishment Control (Details of S840)

Figure 42:
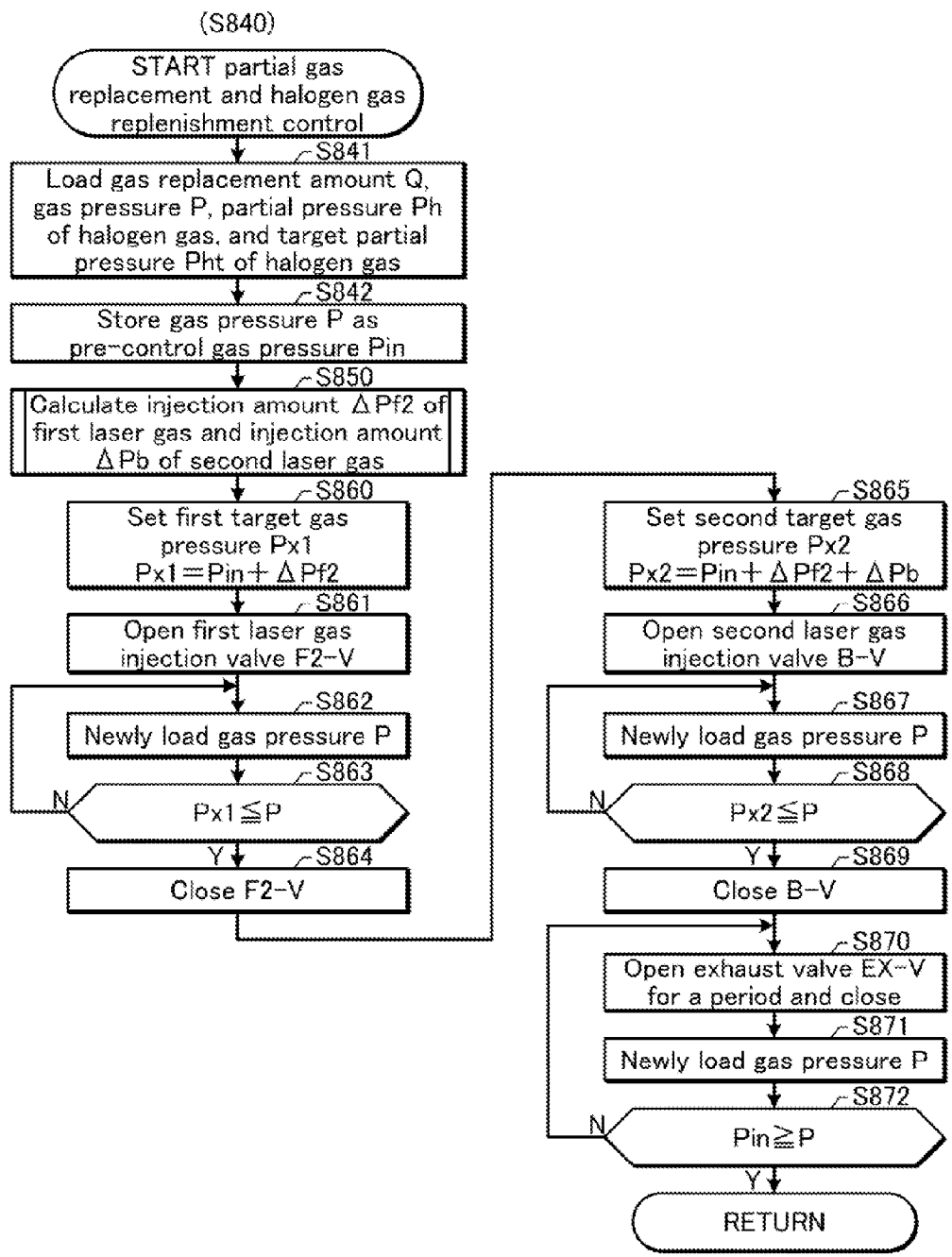
FIG. 42 is a flowchart illustrating partial gas replacement and halogen gas replenishment control shown in FIG. 40.

FIG. 42 is a flowchart illustrating partial gas replacement and halogen gas replenishment control shown in FIG. 40. In the partial gas replacement and halogen gas replenishment control, the first laser gas and the second laser gas may be injected into the laser chamber 10 and an amount of gas equivalent to the total injection amounts of those gases may be exhausted from the laser chamber 10, in the same manner as the partial gas replacement control according to the first embodiment. However, in the partial gas replacement and halogen gas replenishment control according to the second embodiment, the injection amounts of the first laser gas and the second laser gas may be different from those used in the partial gas replacement control according to the first embodiment.

The gas control unit 47 may load the gas replacement amount Q, the gas pressure P, the partial pressure Ph of the halogen gas, and the target partial pressure Pht of the halogen gas (S841). Next, the gas control unit 47 may store the gas pressure P as the pre-control gas pressure Pin in the storage device (S842).

Furthermore, the gas control unit 47 may calculate the injection amount $\Delta Pf2$ of the first laser gas and the injection amount $\Delta Pb$ of the second laser gas for controlling the partial pressure of the halogen gas in the laser chamber 10 to the target partial pressure Pht of the halogen gas (S850). The other processes may be the same as those in the partial gas replacement control (FIG. 36) according to the first embodiment.

Figure 43:
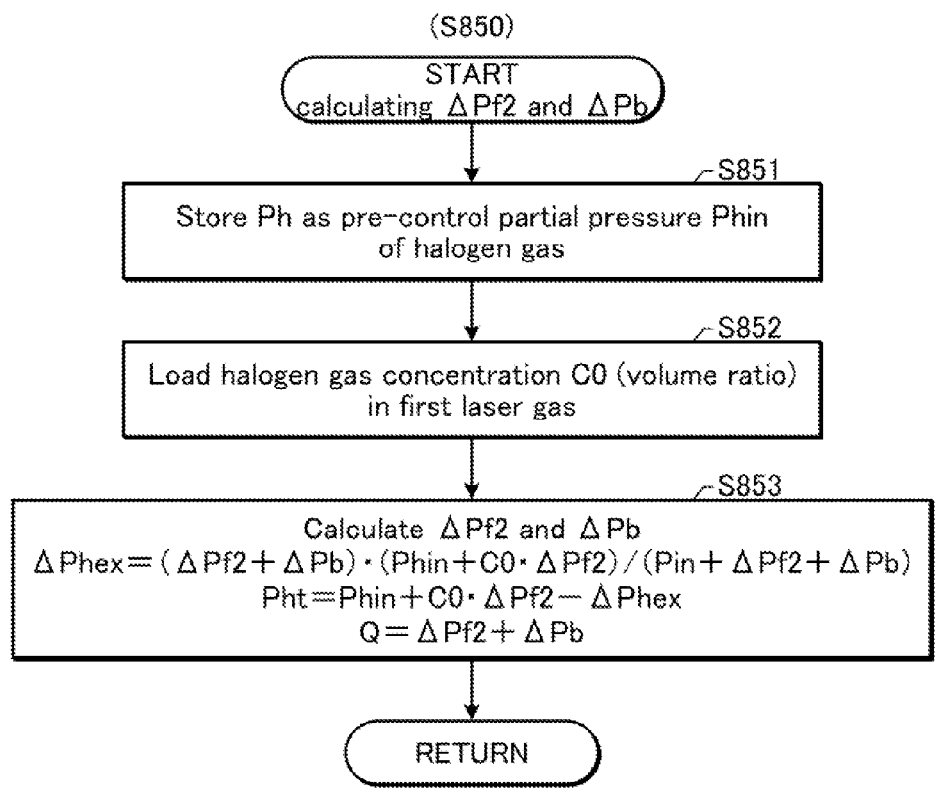
FIG. 43 is a flowchart illustrating a process to calculate an injection amount of the first laser gas and an injection amount of the second laser gas shown in FIG. 42.

FIG. 43 is a flowchart illustrating a process to calculate an injection amount $\Delta Pf2$ of the first laser gas and an injection amount $\Delta Pb$ of the second laser gas shown in FIG. 42. The gas control unit 47 may, through the following processing, calculate the injection amount $\Delta Pf2$ of the first laser gas and the injection amount $\Delta Pb$ of the second laser gas.

First, the gas control unit 47 may store the partial pressure Ph of the halogen gas in the storage device as the pre-control partial pressure Phin of the halogen gas (S851).

Next, the gas control unit 47 may load the halogen gas concentration C0 in the first laser gas (a volume ratio of the halogen component of the first laser gas) (S852). The halogen gas concentration in the first laser gas may be a halogen gas concentration (volume ratio) in the first receptacle F2. Data of the halogen gas concentration in the first laser gas may be inputted into the gas control unit 47 in advance and retrievably stored by the gas control unit 47.

The increase amount $\Delta Ph$ of the partial pressure of the halogen gas in the case where the first laser gas (injection amount $\Delta Pf2$) and the second laser gas (injection amount $\Delta Pb$) are injected into the laser chamber 10 may be expressed by the following formula.

$$\Delta Ph = C0 \cdot \Delta Pf2$$

After the first laser gas and the second laser gas have been injected into the laser chamber 10, exhausting (exhausting an amount of gas equivalent to the injection amount $\Delta Pf2 + \Delta Pb$) may be performed to the pre-control gas pressure Pin. Reduction amount $\Delta Phex$ of the partial pressure of the halogen gas due to such exhausting may be expressed by the following formula.

$$\Delta Phex = (\Delta Pf2 + \Delta Pb) \cdot (Phin + C0 \cdot \Delta Pf2)/(Pin + \Delta Pf2 + \Delta Pb) \quad \text{Formula 5}$$

Meanwhile, the target partial pressure Pht of the halogen gas may be expressed by the following formula. Note that the target partial pressure Pht of the halogen gas may, as in the first embodiment, be a value that is set in accordance with operational conditions of the excimer laser apparatus.

$$Pht = Phin + C0 \cdot \Delta Pf2 - \Delta Phex \quad \text{Formula 6}$$

Furthermore, the gas replacement amount Q may be expressed through the following formula.

$$Q = \Delta Pf2 + \Delta Pb \quad \text{Formula 7}$$

Accordingly, the gas control unit 47 may calculate the injection amount $\Delta Pf2$ of the first laser gas and the injection amount $\Delta Pb$ of the second laser gas that fulfill Formulas 5 through 7 (S853). Alternatively, the gas control unit 47 may have table data in advance and the injection amount $\Delta Pf2$ of the first laser gas and the injection amount $\Delta Pb$ of the second laser gas may be determined by referring to this table. The table may hold values of the injection amount $\Delta Pf2$ of the first laser gas and the injection amount $\Delta Pb$ of the second laser gas that correspond to values of, for example, the gas replacement amount Q, the gas pressure P, the partial pressure Ph of the halogen gas, the target partial pressure Pht of the halogen gas, or the like.

According to the second embodiment, impurities in the laser chamber 10 may be reduced and the partial pressure of the halogen gas may be restored through a single process by carrying out the partial gas replacement control and the halogen gas replenishment control as an integrated process.

6. Third Embodiment (Omitting the Gas Pressure Control)

6.1 Outline of a Gas Control

Figure 44:
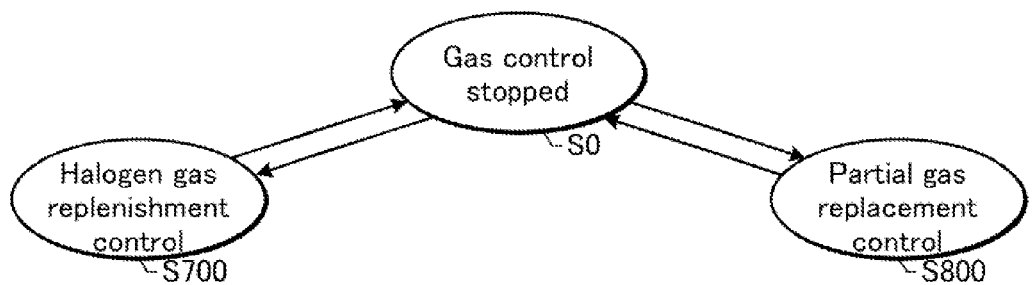
FIG. 44 is a state transition diagram illustrating gas control according to the third embodiment.

FIG. 44 is a state transition diagram illustrating gas control according to the third embodiment. As shown in FIG. 44, the gas control in the third embodiment may include halogen gas replenishment control (S700), and partial gas replacement control (S800). A gas control stopped state (S0) may also be included. The gas pressure control S600 shown in FIG. 3 may be omitted. The configuration of the excimer laser apparatus may be the same as in the first embodiment.

6.2 Main Flow

Figure 45:
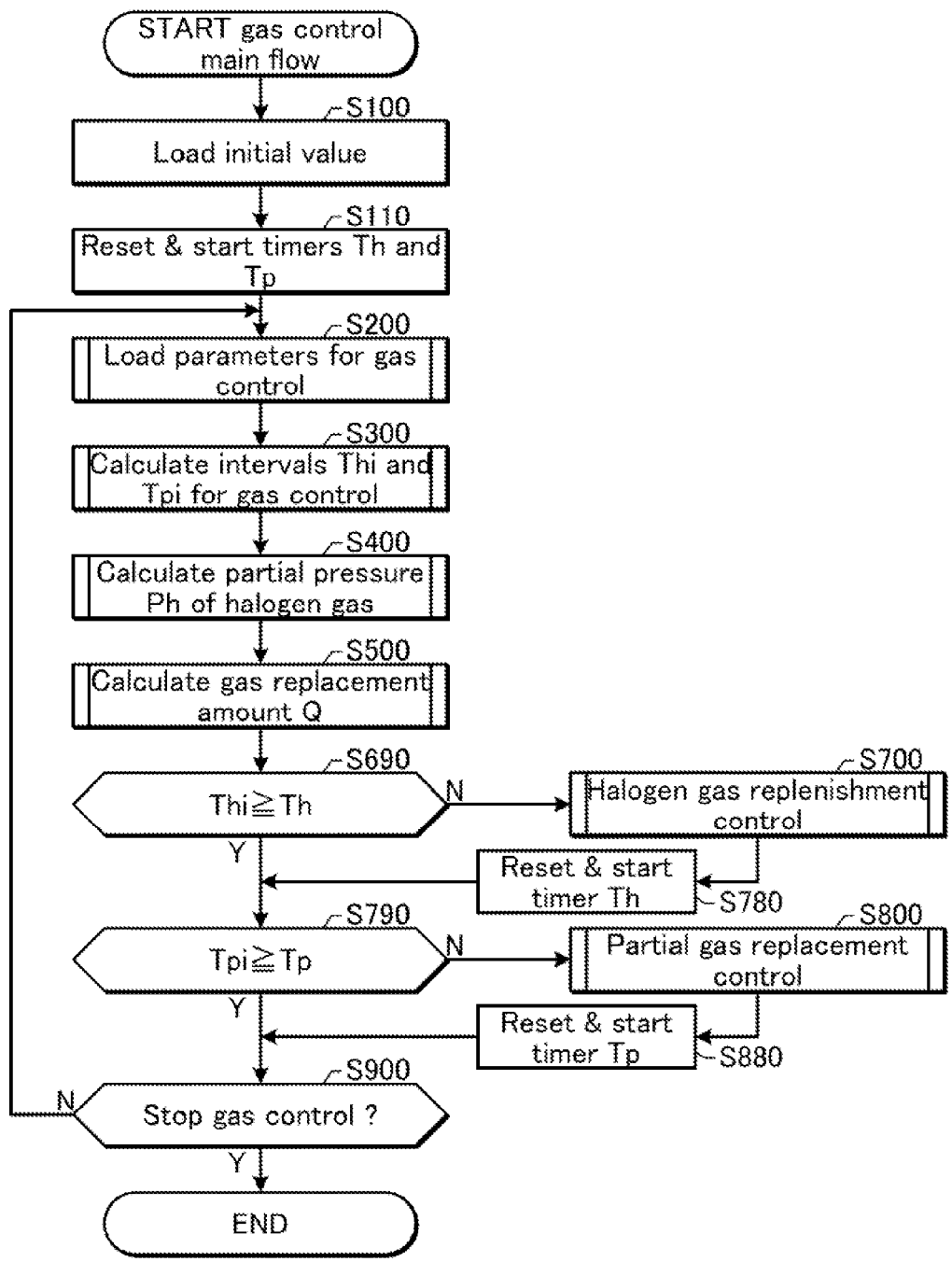
FIG. 45 is a flowchart illustrating the gas control according to the third embodiment.

FIG. 45 is a flowchart illustrating the gas control according to the third embodiment. The processing shown in FIG. 45 may be performed by the gas control unit 47 (FIG. 2). As shown in FIG. 45, in the third embodiment, the gas pressure control (S600 in FIG. 4) may be omitted. Therefore, the process of comparing the charging voltage V with the threshold value (S590 in FIG. 4), to determine whether or not the gas pressure control is to be performed, may also be omitted.

In the third embodiment, if energy of laser beam decreases due to an increase of impurities in the laser chamber or deterioration of the electrodes, the energy of laser beam may be recovered by increasing the charging voltage V of the charger 12.

The other processes may be the same as those described in the first embodiment.

6.3 Calculation of a Gas Replacement Amount (Details of S500)

Figure 46A:
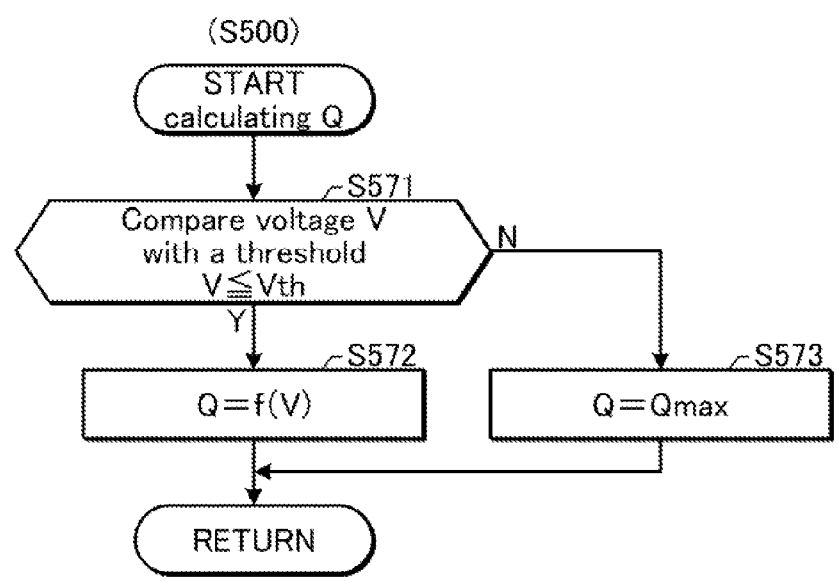
FIG. 46A is a flowchart illustrating a first example of a process to calculate a gas replacement amount shown in FIG. 45.

FIG. 46A is a flowchart illustrating a first example of a process to calculate a gas replacement amount Q shown in FIG. 45. The process shown in FIG. 46A may be carried out by the gas control unit 47 as a subroutine of S500 shown in FIG. 45. In order to replace an appropriate amount of gas in the partial gas replacement control, a gas replacement amount Q may be calculated as follows.

First, the gas control unit 47 may compare the charging voltage V of the charger 12 with a threshold value Vth (S571). The charging voltage V of the charger 12 may be a parameter loaded in the process of FIG. 13. Data of the threshold value Vth may be stored by the gas control unit 47 in advance.

If the charging voltage V of the charger 12 is equal to or lower than the threshold value Vth (V≤Vth), the gas control unit 47 may set the gas replacement amount Q to a variable that may continuously vary between the minimum value Qmin and the maximum value Qmax depending on the charging voltage V. For example, the gas replacement amount Q may be a variable represented by f(V) (S572).

If the charging voltage V of the charger 12 is higher than the threshold value Vth (V>Vth), the gas control unit 47 may set the gas replacement amount Q to the maximum value Qmax (S573).

Figure 46B:
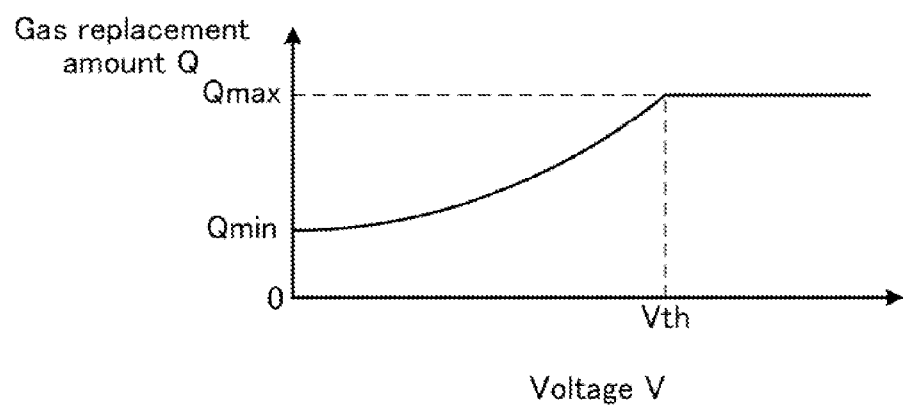
FIG. 46B is a graph showing a relationship between a charging voltage of a charger and the gas replacement amount calculated in FIG. 46A.

FIG. 46B is a graph showing a relationship between a charging voltage V of a charger 12 and the gas replacement amount Q calculated in FIG. 46A. If the charging voltage V of the charger 12 is large, the pair of electrodes 11a and 11b may be old and a degree of deterioration may have been progressed. Accordingly, where the charging voltage V of the charger 12 is high, it is preferable that the gas replacement ratio or the gas replacement amount is higher than where the charging voltage V of the charger 12 is low. As shown in FIG. 46B, the function Q=f(V) is preferably a monotonically increasing and downward convex function. For example, the function may be an n-th degree function, where n is a positive integer, or an exponential function.

Figure 47A:
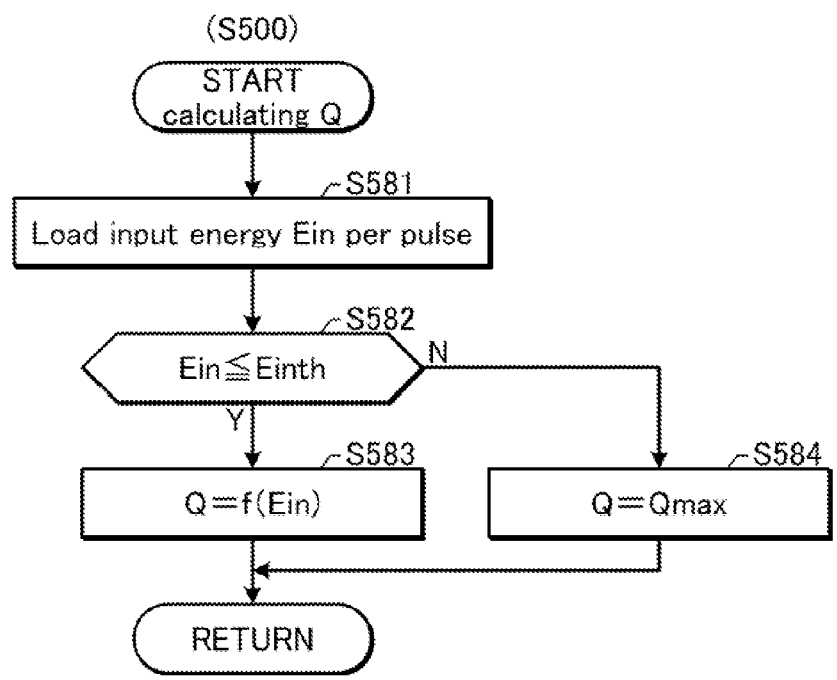
FIG. 47A is a flowchart illustrating a second example of a process to calculate the gas replacement amount shown in FIG. 45.

FIG. 47A is a flowchart illustrating a second example of a process to calculate the gas replacement amount Q shown in FIG. 45. The process shown in FIG. 47A may be carried out by the gas control unit 47 as a subroutine of S500 shown in FIG. 45. In order to replace an appropriate amount of gas in the partial gas replacement control, a gas replacement amount Q may be calculated as follows.

First, the gas control unit 47 may load input energy Ein per pulse (S581). The input energy Ein per pulse may have been calculated in the process of FIG. 8 by the laser control unit 30.

First, the gas control unit 47 may compare the input energy Ein per pulse with a threshold value Einth (S582). Data of the threshold value Einth may be stored by the gas control unit 47 in advance.

If the input energy Ein per pulse is equal to or lower than the threshold value Einth (Ein≤Einth), the gas control unit 47 may set the gas replacement amount Q to a variable that may continuously vary between the minimum value Qmin and the maximum value Qmax depending on Ein. For example, the gas replacement amount Q may be a variable represented by f(Ein) (S583).

If the input energy Ein per pulse is higher than the threshold value Einth (Em>Einth), the gas control unit 47 may set the gas replacement amount Q to the maximum value Qmax (S584).

Figure 47B:
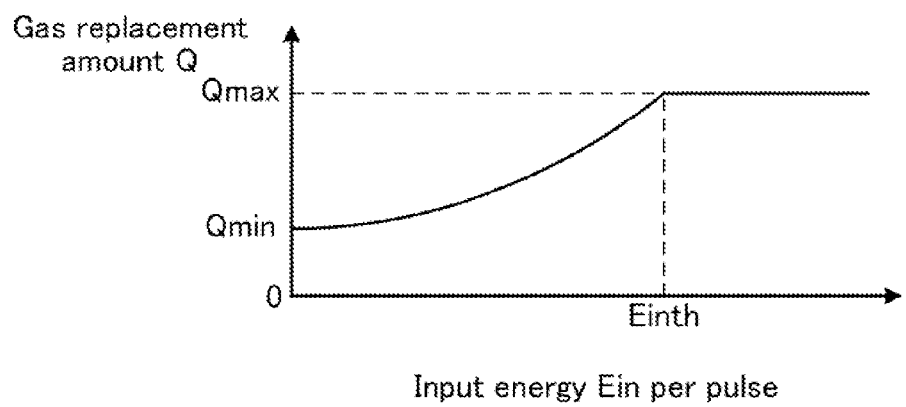
FIG. 47B is a graph showing a relationship between input energy per pulse and the gas replacement amount calculated in FIG. 47A.

FIG. 47B is a graph showing a relationship between input energy Ein per pulse and the gas replacement amount Q calculated in FIG. 47A. If the input energy Ein per pulse is large, the pair of electrodes 11a and 11b may be old and a degree of deterioration may have been progressed. Accordingly, where the input energy Ein per pulse is high, it is preferable that the gas replacement ratio or the gas replacement amount is higher than where the input energy Ein per pulse is low. As shown in FIG. 47B, the function Q=f(Ein) is preferably a monotonically increasing and downward convex function. For example, the function may be an n-th degree function, where n is a positive integer, or an exponential function.

7. Fourth Embodiment (MOPO System)

7.1 Overall Description of the MOPO System

Figure 48:
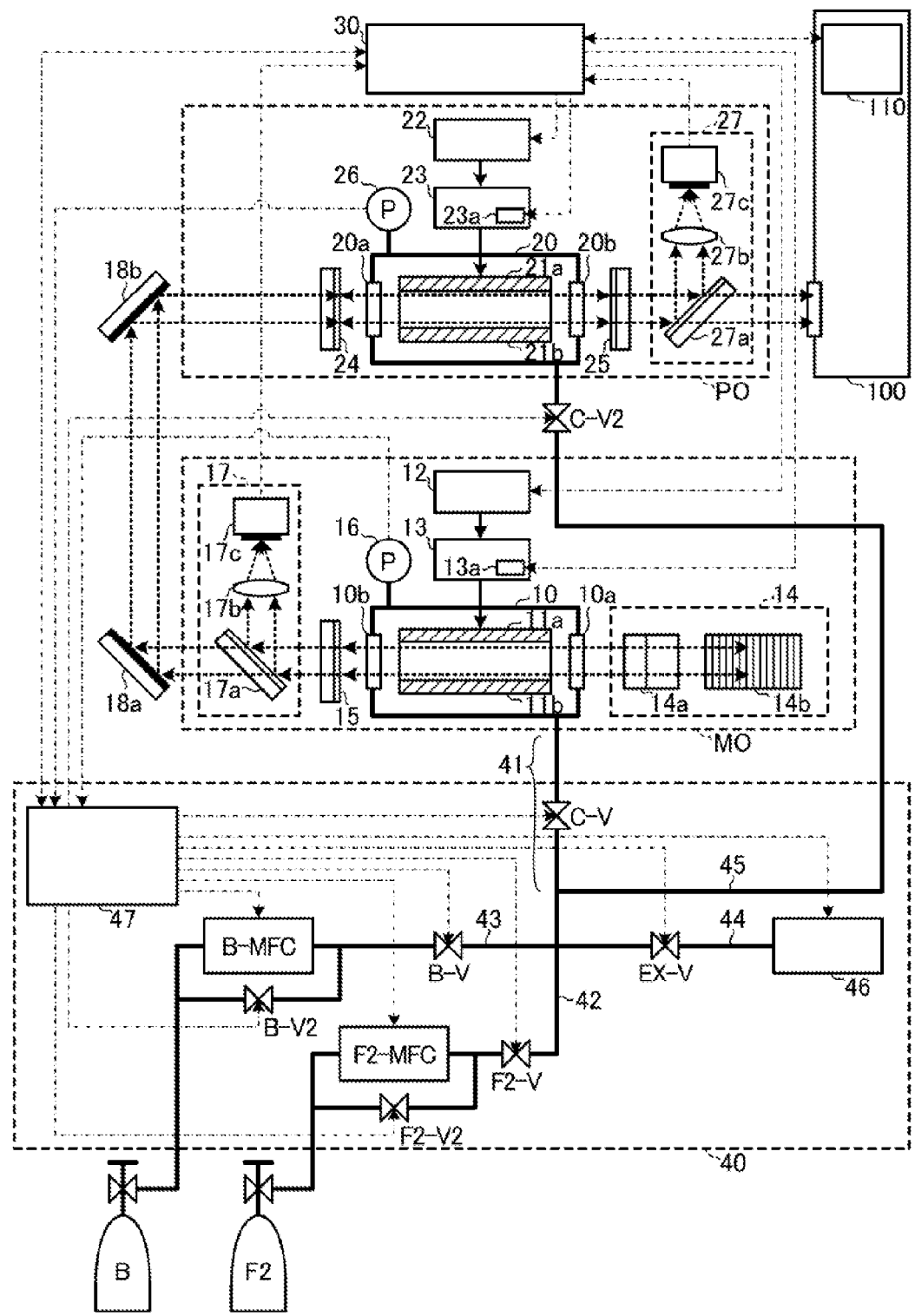
FIG. 48 schematically illustrates a configuration of an excimer laser system according to a fourth embodiment.

FIG. 48 schematically illustrates a configuration of an excimer laser system according to a fourth embodiment. The excimer laser system according to the fourth embodiment may include, in addition to the excimer laser apparatus according to the first embodiment, high reflection mirrors 18a and 18b. The excimer laser system according to the fourth embodiment may further include a laser chamber 20, a pair of electrodes 21a and 21b, a charger 22, and a pulse power module (PPM) 23. The excimer laser system according to the fourth embodiment may further include a partial reflection mirror 24, an output coupling mirror 25, a pressure sensor 26, and an optical sensor module 27.

The laser chamber 10, the pair of electrodes 11a and 11b, the charger 12, the pulse power module (PPM) 13, the line narrow module 14, and the output coupling mirror 15 described in the first embodiment may configure a master oscillator MO. The laser chamber 20, the pair of electrodes 21a and 21b, the charger 22, the pulse power module (PPM) 23, the partial reflection mirror 24, and the output coupling mirror 25 may configure a power oscillator PO. A MOPO-type excimer laser system may be configured by the master oscillator MO and the power oscillator PO.

A pulse laser beam outputted by the master oscillator MO may enter into the partial reflection mirror 24 of the power oscillator PO via the high reflection mirrors 18a and 18b. The pulse laser beam that has entered into the partial reflection mirror 24 may pass through the interior of the laser chamber 20 and be amplified while traveling back and forth between the partial reflection mirror 24 and the output coupling mirror 25. Some of the amplified pulse laser beam may then pass through the output coupling mirror 25 and be outputted as output laser beam, and may be outputted to the exposure device 100 via the optical sensor module 27.

The configurations and functions of the charger 22, the pulse power module (PPM) 23, the pressure sensor 26, the optical sensor module 27, and so on may be the same as the corresponding elements described in the first embodiment.

In the gas control device 40, the first pipe 41 that is connected to the laser chamber 10 is connected to the second through fourth pipes 42 through 44. In addition, a fifth pipe 45 that is connected to the laser chamber 20 may also be connected to the second through fourth pipes. Accordingly, the laser chamber 20 may be connected to each of the first receptacle F2, the second receptacle B, and the exhaust pump 46. A control valve C-V2 may be provided in the fifth pipe 45.

7.2 Gas Control in the MOPO System

Figure 49:
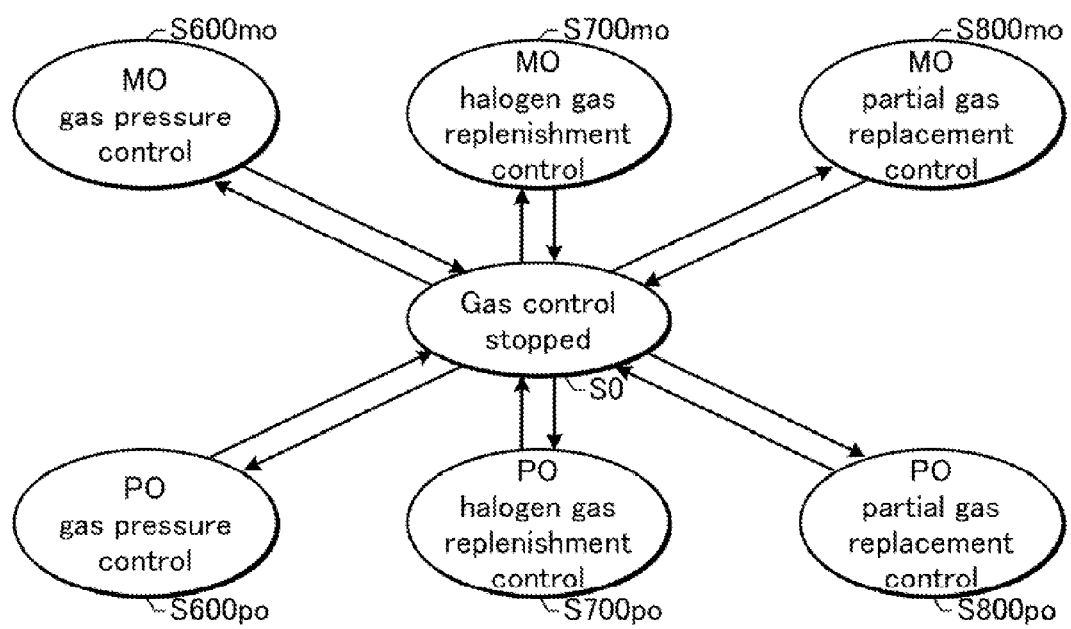
FIG. 49 is a state transition diagram illustrating gas control according to the fourth embodiment.

FIG. 49 is a state transition diagram illustrating gas control according to the fourth embodiment. As shown in FIG. 49, the gas control according to the fourth embodiment may include gas pressure control (S500mo), halogen gas replenishment control (S700mo), and partial gas replacement control (S800mo) in the master oscillator MO. The gas control according to the fourth embodiment may further include gas pressure control (S600po), halogen gas replenishment control (S700po), and partial gas replacement control (S800po) in the power oscillator PO.

If operational conditions of the excimer laser apparatus, such as the partial pressure of the halogen gas, are changed, the timing of rise in a laser pulse waveform and so on may fluctuate. However, a MOPO system may be advantageous in that the energy of the pulse laser beam outputted from the power oscillator PO may not easily fluctuate, even if the timing of rise in the laser pulse waveform and so on fluctuate in one of the master oscillator MO and the power oscillator PO. Accordingly, the gas control in the master oscillator MO and the gas control in the power oscillator PO may be carried out independently in accordance with the states of the gases in the respective oscillators.

Figure 50:
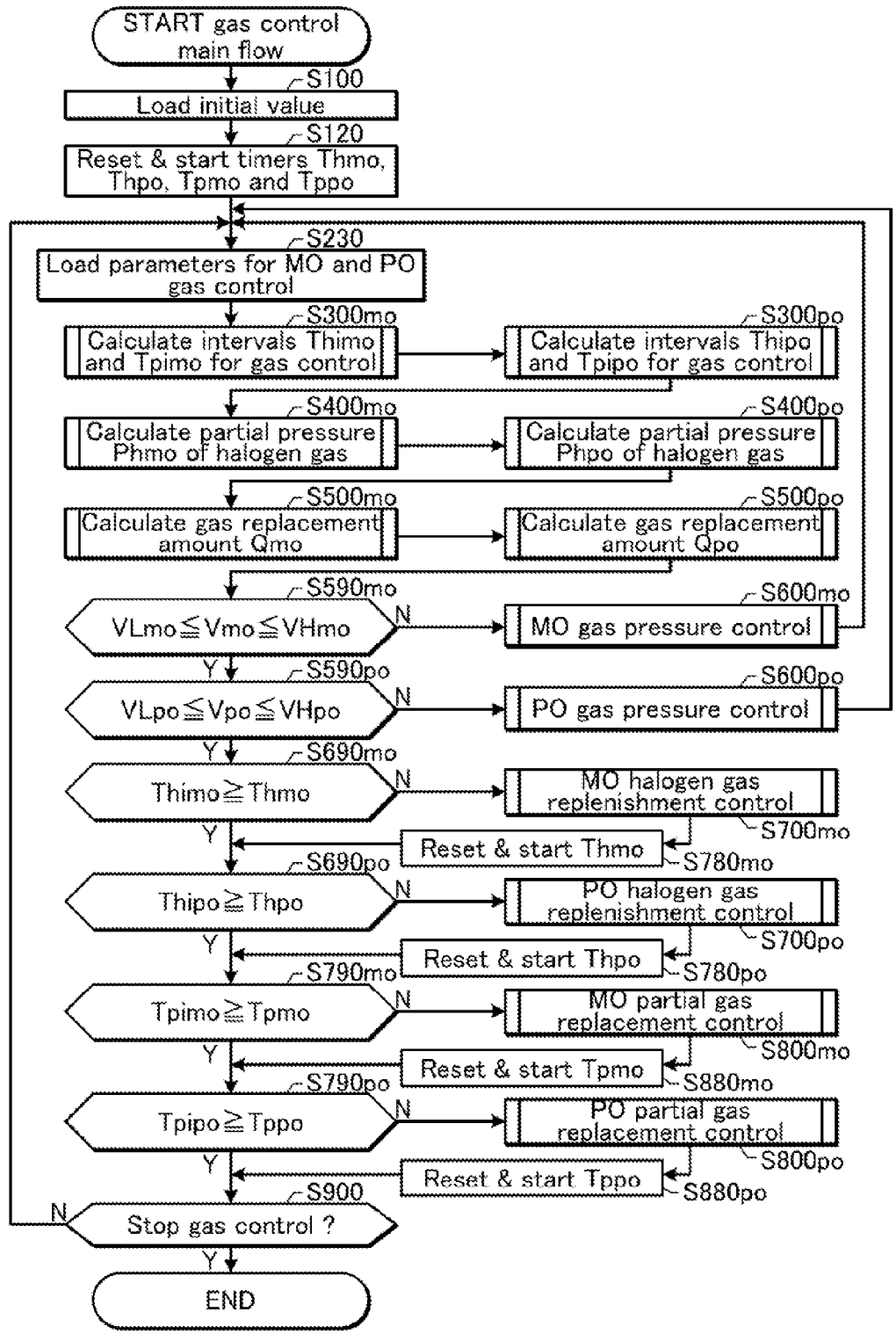
FIG. 50 is a flowchart illustrating the gas control according to the fourth embodiment.

FIG. 50 is a flowchart illustrating the gas control according to the fourth embodiment. The processes shown in FIG. 50 may be carried out by the gas control unit 47 (FIG. 48). The processing shown in FIG. 50 may be different from that described in the first embodiment in that the processes in S300 to S880 in the first embodiment (FIG. 4) are carried out in both the master oscillator MO and the power oscillator PO. At S120 in FIG. 50, timers Thmo and Tpmo for the gas control of the master oscillator MO, and timers Thpo and Tppo for the gas control of the power oscillator PO may be started. At S230 in FIG. 50, the gas control parameters may be loaded for each of the master oscillator MO and the power oscillator PO. The processing may be the same as that described in the first embodiment in other respects. However, the laser control unit 30 may execute the processes of FIG. 5 to FIG. 12 for each of the master oscillator MO and the power oscillator PO.

Figure 51:
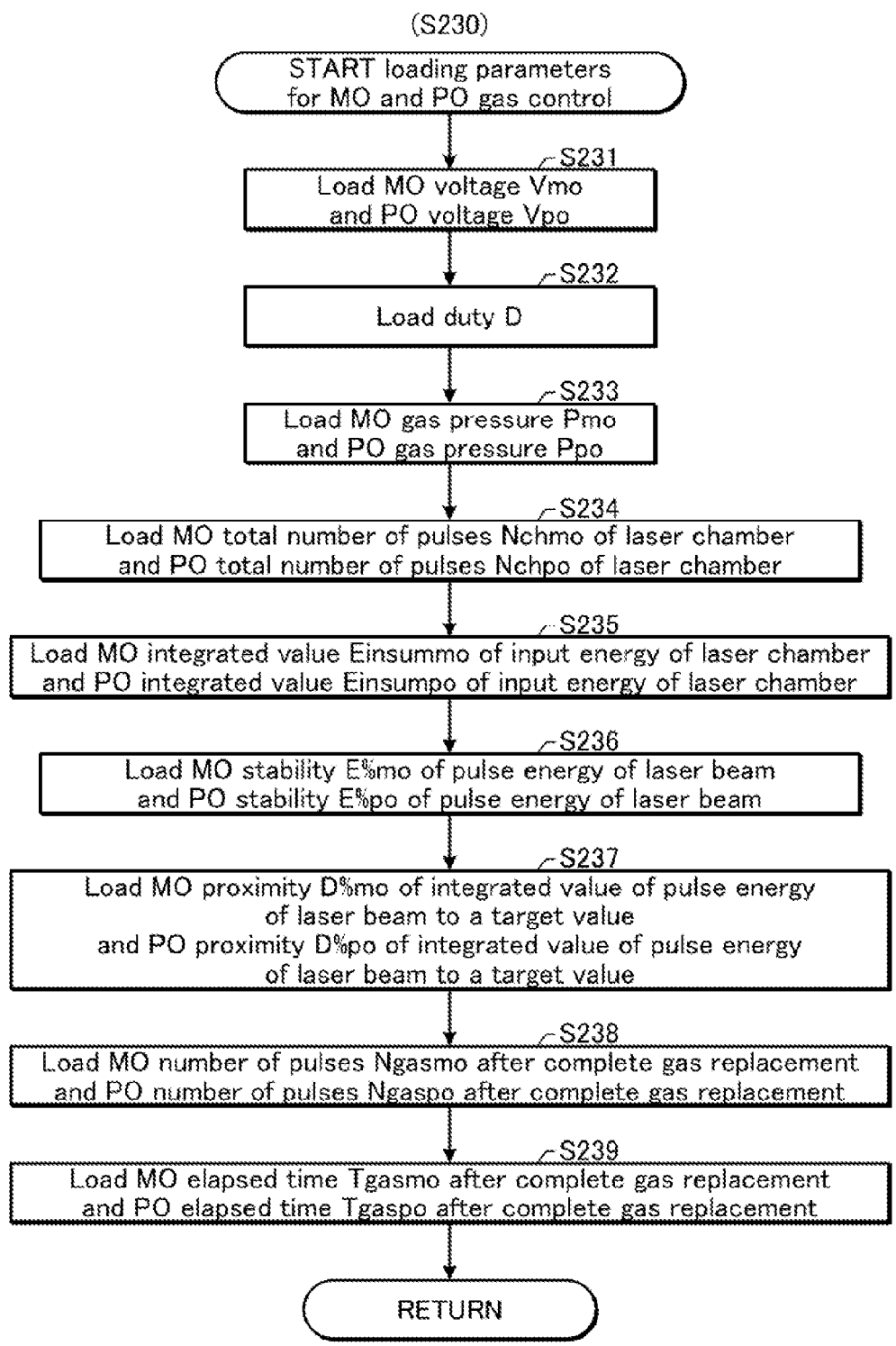
FIG. 51 is a flowchart illustrating a process of loading gas control parameters for a master oscillator and a power oscillator.

FIG. 51 is a flowchart illustrating a process of loading gas control parameters for a master oscillator MO and a power oscillator PO. The process shown in FIG. 51 may be carried out by the gas control unit 47 as a subroutine of S230 shown in FIG. 50. This subroutine may be different from FIG. 13 in that this subroutine may be executed for each of the master oscillator MO and the power oscillator PO.

8. Fifth Embodiment (An Integrated Control in the MOPO System)

Figure 52:
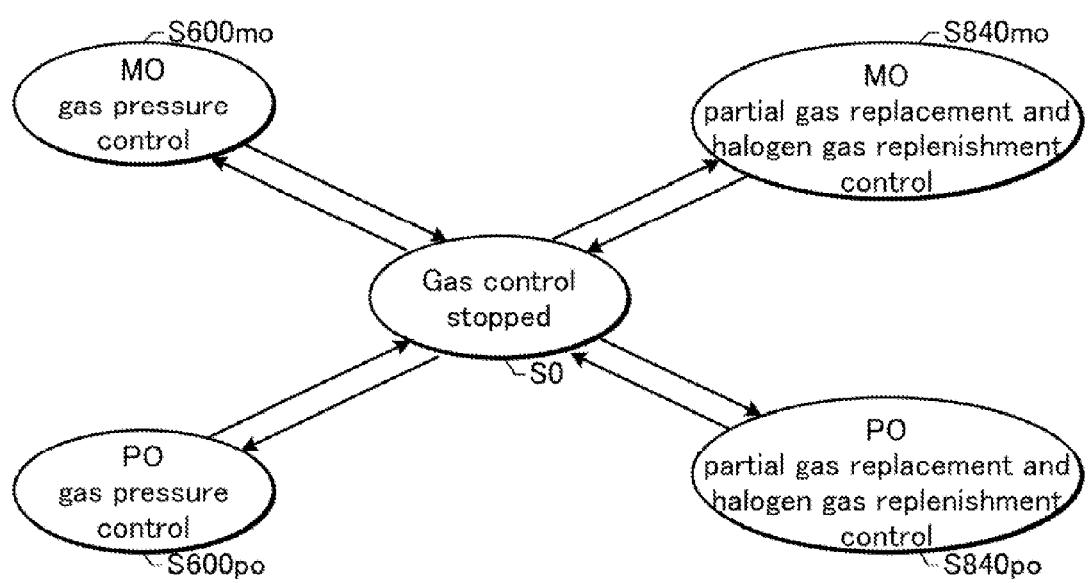
FIG. 52 is a state transition diagram illustrating gas control according to a fifth embodiment.
Figure 53:
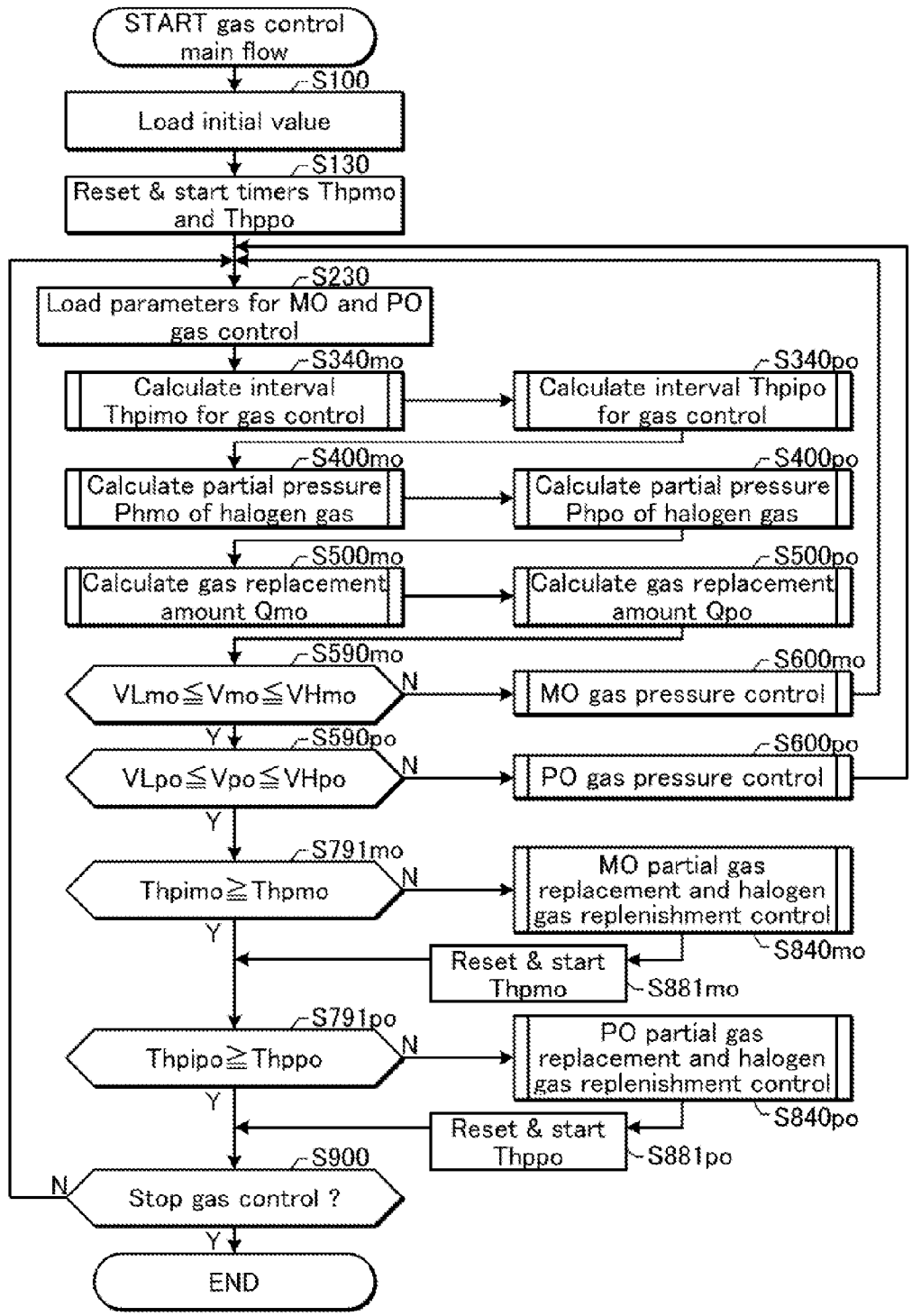
FIG. 53 is a flowchart illustrating the gas control according to the fifth embodiment.

FIG. 52 is a state transition diagram illustrating gas control according to a fifth embodiment. FIG. 53 is a flowchart illustrating the gas control according to the fifth embodiment.

The gas control according to the fifth embodiment may differ from that in the fourth embodiment in that the partial gas replacement control and the halogen gas replenishment control performed in the master oscillator MO are integrated and the partial gas replacement control and the halogen gas replenishment control performed in the power oscillator PO are integrated. The processing may be the same as that described in the fourth embodiment in other respects. The details of a partial gas replacement and halogen gas replenishment control that integrates the partial gas replacement control and the halogen gas replenishment control may be the same as in the second embodiment.

FIG. 53 is a flowchart illustrating the gas control according to the fifth embodiment. The processing shown in FIG. 53 may be performed by the gas control unit 47 (FIG. 48). The processing shown in FIG. 53 may be different from the second embodiment in that the processing of S340 to S881 of FIG. 4 may be performed for each of the master oscillator MO and the power oscillator PO. Further, at S130 of FIG. 53, timer Thpmo for the gas control of the master oscillator MO and timer Thppo for the gas control of the power oscillator PO may be started. At S230 of FIG. 53, the gas control parameters may be loaded for each of the master oscillator MO and the power oscillator PO. The processing may be the same as that described in the second embodiment in other respects.

3. Sixth Embodiment (Sharing a Charger in a MOPO System)

Figure 54:
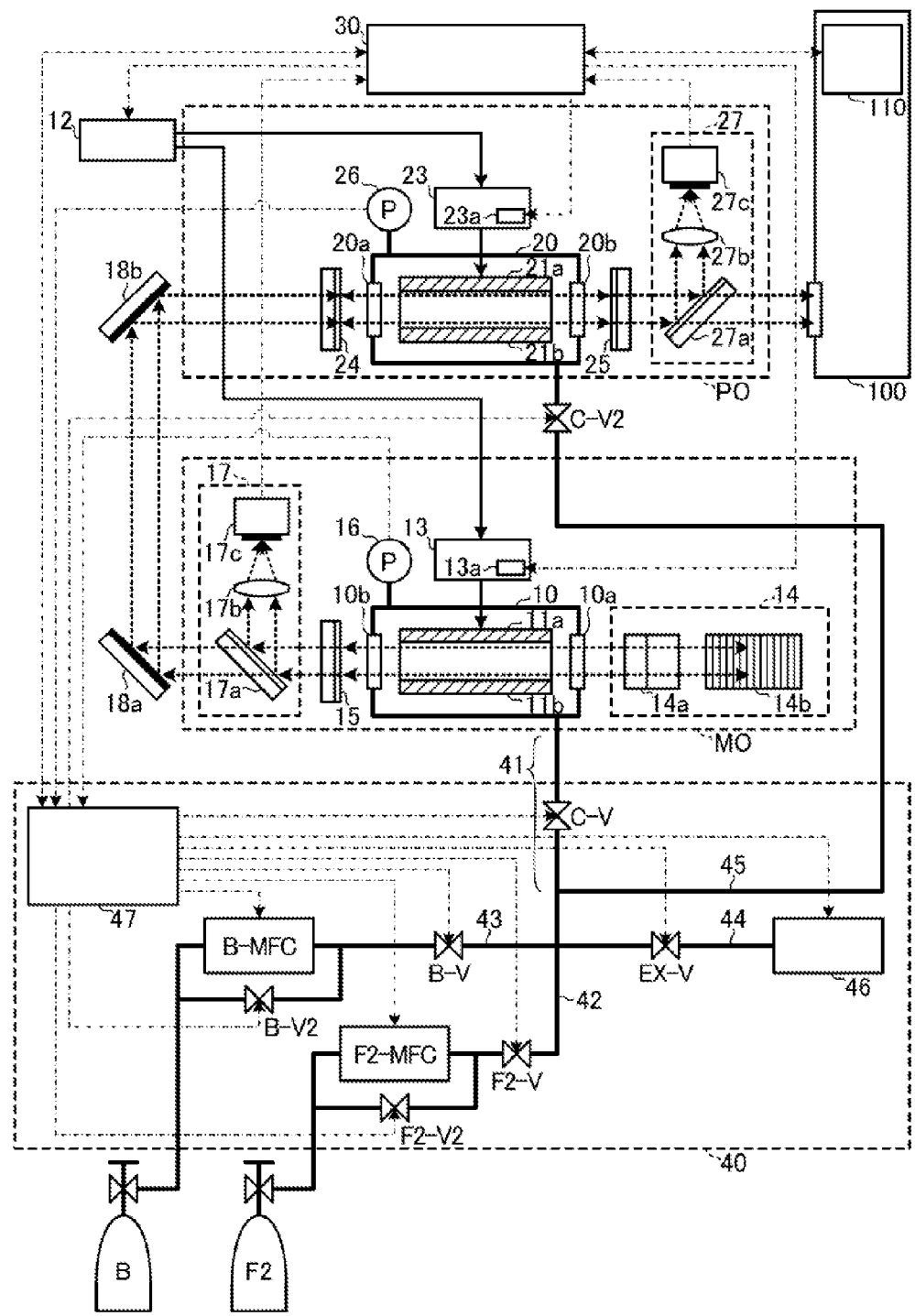
FIG. 54 schematically illustrates a configuration of an excimer laser system according to a sixth embodiment.

FIG. 54 schematically illustrates a configuration of an excimer laser system according to a sixth embodiment. As shown in FIG. 54, the pair of electrodes 11a and 11b included in the master oscillator MO and the pair of electrodes 21a and 21b included in the power oscillator PO may be connected to a shared charger 12. The configuration may be the same as that described in the fifth embodiment in other respects.

In the case where the charger 12 that is shared by the master oscillator MO and the power oscillator PO is used, voltage control may be carried out in common for the pair of electrodes 11a and 11b and the pair of electrodes 21a and 21b. In other words, even if the pulse energy of laser beam has changed in one of the laser chambers due to an increase in the concentration of impurities or the like, the voltage control is carried out in common for both, and thus the output energy of the power oscillator PO may be stabilized. As a result, even if an attempt is made to carry out the gas pressure control based on the voltage applied to the electrodes, there are cases where which of the master oscillator MO and the power oscillator PO should carry out the gas pressure control cannot be determined precisely based only on the voltage. Accordingly, which of the master oscillator MO and the power oscillator PO should carry out the gas pressure control may be determined by detecting the output energy of the master oscillator MO.

Figure 55:
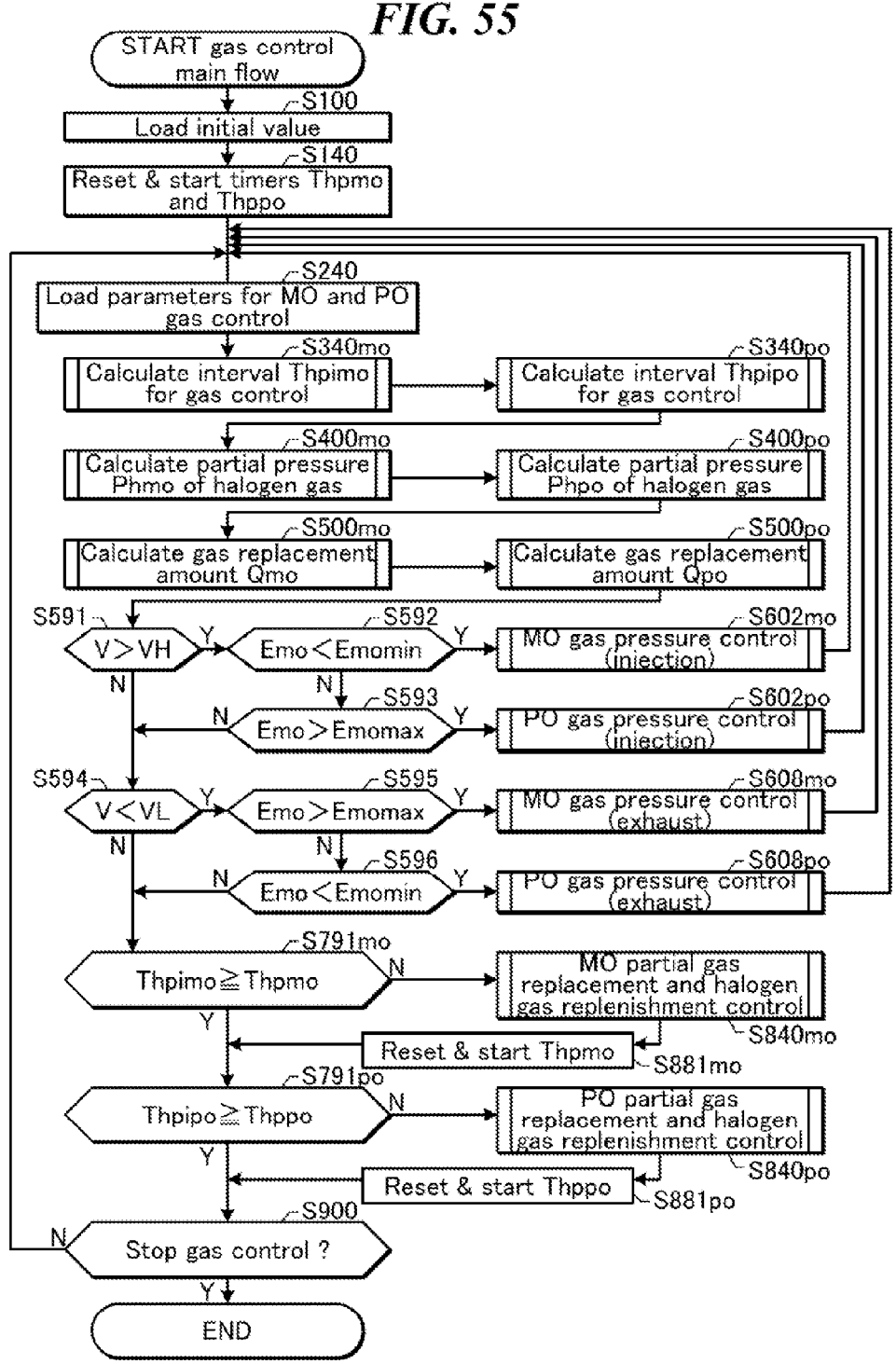
FIG. 55 is a flowchart illustrating gas control according to the sixth embodiment.

FIG. 55 is a flowchart illustrating gas control according to the sixth embodiment. The gas control unit 47 may start the timers Thpmo and Thppo (S140). Next, gas control parameters for the master oscillator MO and the power oscillator PO may be loaded (S240). In the processing of loading gas control parameters of the master oscillator MO and the power oscillator PO, in addition to S230 of FIG. 51, pulse energy Emo of the master oscillator MO may be loaded.

In addition, the gas control unit 47 may compare the charging voltage V with the first threshold value VH and the second threshold value VL (S591, S594). In the case where the charging voltage V is not within the range from the first threshold value VH to the second threshold value VL (S591: YES or S594: YES), it may be determined that gas pressure control should be carried out in the laser chamber of the master oscillator MO, the power oscillator PO, or both. Accordingly, the gas control unit 47 may compare the pulse energy Emo of the master oscillator MO with a first threshold value Emomin and a second threshold value Emomax (S592, S593, S595, S596).

In the case where the comparison results in relationships where VL<VH<V and Emo<Emomin<Emomax are present (S592: YES), it may be understood that the output of the master oscillator MO is low and the output of the power oscillator PO cannot be ensured unless a high voltage is applied between the electrodes of the master oscillator MO and the power oscillator PO. Accordingly, in this case, the second laser gas may be injected into the laser chamber 10 of the master oscillator MO (S602mo).

Meanwhile, in the case where relationships where VL<VH<V and Emomin<Emomax<Emo are present (S593: YES), it may be understood that the amplification rate of the power oscillator PO is low and the output of the power oscillator PO cannot be ensured unless a high voltage is applied between the electrodes of the master oscillator MO and the power oscillator PO. Accordingly, in this case, the second laser gas may be injected into the laser chamber 20 of the power oscillator PO (S602po).

Meanwhile, in the case where relationships where V<VL<VH and Emomin<Emomax<Emo are present (S595: YES), it may be understood that the output of the master oscillator MO is excessive and the output of the power oscillator PO will be excessive unless the voltage between the electrodes of the master oscillator MO and the power oscillator PO is suppressed. Accordingly, in this case, the gas in the laser chamber 10 of the master oscillator MO may be partially exhausted (S608mo).

Meanwhile, in the case where relationships where V<VL<VH and Emo<Emomin<Emomax are present (S596: YES), it may be understood that the amplification rate of the power oscillator PO is excessive and the output of the power oscillator PO will be excessive unless the voltage between the electrodes of the master oscillator MO and the power oscillator PO is suppressed. Accordingly, in this case, the gas in the laser chamber 20 of the power oscillator PO may be partially exhausted (S608po).

In the case where the charging voltage V fulfills the relationship of VL≤V≤VH (S591: NO and S594: NO), the gas pressure control need not be carried out.

Note that in the case where relationships where VL<VH<V and Emomin<Emo<Emomax are present (S593: NO), the gas pressure control need not be carried out. Alternatively, the second laser gas may be injected into the laser chambers of the master oscillator MO and the power oscillator PO, respectively.

Meanwhile, in the case where relationships where V<VL<VH and Emomin Emo Emomax are present (S596: NO), the gas pressure control need not be carried out. Alternatively, the gases in the laser chambers of the master oscillator MO and the power oscillator PO, respectively, may be partially exhausted.

The control aside from that described above may be the same as that described in the fifth embodiment.

10. Seventh Embodiment (A MOPO System Having a Ring Resonator)

Figure 56A:
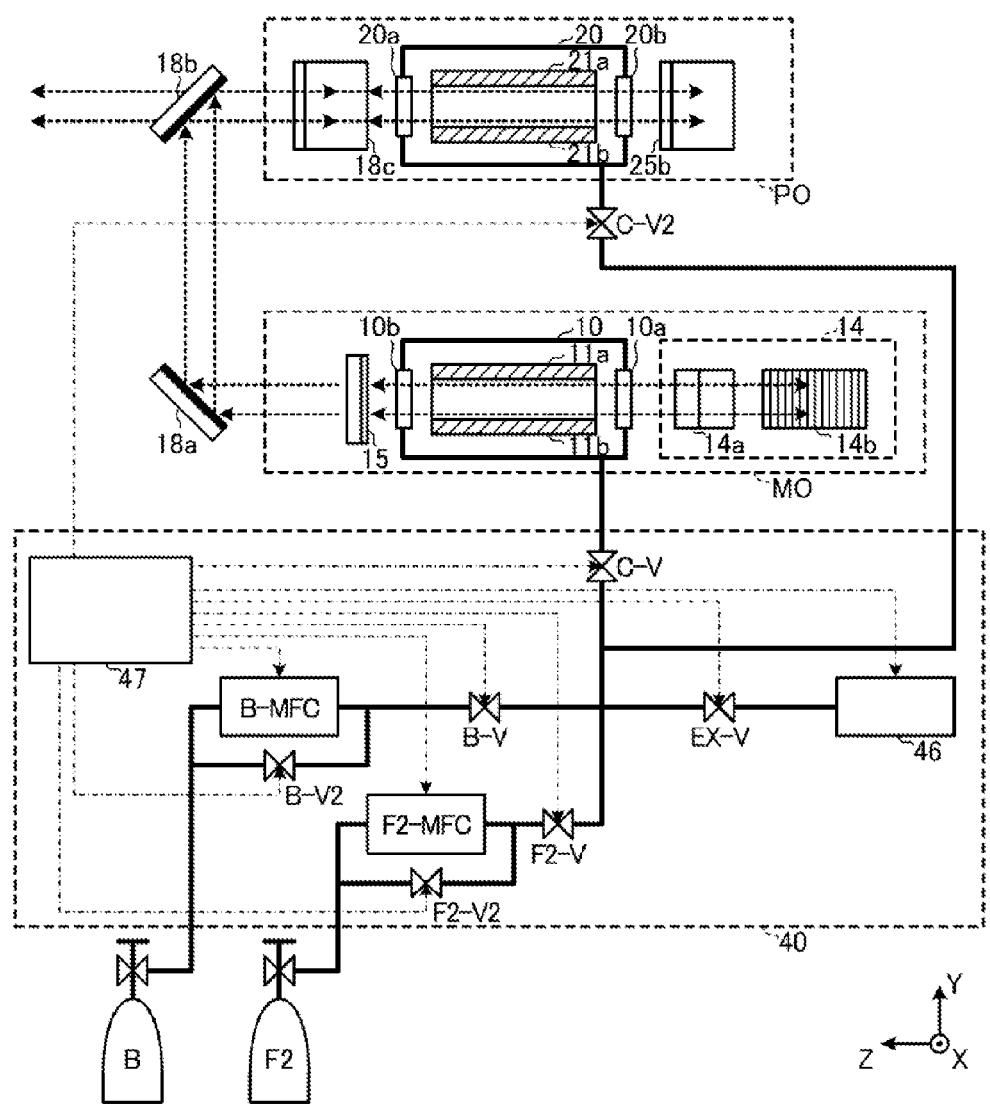
FIG. 56A schematically illustrates a configuration of an excimer laser system according to a seventh embodiment.
Figure 56B:
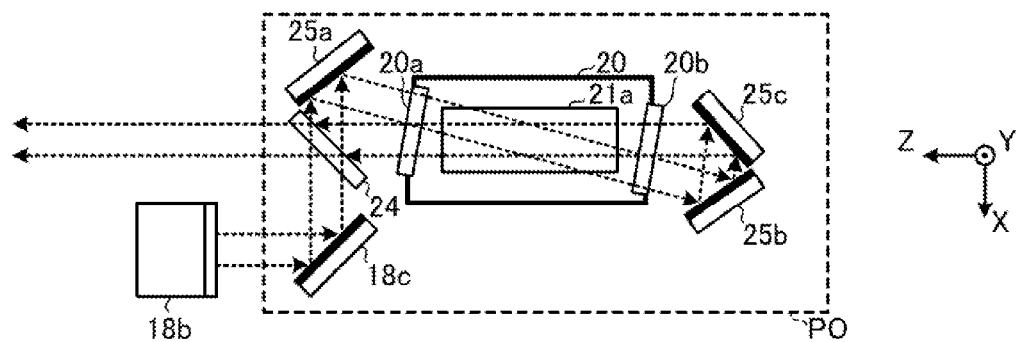
FIG. 56B schematically illustrates a configuration of a power oscillator shown in FIG. 55A.

FIG. 56A schematically illustrates a configuration of an excimer laser system according to a seventh embodiment. FIG. 56B schematically illustrates a configuration of a power oscillator PO shown in FIG. 56A. The seventh embodiment differs from the fourth embodiment in that the power oscillator PO may be configured using a ring resonator, as opposed to the fourth embodiment, in which the power oscillator PO is configured using a Fabry-Perot resonator.

The excimer laser system according to the seventh embodiment may include, in addition to the excimer laser apparatus according to the first embodiment: high reflection mirrors 18a through 18c; the laser chamber 20; the pair of electrodes 21a and 21b; a partial reflection mirror (output coupling mirror) 24; and high reflection mirrors 25a through 25c. Furthermore, a charger, a pulse power module (PPM), a pressure sensor, an optical sensor module, and so on, which are not illustrated, may also be included.

The laser beam outputted from the master oscillator MO may be introduced into the partial reflection mirror (output coupling mirror) 24 of the power oscillator PO via the high reflection mirrors 18a through 18c.

The power oscillator PO may amplify the laser beam by the laser beam passing through the laser chamber 20 multiple times along a ring-shaped optical path configured by the high reflection mirrors 25a through 25c and the partial reflection mirror 24.

The laser beam amplified by the power oscillator PO may then be outputted as output laser beam via the partial reflection mirror (output coupling mirror) 24.

The configuration may be the same as that described in the fourth embodiment in other respects.

11. Configuration of a Pulse Power Module

Figure 57:
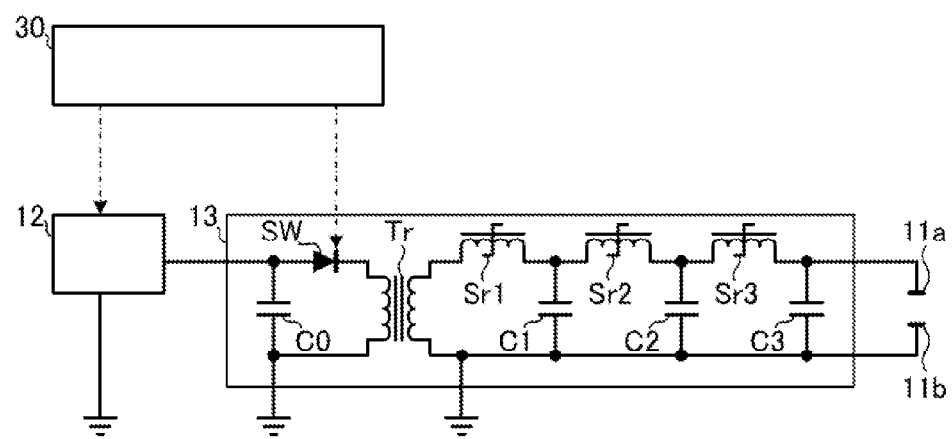
FIG. 57 schematically illustrates a configuration of a pulse power module and its periphery.

FIG. 57 schematically illustrates a configuration of a pulse power module 13 and its periphery. The pulse power module 13 may include a main condenser C0, a solid switch SW, a boosting transformer Tr, a plurality of magnetic switches Sr1 to Sr3, and a plurality of condensers C1 to C3.

Each of the magnetic switches Sr1 to Sr3 may include a saturable reactor. Each of the magnetic switches Sr1 to Sr3 may be changed to have low impedance when an integral value of voltage applied to both sides of the magnetic switch reaches a value determined for the magnetic switch to be saturated.

The main condenser C0 may be charged by the charger 12 applying a charging voltage V. At this time, the solid switch SW may be in an insulative state.

The solid switch SW may include a semiconductor switch and may correspond to the switch 13a described in reference to FIG. 2. According to a signal from the laser control unit 30, the solid switch SW may become a conductive state.

Upon turning of the solid switch SW into the conductive state, electric charges stored in the main condenser C0 due to the charging voltage V may flow to a primary side of the boosting transformer Tr. Due to magnetic flux generated in the boosting transformer Tr, induction voltage may be generated at a secondary side of the boosting transformer Tr. Here, the voltage at the secondary side may be boosted in accordance with the winding ratio of the primary side and the secondary side of the boosting transformer Tr.

When an integral value of voltage applied to both sides of the magnetic switch Sr1 reaches a predetermined value due to the induction voltage generated at the secondary side of the boosting transformer Tr, the magnetic switch Sr1 may be changed to have low impedance. As a result, an electric current may flow in a first loop including the secondary side of the boosting transformer Tr, the magnetic switch Sr1, and the condenser C1. Then, the condenser C1 may be charged.

When an integral value of voltage applied to both sides of the magnetic switch Sr2 reaches a predetermined value due to the charge in the condenser C1, the magnetic switch Sr2 may be changed to have low impedance. As a result, an electric current may flow in a second loop including the magnetic switch Sr2 and the condenser C2. Then, the condenser C2 may be charged.

If the second loop is configured to have low impedance than the first loop, pulse compression may be achieved. Namely, the electric current in the second loop may be a pulse current having a smaller pulse width and a higher peak value than the electric current in the first loop.

Similarly, the pulse current in the second loop may be transferred to a third loop including the magnetic switch Sr3 and the condenser C3, and further pulse compression may be achieved.

When a voltage in the condenser C3 reaches a breakdown voltage, an insulation breakdown may occur in the laser gas between the pair of electrodes 11a and 11b. Then, the laser gas may be excited and the pulse laser beam may be generated. Such discharge may be repeated according to switching operation of the solid switch SW. Accordingly, the pulse laser beam may be outputted in a predetermined repetition rate. Input energy Ein inputted to a pair of electrodes in a chamber may be represented by the following formula.

$$E\text{in} = t \cdot C_0 V^2 / 2$$

Here, t may be a transform efficiency. $C_0$ may be a capacity of the main condenser C0.

12. Configuration of a Control Unit

Figure 58:
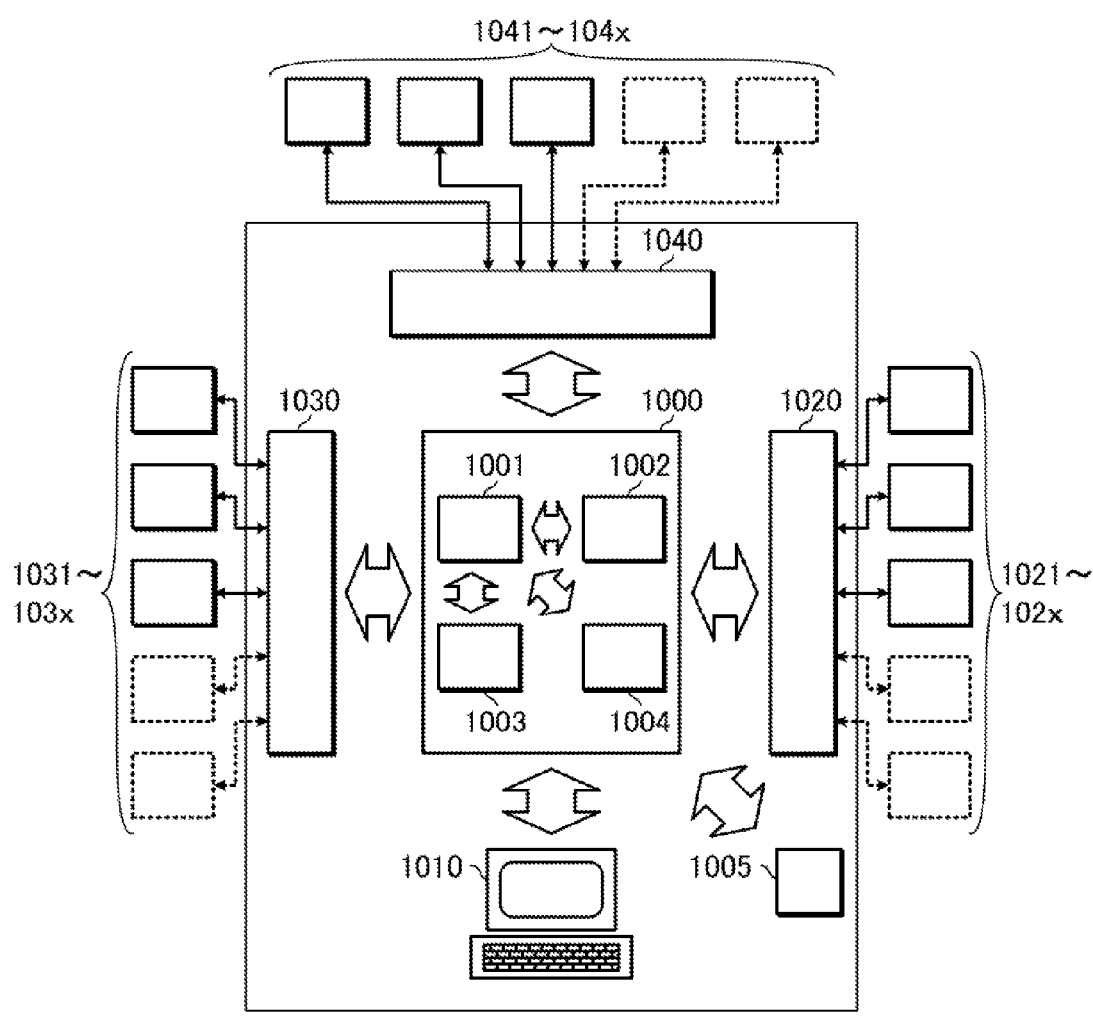
FIG. 58 is a block diagram schematically illustrating a configuration of a control unit.

FIG. 58 is a block diagram schematically illustrating a configuration of a control unit.

Each of the various controllers such as the laser control unit 30 and gas control unit 47 in the above-described embodiments may be constituted by a general-purpose control device such as a computer or a programmable controller. For example, the controller may be constituted as described below.

(Configuration)

The controller may include a processing unit 1000, and a storage memory 1005, a user interface 1010, a parallel input/output (I/O) controller 1020, a serial I/O controller 1030, and an analog-to-digital (A/D) and digital-to-analog (fl/A) converter 1040 that are connected to the processing unit 1000. The processing unit 1000 may include a central processing unit (CPU) 1001, and a memory 1002, a timer 1003, and a graphics processing unit (GPU) 1004 that are connected to the CPU 1001.

(Operation)

The processing unit 1000 may read out programs stored in the storage memory 1005. The processing unit 1000 may execute read-out programs, read out data from the storage memory 1005 in accordance with the execution of the programs, or store data in the storage memory 1005.

The parallel I/O controller 1020 may be connected to devices 1021 to 102x communicable through parallel I/O ports. The parallel I/O controller 1020 may control communication using digital signals through parallel I/O ports that is performed in the process where the processing unit 1000 executes programs.

The serial I/O controller 1030 may be connected to devices 1031 to 103x communicable through serial I/O ports. The serial I/O controller 1030 may control communication using digital signals through serial I/O ports that is performed in the process where the processing unit 1000 executes programs.

The A/D and D/A converter 1040 may be connected to devices 1041 to 104x communicable through analog ports. The A/D and D/A converter 1040 may control communication using analog signals through analog ports that is performed in the process where the processing unit 1000 executes programs.

The user interface 1010 may be configured to display progress of executing programs by the processing unit 1000 to an operator or to receive instructions by the operator to the processing unit 1000 to stop execution of the programs or to execute interruption processing.

The CPU 1001 of the processing unit 1000 may perform arithmetic processing of programs. In the process where the CPU 1001 executes programs, the memory 1002 may temporally store programs or temporally store data in the arithmetic process. The timer 1003 may measure time or elapsed time to output the time or the elapsed time to the CPU 1001 in accordance with the execution of the programs. When image data is input to the processing unit 1000, the GPU 1004 may process the image data in accordance with the execution of the programs and output the results to the CPU 1001.

The devices 1021 to 102x communicable through parallel I/O ports, which are connected to the parallel I/O controller 1020, may be the laser system 3, the exposure device controller 110, another controller, or the like.

The devices 1031 to 103x communicable through serial I/O ports, which are connected to the serial I/O controller 1030, may be the charger 12, the pulse power module 13, the exhaust pump 46, or the like.

The devices 1041 to 104x communicable through analog ports, which are connected to the A/D and D/A converter 1040, may be various sensors such as the pressure sensor 16, the optical sensor module 17, or the like.

With the above-described configuration, the controller may be capable of achieving the operation illustrated in each of the embodiments.

The aforementioned descriptions are intended to be taken only as examples, and are not to be seen as limiting in any way. Accordingly, it will be clear to those skilled in the art that variations on the embodiments of the present disclosure may be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

The invention claimed is:

1. An excimer laser apparatus comprising:
a laser chamber configured to contain gas;
a pair of electrodes provided in the laser chamber;
a power source unit configured to supply a pulse voltage between the pair of electrodes;
a gas supply unit configured to supply gas into the laser chamber;
a gas exhaust unit configured to partially exhaust gas from within the laser chamber;
a gas control unit configured to control the gas supply unit and the gas exhaust unit, where a replacement ratio of gas to be replaced from within the laser chamber increases as deterioration of the pair of electrodes progresses, the deterioration being represented by a deterioration parameter of the pair of electrodes, the deterioration parameter being an integrated value of input energy having been inputted to the pair of electrodes since the pair of electrodes was installed in the laser chamber;
an input unit configured to input an initial value of the integrated value of input energy; and
a laser control unit configured to add, to the initial value, a value of input energy additionally inputted to the pair of electrodes.

2. The excimer laser apparatus according to claim 1, wherein
the gas control unit is configured to determine a replacement amount of gas to be replaced from within the laser chamber based on the deterioration parameter of the pair of electrodes, and
the gas control unit is configured to control the gas supply unit and the gas exhaust unit to replace the replacement amount of gas thus determined from within the laser chamber.

3. The excimer laser apparatus according to claim 1, wherein
the gas control unit is configured to determine a time interval of gas replacement from within the laser chamber based on the deterioration parameter of the pair of electrodes, and
the gas control unit is configured to control the gas supply unit and the gas exhaust unit to replace gas at the time interval thus determined.

4. An excimer laser apparatus comprising:
a laser chamber configured to contain gas;
a pair of electrodes provided in the laser chamber;
a power source unit configured to supply a pulse voltage between the pair of electrodes;
a gas supply unit configured to supply gas into the laser chamber;
a gas exhaust unit configured to partially exhaust gas from within the laser chamber;
a gas control unit configured to
control the gas supply unit and the gas exhaust unit to replace a first amount of gas corresponding to a first ratio to the total amount of gas in the laser chamber when a deterioration parameter of the pair of electrodes has a first value,
control the gas supply unit and the gas exhaust unit to replace a second amount of gas corresponding to a second ratio to the total amount of gas in the laser chamber when the deterioration parameter of the pair of electrodes has a second value, the second ratio being higher than the first ratio, and the second value representing more progressed deterioration of the pair of electrodes than the first value, the deterioration parameter being an integrated value of input energy having been inputted to the pair of electrodes since the pair of electrodes was installed in the laser chamber;
an input unit configured to input an initial value of the integrated value of input energy; and
a laser control unit configured to add, to the initial value, a value of input energy additionally inputted to the pair of electrodes.

* * * * *